(12) United States Patent
Yamauchi et al.

(10) Patent No.: US 12,189,163 B2
(45) Date of Patent: Jan. 7, 2025

(54) LIGHT MODULATION ELEMENT AND INFORMATION RECORDING MEDIUM

(71) Applicant: DAI NIPPON PRINTING CO., LTD., Tokyo-to (JP)

(72) Inventors: Tsuyoshi Yamauchi, Tokyo-to (JP); Mitsuru Kitamura, Tokyo-to (JP); Tomoe Sato, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 203 days.

(21) Appl. No.: 16/645,527

(22) PCT Filed: Sep. 7, 2018

(86) PCT No.: PCT/JP2018/033211
§ 371 (c)(1),
(2) Date: Mar. 9, 2020

(87) PCT Pub. No.: WO2019/049990
PCT Pub. Date: Mar. 14, 2019

(65) Prior Publication Data
US 2021/0405274 A1    Dec. 30, 2021

(30) Foreign Application Priority Data

Sep. 8, 2017  (JP) ................. 2017-173263
Sep. 8, 2017  (JP) ................. 2017-173286
Sep. 8, 2017  (JP) ................. 2017-173292

(51) Int. Cl.
*G02B 5/18*    (2006.01)
*B42D 25/328*    (2014.01)
(Continued)

(52) U.S. Cl.
CPC ............. *G02B 5/32* (2013.01); *B42D 25/328* (2014.10); *G03H 1/0272* (2013.01)

(58) Field of Classification Search
CPC .... G02B 5/32; G03H 1/0272; G03H 2240/11; G03H 1/0244; B42D 25/328
(Continued)

(56) References Cited

U.S. PATENT DOCUMENTS 5,600,486 A * 2/1997 Gal ...................... G02B 5/1895
                                                         359/569
5,682,265 A * 10/1997 Farn .................... G02B 27/123
                                                         359/569

(Continued)

FOREIGN PATENT DOCUMENTS

JP    S56-67822 A    6/1981
JP    H07-290264 A   11/1995
(Continued)

OTHER PUBLICATIONS

Mar. 2, 2021 Office Action issued in Japanese Patent Application No. 2017-173263.
(Continued)

*Primary Examiner* — Audrey Y Chang
(74) *Attorney, Agent, or Firm* — Oliff PLC

(57) ABSTRACT

A light modulation element reproduces a light image in a specific color other than iridescence where white light is incident, without a layer that selectively transmits or reflects a specific wavelength band, and clearly reproduces a desired light image by reducing an influence of 0th-order diffracted light, and an information recording medium including the same. The light modulation element includes a factor element that reproduces a light image by modulating a phase of incident reproduction light, and has an uneven surface. A maximum diffraction efficiency Dmax in a wavelength band of between 380 nm and 780 nm in wavelength distribution of first-order diffracted light and of negative first-order diffracted light with respect to diffraction efficiency for the factor element has a local maximum value with a full width
(Continued)

at half maximum FWHM of 200 nm or less in wavelength distribution with respect to diffraction efficiency having the maximum diffraction efficiency.

7 Claims, 41 Drawing Sheets

(51) Int. Cl.
  *G02B 5/32* (2006.01)
  *G03H 1/02* (2006.01)
(58) Field of Classification Search
  USPC .................................... 359/2, 569, 571, 573
  See application file for complete search history.

(56) References Cited

U.S. PATENT DOCUMENTS

| | | | | |
|---|---|---|---|---|
| 5,801,795 | A * | 9/1998 | Ogino | H04N 9/3114 349/5 |
| 6,045,228 | A * | 4/2000 | Kuramochi | G02B 5/1871 349/5 |
| 8,941,904 | B2 * | 1/2015 | Eto | G03H 1/0005 359/2 |
| 2005/0237900 | A1 * | 10/2005 | Sano | G11B 7/1275 |
| 2005/0270604 | A1 * | 12/2005 | Drinkwater | G02B 5/0284 359/2 |
| 2007/0070477 | A1 | 3/2007 | Eto et al. | |
| 2008/0152875 | A1 * | 6/2008 | Tomita | G03H 1/0252 428/424.8 |
| 2018/0004156 | A1 * | 1/2018 | Schilling | G03H 1/0476 |

FOREIGN PATENT DOCUMENTS

| | | |
|---|---|---|
| JP | H07-320014 A | 12/1995 |
| JP | H10-153943 A | 6/1998 |
| JP | H10-282870 A | 10/1998 |
| JP | 2004-126535 A | 4/2004 |
| JP | 2004-126536 A | 4/2004 |
| JP | 2006-126791 A | 5/2006 |
| JP | 2006-267457 A | 10/2006 |
| JP | 2007-017643 A | 1/2007 |
| JP | 2007-183336 A | 7/2007 |
| JP | 2015-184532 A | 10/2015 |
| JP | 2017-037272 A | 2/2017 |

OTHER PUBLICATIONS

Mar. 2, 2021 Office Action issued in Japanese Patent Application No. 2017-173286.
Mar. 5, 2021 Office Action issued in Japanese Patent Application No. 2017-173292.
Apr. 25, 2021 Office Action issued in Chinese Patent Application No. 201880058005.6.
Nov. 20, 2018 International Search Report issued in International Patent Application No. PCT/JP2018/033211.
Jun. 17, 2022 Office Action issued in Japanese Patent Application No. 2021-111694.
Jan. 6, 2023 Office Action issued in Japanese Patent Application No. 2021-111694.
Nov. 25, 2020 Third Party Submission issued in Japanese Patent Application No. 2017-173292.
Journal "Optics" vol. 25, No. 12, (1996).

* cited by examiner

LIGHT MODULATION ELEMENT AND INFORMATION RECORDING MEDIUM

TECHNICAL FIELD

The present invention relates to a light modulation element that reproduces a light image by modulating a phase of incident reproduction light, and an information recording medium including the light modulation element.

BACKGROUND ART

Various types of light modulation elements have been proposed as light modulation elements such as a hologram capable of reproducing an original image.

For example, Patent Literature 1 discloses an amplitude modulation type light modulation element that binarizes an original image after Fourier transform and outputs the binarized image on a film. Patent Literatures 2 to 4 each disclose a phase modulation type light modulation element with an uneven pattern. The light modulation elements of Patent Literatures 1 to 4 are transmission type light modulation elements that an observer and a light source are present on opposite sides while interposing the light modulation element therebetween, and a reflection type light modulation element that an observer and a light source are present on the same side of the light modulation element has also been known (for example, see Patent Literature 5).

In addition, for example, Patent Literatures 6 and 2 each disclose a light modulation element that reproduces a light image by diffracting light over the entire visible light wavelength band. Further, Patent Literature 7 discloses a light modulation element (information recording medium) in which an area where a first light diffraction structure capable of mechanically reading recorded information is formed and an area where a second light diffraction structure capable of visually reading recorded information is formed are provided so as not to overlap each other. Further, Patent Literature 8 discloses a light modulation element that superimposes a bright portion of a reproduced original image pattern on the center of a reproduced image area to make spot light of 0th-order diffracted light, which hinders observation, inconspicuous.

Further, for example, Patent Literatures 2 and 6 each disclose a light modulation element which is a phase modulation type light modulation element with an uneven pattern and diffracts light over the entire visible light wavelength band to reproduce a light image. Further, Patent Literature 7 discloses a light modulation element (information recording medium) in which an area where a first light diffraction structure capable of mechanically reading recorded information is formed and an area where a second light diffraction structure capable of visually reading recorded information is formed are provided so as not to overlap each other.

Further, for example, as described in Patent Literatures 1 and 5, a light modulation element such as a hologram, which can diffract incident light to reproduce an original image by diffracted light has been known.

CITATION LIST

Patent Literature

Patent Literature 1: Japanese patent application publication No. 10-282870
Patent Literature 2: Japanese patent application publication No. 2004-126535
Patent Literature 3: Japanese patent application publication No. 2007-183336
Patent Literature 4: Japanese patent application publication No. 07-290264
Patent Literature 5: Japanese patent application publication No. 2017-37272
Patent Literature 6: Japanese patent application publication No. 10-153943
Patent Literature 7: Japanese patent application publication No. 07-320014
Patent Literature 8: Japanese patent application publication No. 2004-126536

SUMMARY OF INVENTION

Technical Problem

However, the light modulation element according to the related art cannot always reproduce an individual specific desired light image.

For example, in the amplitude modulation type light modulation element of Patent Literature 1, reproducible light images are limited to a light image of the 0th-order diffracted light and a light image reproduced point-symmetrically with respect to the light image of the 0th-order diffracted light. Therefore, the amplitude modulation type light modulation element of Patent Literature 1, for example, cannot reproduce a light image with different pictures on one side and the other side of the light image of the 0th-order diffracted light, or cannot reproduce a large light image with a single picture around the light image of the 0th-order diffracted light. Meanwhile, the phase modulation type light modulation element of Patent Literature 2 has three or more types of light path length differences caused by the uneven pattern, such that it is possible to reproduce a light image with different pictures on one side and the other side of the light image of the 0th-order diffracted light, or reproduce a large light image with a single picture around the light image of the 0th-order diffracted light. However, in the light image reproduced by the light modulation element of Patent Literature 2, since a ratio of the 0th-order diffracted light to reproduction light incident on the light modulation element is extremely low, in a case of observing a surrounding area through the light modulation element, the blurred scene is observed.

In addition, since all the light modulation elements of Patent Literatures 1 to 7 diffract light significantly evenly over the entire visible light wavelength band, when white light, which is general environmental light, is incident, the white light is dispersed and a light image is reproduced at a different position for each wavelength, and an iridescent light image is reproduced as a whole. In a case where an iridescent light image is reproduced as described above, since each type of line (for example, contour lines) is thick, the visibility of the reproduced image is poor and a desired light image cannot be reproduced with high definition. Further, in a case where the color of the reproduced image is limited to iridescence, the light image cannot be reproduced in a specific color (for example, a single color such as red or blue), and thus it is not possible to give a specific impression to an observer with a specific color.

Note that examples of a method of reproducing a light image in a specific color include a method in which only a light in a specific wavelength band is incident on the light modulation element or a method in which a filter layer such as a color filter that selectively transmits only light in a specific wavelength band is added to the light modulation element. However, in a case where only light in a specific wavelength band is incident on the light modulation element, since usable light sources are limited, the use of the light modulation element is significantly limited. Further, in a case where the filter layer is provided, the manufacturing cost increases, and the color of the scene observed through the light modulation element is limited to colors of the specific wavelength band, which causes discomfort for the observer.

Further, in Patent Literature 7, the first and second light diffraction structures for diffracting two types of wavelengths are provided, and the first light diffraction structure reproduces mechanically readable recorded information, whereas the second light diffraction structure reproduces visually readable recorded information. Therefore, similarly to the above-mentioned other literatures, the light modulation element of Patent Literature 7 also cannot reproduce a light image having a desired specific color in a visible manner when white light is incident thereon, and thus the visibility of an observed image is not always excellent. In addition, although two types of light diffraction structures are provided in the light modulation element of Patent Literature 7, a light modulation element capable of appropriately diffracting light in two or more wavelength bands by a single type of light diffraction structure has also been demanded.

In addition, the light modulation element of Patent Literature 8 superimposes the spot light of the 0th-order diffracted light on the bright portion of the reproduced original image pattern in order to make the spot light of the 0th-order diffracted light, which hinders the observation, inconspicuous, but the luminance of the 0th-order diffracted light is higher as compared with first-order diffracted light. Therefore, even in a case where the light modulation element of Patent Literature 8 is used, the spot light of the 0th-order diffracted light is still conspicuous in the reproduced image, and the 0th-order diffracted light can deteriorate the visibility of the reproduced image. In a case where there is no bright portion of the reproduced original image pattern at the position where the spot light of the 0th-order diffracted light is reproduced, the spot light of the 0th-order diffracted light cannot be hidden by the reproduced image pattern.

As described above, the light modulation element according to the related art cannot always properly reproduce a light image with a desired visibility. In particular, there is a significantly high demand and need for a light modulation element that can use generally-used white light as reproduction light and can reproduce a desired light image with an excellent visibility without devising an original image. Such a reproduced image with an excellent visibility is suitable not only for design use but also for security use such as authenticity determination. In particular, in a case of authenticating a reproduced image by a device for security use, it is possible to improve authentication accuracy and provide highly reliable security performance by suppressing the influence of the 0th-order diffracted light and clearly reproducing the desired light image with other diffracted light.

The present invention has been made in view of the above circumstances, and an object of the present invention is to provide a light modulation element that can reproduce a light image in a specific color (that is, light in a specific wavelength band) other than iridescence in a case where white light is incident, without providing a layer that selectively transmits or reflects a specific wavelength band, and an information recording medium including the light modulation element. Further, another object of the present invention is to provide a light modulation element that can clearly reproduce a desired light image by reducing the influence of the 0th-order diffracted light, and an information recording medium including the light modulation element.

In addition, since all the light modulation elements of Patent Literatures 2 and 6 diffract light significantly evenly over the entire visible light wavelength band, when white light, which is general environmental light, is incident, the white light is dispersed and a light image is reproduced at a different position for each wavelength, and an iridescent light image is reproduced as a whole. In a case where an iridescent light image is reproduced as described above, since each type of line (for example, contour lines) is thick, the visibility of the reproduced image is poor and a desired light image cannot be reproduced with high definition. Further, in a case where the color of the reproduced image is limited to iridescence, the light image cannot be reproduced in a specific color (for example, a single color such as red or blue), and thus it is not possible to give a specific impression to an observer with a specific color.

Note that examples of a method of reproducing a light image in a specific color include a method in which only a light in a specific wavelength band is incident on the light modulation element or a method in which a filter layer such as a color filter that selectively transmits only light in a specific wavelength band is added to the light modulation element. However, in a case where only light in a specific wavelength band is incident on the light modulation element, since usable light sources are limited, the use of the light modulation element is significantly limited. Further, in a case where the filter layer is provided, the manufacturing cost increases, and the color of the scene observed through the light modulation element is limited to colors of the specific wavelength band, which causes discomfort for the observer.

Further, in Patent Literature 7, the first and second light diffraction structures for diffracting two types of wavelengths are provided, and the first light diffraction structure reproduces mechanically readable recorded information, whereas the second light diffraction structure reproduces visually readable recorded information. Therefore, similarly to the above-mentioned other literatures, the light modulation element of Patent Literature 7 also cannot reproduce a light image having a desired specific color in a visible manner when white light is incident thereon, and thus the visibility of an observed image is not always excellent.

As described above, the light modulation element according to the related art cannot always properly reproduce a light image with a desired visibility. In particular, there is a significantly high demand and need for a light modulation element that can use generally-used white light as reproduction light and can reproduce a desired light image with an excellent visibility without devising an original image. Such a reproduced image with an excellent visibility is suitable not only for design use but also for security use such as authenticity determination.

In particular, a light modulation element used for authenticity determination is required to enable an observer to easily and accurately determine authenticity by observing a reproduced image. Examples of such an authenticity determination method include a method of determining authenticity based on whether or not a reproduced image shows a predetermined change that is easily visible by changing the incident angle of the reproduction light with respect to the light modulation element. There are various modes of such a change in the reproduced image, and particularly, it is considered that a mode in which at least a part of the reproduced image is shifted between a visible state and a rarely visible state (or a completely invisible state) based on the change in the incident angle of the reproduction light is significantly effective.

However, the light modulation element according to the related art such as a hologram has not been able to realize such a change in the reproduced image. Further, it has not been considered to provide a highly reliable security performance by using a light modulation element that realizes such a change in the reproduced image, for security use such as authenticity determination.

The present invention has been made in view of the above circumstances, and an object of the present invention is to provide a light modulation element capable of making at least a part of a reproduced light image be shifted between a visible state and a rarely visible state (or an invisible state) by changing the incident angle of reproduction light, and an information recording medium including the light modulation element.

There are the following two methods of observing a light image reproduced by the light modulation element. One is reflection observation in which a light source and an observer are present on the same side with respect to the light modulation element, and the observer observes light reflected by the light modulation element. The other is transmission observation in which a light source and an observer are present on opposite sides while interposing the light modulation element therebetween, and the observer observes light transmitted through the light modulation element.

In general, in the light modulation element, the same light image is reproduced and observed in both reflection observation and transmission observation. In this case, a reproduced image may be observed in an unexpected manner. For example, in a case where the light modulation element is used while being superposed on a reflection type hologram structure, a light image generated by the reflection type hologram structure and a reproduced image generated by the light modulation element are observed in a superimposed form. As described above, in a case where the light modulation element and the reflection type hologram structure are superposed, it is difficult to observe only the light image generated by the reflection type hologram structure. Further, as another problem, for example, in a case where a reproduced image generated by the light modulation element is used as hidden information (so-called covert information) for security use, a corresponding light image is easily observed in both reflection observation and transmission observation, and thus the hidden information can be easily found.

The present invention has been made in view of the above circumstances, and an object of the present invention is to provide a light modulation element in which a reproduced image can be observed in reflection observation but cannot be observed in transmission observation. Alternatively, an object of the present invention is to provide a light modulation element in which a reproduced image can be observed in transmission observation but cannot be observed in reflection observation. Alternatively, an object of the present invention is to provide a light modulation element in which different reproduced images can be observed between reflection observation and transmission observation.

Solution to Problem

An aspect of the present invention is directed to a light modulation element including a factor element that reproduces a light image by modulating a phase of incident reproduction light, in which the factor element has an uneven surface, and a maximum diffraction efficiency in a wavelength band of not less than 380 nm and not more than 780 nm in wavelength distribution of first-order diffracted light with respect to diffraction efficiency and wavelength distribution of negative first-order diffracted light with respect to diffraction efficiency for the factor element has a local maximum value with a full width at half maximum of 200 nm or less in wavelength distribution with respect to diffraction efficiency having the maximum diffraction efficiency.

The uneven surface of the factor element may have a different height of three or more steps, and there may be no other local maximum value of the diffraction efficiency that is half or more of the maximum diffraction efficiency in the wavelength band of not less than 380 nm and not more than 780 nm in the wavelength distribution of the first-order diffracted light with respect to diffraction efficiency and the wavelength distribution of the negative first-order diffracted light with respect to diffraction efficiency.

At least two or more types of factor elements may be provided, and a wavelength showing the maximum diffraction efficiency may be different between the at least two or more types of factor elements.

The light modulation element may include a first region and a second region, in which a factor element including a first type factor element may be arranged in the first region, a factor element including a second type factor element may be arranged in the second region, and a wavelength showing the maximum diffraction efficiency for the first type factor element may be different from a wavelength showing the maximum diffraction efficiency for the second type factor element, and a light image reproduced by the factor element arranged in the first region and a light image reproduced by the factor element arranged in the second region may have shape similarity.

The maximum diffraction efficiency may be shown in one of the wavelength distribution of the first-order diffracted light with respect to diffraction efficiency and the wavelength distribution of the negative first-order diffracted light with respect to diffraction efficiency, and a maximum diffraction efficiency in the wavelength band of not less than 380 nm and not more than 780 nm in the other one of the wavelength distribution of the first-order diffracted light with respect to diffraction efficiency and the wavelength distribution of the negative first-order diffracted light with respect to diffraction efficiency may have a local maximum value with a full width at half maximum of 200 nm or less in the other wavelength distribution with respect to diffraction efficiency.

The maximum diffraction efficiency may be shown in both of the wavelength distribution of the first-order diffracted light with respect to diffraction efficiency and the wavelength distribution of the negative first-order diffracted light with respect to diffraction efficiency.

A difference between a wavelength showing the maximum diffraction efficiency in one of the wavelength distribution of the first-order diffracted light with respect to diffraction efficiency and the wavelength distribution of the negative first-order diffracted light with respect to diffraction efficiency, and a wavelength showing the maximum diffraction efficiency in the other one of the wavelength distribution of the first-order diffracted light with respect to diffraction efficiency and the wavelength distribution of the negative first-order diffracted light with respect to diffraction efficiency may be 100 nm or less.

There may be no other local maximum value of the diffraction efficiency that is half or more of the maximum diffraction efficiency in one of the wavelength distribution of the first-order diffracted light with respect to diffraction efficiency and the wavelength distribution of the negative first-order diffracted light with respect to diffraction efficiency, in the wavelength band of not less than 380 nm and not more than 780 nm in the one wavelength distribution with respect to diffraction efficiency, and there is no other local maximum value of the diffraction efficiency that is half or more of the maximum diffraction efficiency in the other one of the wavelength distribution of the first-order diffracted light with respect to diffraction efficiency and the wavelength distribution of the negative first-order diffracted light with respect to diffraction efficiency, in the wavelength band of not less than 380 nm and not more than 780 nm in the other one wavelength distribution with respect to diffraction efficiency.

The light modulation element may include a first region and a second region, in which a first type factor element may be arranged in the first region, a second type factor element may be arranged in the second region, in the wavelength band of not less than 380 nm and not more than 780 nm, wavelength distribution of first-order diffracted light with respect to diffraction efficiency for the first type factor element may be the same as wavelength distribution of first-order diffracted light with respect to diffraction efficiency for the second type factor element, wavelength distribution of negative first-order diffracted light with respect to diffraction efficiency for the first type factor element may be the same as wavelength distribution of negative first-order diffracted light with respect to diffraction efficiency for the second type factor element, a light image of the first-order diffracted light reproduced by the first type factor element may have the same shape as that of a light image of the negative first-order diffracted light reproduced by the second type factor element, a light image of the negative first-order diffracted light reproduced by the first type factor element may have the same shape as that of a light image of the first-order diffracted light reproduced by the second type factor element, and relative positions of the light image reproduced with the first-order diffracted light of the first type factor element and the light image reproduced with the negative first-order diffracted light of the first type factor element may be opposite to relative positions of the light image reproduced with the first-order diffracted light of the second factor element and the light image reproduced with the negative first-order diffracted light of the second type factor element.

A plurality of factor elements may be provided, the plurality of factor elements may include a first type factor element and a second type factor element, in the wavelength band of not less than 380 nm and not more than 780 nm, wavelength distribution of first-order diffracted light with respect to diffraction efficiency for the first type factor element may be the same as wavelength distribution of first-order diffracted light with respect to diffraction efficiency for the second type factor element, wavelength distribution of negative first-order diffracted light with respect to diffraction efficiency for the first type factor element may be the same as wavelength distribution of negative first-order diffracted light with respect to diffraction efficiency for the second type factor element, a light image of the first-order diffracted light reproduced by the first type factor element may have the same shape as that of a light image of the negative first-order diffracted light reproduced by the second type factor element, a light image of the negative first-order diffracted light reproduced by the first type factor element may have the same shape as that of a light image of the first-order diffracted light reproduced by the second type factor element, the light image of the first-order diffracted light reproduced by the first type factor element and the light image of the negative first-order diffracted light reproduced by the second type factor element may be superimposed, and the light image of the negative first-order diffracted light reproduced by the first type factor element and the light image of the first-order diffracted light reproduced by the second type factor element may be superimposed.

A plurality of factor elements may be provided, the plurality of factor elements may include a first type factor element and a second type factor element, in the wavelength band of not less than 380 nm and not more than 780 nm, wavelength distribution of first-order diffracted light with respect to diffraction efficiency for the first type factor element may be different from wavelength distribution of first-order diffracted light with respect to diffraction efficiency for the second type factor element, wavelength distribution of negative first-order diffracted light with respect to diffraction efficiency for the first type factor element may be different from as wavelength distribution of negative first-order diffracted light with respect to diffraction efficiency for the second type factor element, a light image of the first-order diffracted light reproduced by the first type factor element may have the same shape as that of a light image of the negative first-order diffracted light reproduced by the second type factor element, a light image of the negative first-order diffracted light reproduced by the first type factor element may have the same shape as that of a light image of the first-order diffracted light reproduced by the second type factor element, the light image of the first-order diffracted light reproduced by the first type factor element and the light image of the negative first-order diffracted light reproduced by the second type factor element may be superimposed, and the light image of the negative first-order diffracted light reproduced by the first type factor element and the light image of the first-order diffracted light reproduced by the second type factor element may be superimposed.

A plurality of factor elements may be provided, the plurality of factor elements may include a first type factor element and a second type factor element, in the wavelength band of not less than 380 nm and not more than 780 nm, wavelength distribution of first-order diffracted light with respect to diffraction efficiency for the first type factor element may be different from wavelength distribution of negative first-order diffracted light with respect to diffraction efficiency for the second type factor element, wavelength distribution of negative first-order diffracted light with respect to diffraction efficiency for the first type factor element may be different from wavelength distribution of first-order diffracted light with respect to diffraction efficiency for the second type factor element, a light image of the first-order diffracted light reproduced by the first type factor element may have the same shape as that of a light image of the first-order diffracted light reproduced by the second type factor element, a light image of the negative first-order diffracted light reproduced by the first type factor element may have the same shape as that of a light image of the negative first-order diffracted light reproduced by the second type factor element, the light image of the first-order diffracted light reproduced by the first type factor element and the light image of the first-order diffracted light repro- duced by the second type factor element may be superimposed, and the light image of the negative first-order diffracted light reproduced by the first type factor element and the light image of the negative first-order diffracted light reproduced by the second type factor element may be superimposed.

A maximum diffraction efficiency of 0th-order diffracted light for the factor element may be obtained at a wavelength of 421 nm or less or a wavelength of 697 nm or more.

A maximum diffraction efficiency of 0th-order diffracted light for the factor element may have a local maximum value with a full width at half maximum of 200 nm or less.

At least one of the wavelength distribution of the first-order diffracted light with respect to diffraction efficiency or the wavelength distribution of the negative first-order diffracted light with respect to diffraction efficiency for the factor element may have a local maximum value of diffraction efficiency in a wavelength band of 456 nm to 663 nm.

A maximum diffraction efficiency in the wavelength band of 456 nm to 663 nm in wavelength distribution of the 0th-order diffracted light with respect to diffraction efficiency for the factor element may be less than 25% of the local maximum value included in the wavelength band of 456 nm to 663 nm in at least one of the wavelength distribution of the first-order diffracted light with respect to diffraction efficiency or the wavelength distribution of the negative first-order diffracted light with respect to diffraction efficiency for the factor element.

The light modulation element may include a first region and a second region, in which a first type factor element may be arranged in the first region, a second type factor element may be arranged in the second region, light images of first-order diffracted light and negative first-order diffracted light reproduced by the first type factor element and light images of first-order diffracted light and negative first-order diffracted light reproduced by the second type factor element may have shape similarity, a maximum diffraction efficiency of 0th-order diffracted light for the first type factor element may be obtained at a wavelength of 421 nm or less or a wavelength of 697 nm or more, and a maximum diffraction efficiency of 0th-order diffracted light for the second type factor element may be obtained at a wavelength of more than 421 nm and less than 697 nm.

Another aspect of the present invention is directed to a light modulation element including a factor element that reproduces a light image by modulating a phase of incident reproduction light, in which the factor element has an uneven surface with a different height of three or more steps, and the factor element reproduces a first light image with light including light having a first wavelength, and a second light image with light including light having a second wavelength different from the first wavelength, the second light image being point-symmetric to the first light image.

One of the first light image and the second light image may be reproduced in red.

A maximum diffraction efficiency in a wavelength band of not less than 380 nm and not more than 780 nm in one of wavelength distribution of first-order diffracted light with respect to diffraction efficiency and wavelength distribution of the negative first-order diffracted light with respect to diffraction efficiency for the factor element may have a local maximum value in a wavelength band of not less than 680 nm and not more than 780 nm in the one wavelength distribution with respect to diffraction efficiency.

A maximum diffraction efficiency in the other one of the wavelength distribution of the first-order diffracted light with respect to diffraction efficiency and the wavelength distribution of the negative first-order diffracted light with respect to diffraction efficiency for the factor element may have a local maximum value in a wavelength band of less than 680 nm in the other one wavelength distribution with respect to diffraction efficiency, in accordance with a change in an incident angle of the reproduction light with respect to the factor element.

There may be no local maximum value of the diffraction efficiency that is half or more of the maximum diffraction efficiency in the wavelength band of not less than 380 nm and not more than 780 nm in the one wavelength distribution with respect to diffraction efficiency.

Another aspect of the present invention is directed to a light modulation element including a factor element that reproduces a light image by modulating a phase of incident reproduction light, in which the factor element has an uneven surface with a height of three or more steps, a maximum diffraction efficiency of 0th-order diffracted light for the factor element is obtained at a wavelength of 421 nm or less or a wavelength of 697 nm or more.

The factor element may be a Fourier transform hologram.

Another aspect of the present invention is directed to an information recording medium including any one of the above-described light modulation elements.

The light image may represent information based on at least one of a letter, a symbol, and a picture.

The information recording medium may further include a substrate having an opening portion with a predetermined size, in which at least a part of the light modulation element may be arranged at a position corresponding to the opening portion.

Another aspect of the present invention is directed to a light modulation element including a factor element that reproduces a light image by modulating a phase of incident reproduction light, in which the factor element has an uneven surface, and at least one of wavelength distribution of first-order diffracted light with respect to diffraction efficiency or wavelength distribution of negative first-order diffracted light with respect to diffraction efficiency for the factor element has a local maximum value of the diffraction efficiency in at least one of a wavelength band of not less than 380 nm and not more than 600 nm or a wavelength band of not less than 780 nm to not more than 1200 nm.

A full width at half maximum of the local maximum value of the diffraction efficiency included in at least one of the wavelength distribution of the first-order diffracted light with respect to diffraction efficiency and the wavelength distribution of the negative first-order diffracted light with respect to diffraction efficiency may be 200 nm or less.

One of the wavelength distribution of the first-order diffracted light with respect to diffraction efficiency and the wavelength distribution of the negative first-order diffracted light with respect to diffraction efficiency for the factor element may have a local maximum value of the diffraction efficiency in at least one of the wavelength band of not less than 380 nm and not more than 600 nm and the wavelength band of not less than 780 nm to not more than 1200 nm, and the other one of the wavelength distribution of the first-order diffracted light with respect to diffraction efficiency and the wavelength distribution of the negative first-order diffracted light with respect to diffraction efficiency for the factor element may have a local maximum value of the diffraction efficiency in the wavelength band of more than 600 nm and less than 780 nm.

Another aspect of the present invention is directed to a light modulation element including a factor element that reproduces a light image by modulating a phase of incident reproduction light, in which the factor element has an uneven surface, and a wavelength band of light for reproducing a light image can be a wavelength band of less than 380 nm or a wavelength band of more than 780 nm in accordance with a change in an incident angle of the reproduction light with respect to the factor element.

Another aspect of the present invention is directed to a light modulation element including a factor element that reproduces a light image by modulating a phase of incident reproduction light, in which the factor element has an uneven surface, and the light image can become invisible in accordance with a change in an incident angle of the reproduction light with respect to the factor element.

The factor element is a Fourier transform hologram.

Another aspect of the present invention is directed to an information recording medium including any one of the above-described light modulation elements.

The light image may represent information based on at least one of a letter, a symbol, and a picture.

The information recording medium may further include a substrate having an opening portion with a predetermined size, in which at least a part of the light modulation element may be arranged at a position corresponding to the opening portion.

Further, the light modulation element according to another aspect (hereinafter, also referred to as "first aspect") includes a factor element that reproduces a light image by modulating a phase of incident light, in which the factor element has an uneven surface, a maximum diffraction efficiency in a wavelength band of not less than 380 nm and not more than 780 nm in wavelength distribution of first-order diffracted light resulting from reflection from the factor element with respect to diffraction efficiency and wavelength distribution of negative first-order diffracted light resulting from reflection from the factor element with respect to diffraction efficiency is 20% or higher, and a maximum diffraction efficiency in the wavelength band of not less than 380 nm and not more than 780 nm in wavelength distribution of first-order diffracted light resulting from transmission through the factor element with respect to diffraction efficiency and wavelength distribution of negative first-order diffracted light resulting from transmission through the factor element with respect to diffraction efficiency is 10% or lower.

Alternatively, the light modulation element according to another aspect (hereinafter, also referred to as "second aspect") includes
    a factor element that reproduces a light image by modulating a phase of incident light,
    in which the factor element has an uneven surface with a different height of five or more steps,
    a maximum diffraction efficiency in a wavelength band of not less than 380 nm and not more than 780 nm in wavelength distribution of first-order diffracted light resulting from transmission through the factor element with respect to diffraction efficiency and wavelength distribution of negative first-order diffracted light resulting from transmission through the factor element with respect to diffraction efficiency is 20% or higher, and a maximum diffraction efficiency in the wavelength band of not less than 380 nm and not more than 780 nm in wavelength distribution of first-order diffracted light resulting from reflection from the factor element with respect to diffraction efficiency and wavelength distribution of negative first-order diffracted light resulting from reflection from the factor element with respect to diffraction efficiency is 10% or lower.

In the light modulation elements according to the first and second aspects, the factor element may be configured as a Fourier transform hologram.

Alternatively, the light modulation element according to another aspect (hereinafter, also referred to as "third aspect") includes
    a first factor element and a second factor element that reproduce a light image by modulating a phase of incident light,
    in which the first factor element has an uneven surface, the second factor element has an uneven surface with a different height of five or more steps,
    a maximum diffraction efficiency in a wavelength band of not less than 380 nm and not more than 780 nm in wavelength distribution of first-order diffracted light resulting from reflection from the first factor element with respect to diffraction efficiency and wavelength distribution of negative first-order diffracted light resulting from reflection from the first factor element with respect to diffraction efficiency is 20% or higher, a maximum diffraction efficiency in the wavelength band of not less than 380 nm and not more than 780 nm in wavelength distribution of first-order diffracted light resulting from transmission through the first factor element with respect to diffraction efficiency and wavelength distribution of negative first-order diffracted light resulting from transmission through the first factor element with respect to diffraction efficiency is 10% or lower,
    a maximum diffraction efficiency in the wavelength band of not less than 380 nm and not more than 780 nm in wavelength distribution of first-order diffracted light resulting from transmission through the second factor element with respect to diffraction efficiency and wavelength distribution of negative first-order diffracted light resulting from transmission through the second factor element with respect to diffraction efficiency is 20% or higher, and a maximum diffraction efficiency in the wavelength band of not less than 380 nm and not more than 780 nm in wavelength distribution of first-order diffracted light resulting from reflection from the second factor element with respect to diffraction efficiency and wavelength distribution of negative first-order diffracted light resulting from reflection from the second factor element with respect to diffraction efficiency is 10% or lower.

In the light modulation element according to the third aspect, the first factor element and the second factor element may each be configured as a Fourier transform hologram.

Further, in the light modulation element according to the third aspect, a light image of the first-order diffracted light or the negative first-order diffracted light resulting from reflection from the first factor element may be different from a light image of the first-order diffracted light or the negative first-order diffracted light resulting from transmission through the second factor element.

Further, in the light modulation element according to the third aspect, the first factor element and the second factor element may be arranged side by side on the same plane.

Alternatively, in the light modulation element according to the third aspect, the first factor element and the second factor element may be arranged side by side in a thickness direction of the light modulation element.

Advantageous Effects of Invention

According to the present disclosure, a light modulation element that can reproduce a light image in a specific color other than iridescence in a case where white light is incident, without providing a layer that selectively transmits or reflects a specific wavelength band, and an information recording medium including the light modulation element can be provided. Further, a light modulation element that can clearly reproduce a desired light image by reducing the influence of the 0th-order diffracted light, and an information recording medium including the light modulation element can be provided.

According to the present disclosure, a light modulation element capable of making at least a part of a reproduced light image be shifted between a visible state and a rarely visible state (or an completely invisible state) by changing the incident angle of reproduction light, and an information recording medium including the light modulation element can be provided.

According to the present disclosure, a light modulation element in which a reproduced image can be observed in reflection observation but cannot be observed in transmission observation can be provided. Alternatively, according to the present disclosure, a light modulation element in which a reproduced image can be observed in transmission observation but cannot be observed in reflection observation can be provided. Alternatively, according to the present disclosure, a light modulation element in which different reproduced images can be observed between reflection observation and transmission observation can be provided.

BRIEF DESCRIPTION OF DRAWINGS

FIG. 51 illustrates a light image in a case where the incident angle of reproduction light with respect to each factor element is 0°.

FIG. 52 illustrates a light image in a case where the incident angle of reproduction light with respect to each factor element is 30°.

DESCRIPTION OF EMBODIMENTS

Figure 1:
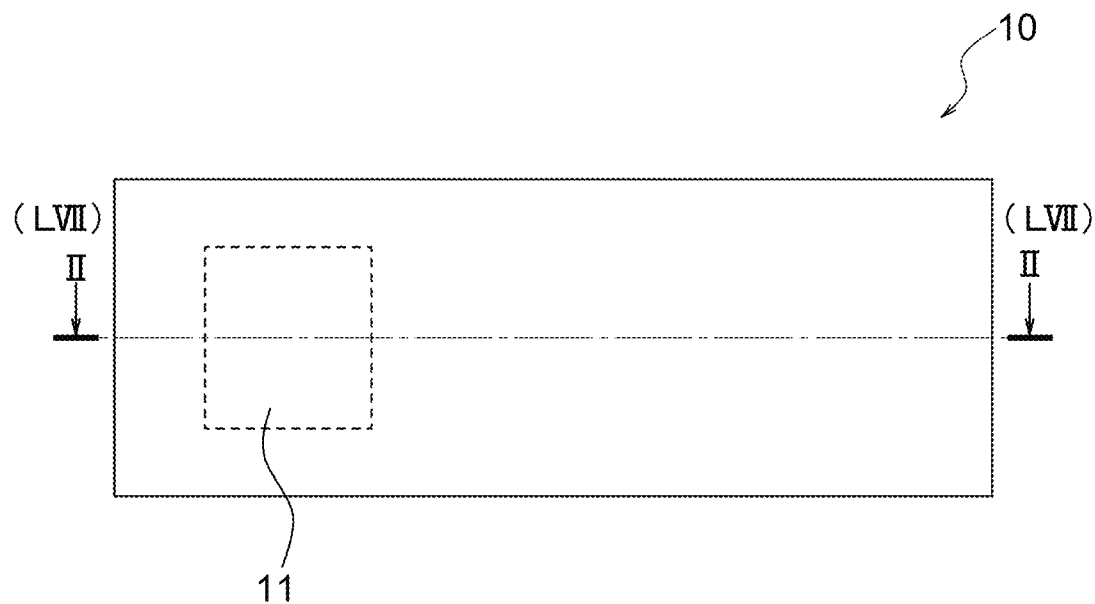
FIG. 1 is a schematic plan view illustrating a typical example of a hologram holder.

Hereinafter, a light modulation element according to an embodiment of the present invention will be described. Specifically, specific embodiments and modified examples will be described for each of the first, second, and third exemplary embodiments of the present invention.

First Exemplary Embodiment

A light modulation element according to each of the following embodiments is configured with a phase modulation type hologram structure that reproduces a light image by modulating a phase of incident reproduction light, and particularly, includes a factor element configured with a Fourier transform hologram. The Fourier transform hologram is a hologram produced by recording wavefront information of a Fourier transformed image of an original image, and functions as a so-called Fourier transform lens. In particular, a phase modulation type Fourier transform hologram is a hologram having an uneven surface formed by performing multi-leveling on phase information of a Fourier transformed image and recording the phase information as a depth on a medium, and a diffraction phenomenon based on a light path length difference of the medium is used to reproduce a light image of the original image with the reproduction light. The Fourier transform hologram is advantageous in that, for example, a desired light image (that is, an original image) can be reproduced with high accuracy, and the Fourier transform hologram can be relatively easily produced. Such a phase modulation type light modulation element is also called a kinoform. However, the factor element of the light modulation element to which the present invention can be applied is not limited to the Fourier transform hologram, and the present invention is also applicable to a hologram for reproducing a light image by another method or a light modulation element having another structure.

In the following description, white light including various wavelengths is described as an example of the reproduction light to be incident on the hologram structure, but the reproduction light need not necessarily be white light. That is, as long as light having a wavelength corresponding to the color of the light image reproduced by the hologram structure is included, the wavelength included in the reproduction light is not particularly limited. Further, in the following description, unless otherwise specified, it is assumed that the incident angle of the reproduction light with respect to the hologram structure is 0° (that is, an angle along a normal direction of the incident surface of the hologram structure). Further, a specific value of a refractive index described in the present specification is based on light having a wavelength of 589.3 nm unless otherwise specified. Further, in the following description, unless otherwise specified, a refractive index or a characteristic value of an uneven surface related to a hologram structure (light modulation element) 11 is a value derived under the assumption that the hologram structure 11 is used in an air environment having a refractive index of 1.0.

Further, in the present specification, the concept of "two or more light images having the same shape" includes not only two or more light images having the same size and the same shape (overall shape), but also two or more light images having different sizes and the same shape. That is, whether or not two or more light images having the same shape have the same size is not considered as long as the two or more light images have the same shape, and two or more light images having a relationship in which the two or more light images are similar to each other correspond to the "two or more light images having the same shape". Therefore, two or more light images reproduced at different sizes due to different constituent wavelengths of the light images correspond to "two or more light images having the same shape as each other" as long as the two or more light images have the same overall shape.

Further, in the present specification, the concept of two light images having a relationship of "point symmetry" includes not only two light images having the same size and the same shape (overall shape), but also two light images having different sizes and the same shape. That is, as long as two light images have the same shape and have point symmetry in reproduction position and reproduction direction, whether or not the two light images having the same shape have the same size is not considered. Therefore, for example, two light images having a relationship in which the two light images are similar to each other and having point symmetry in reproduction position and reproduction direction correspond to "two light images having a relationship of point symmetry". Therefore, two or more light images reproduced at different sizes due to different constituent wavelengths of the light images correspond to "two or more light images having a relationship of point symmetry", as long as the two or more light images have the same shape and have point symmetry in reproduction position and light image direction.

1-1-th Embodiment

Figure 2:
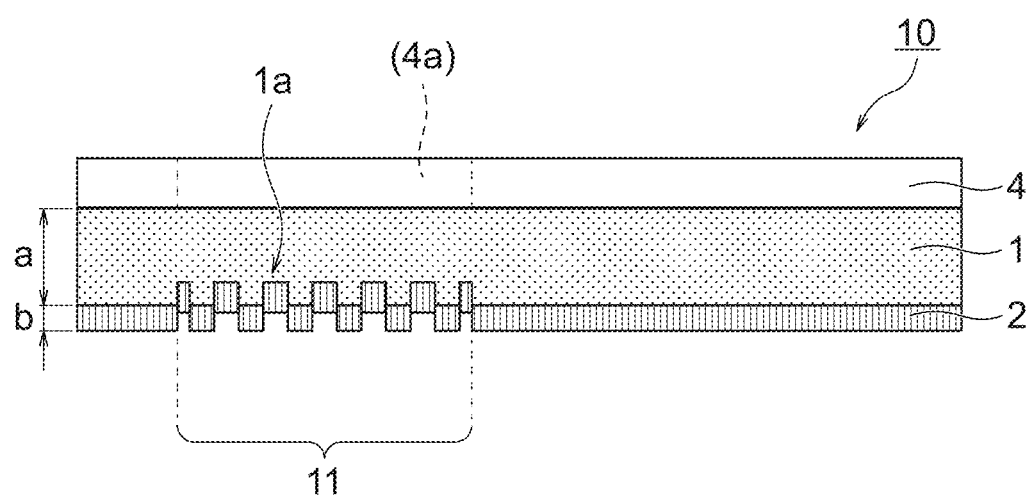
FIG. 2 is a cross-sectional view taken along line II-II of FIG. 1.

FIG. 1 is a schematic plan view illustrating a typical example of a hologram holder (a light modulation element holder) 10. FIG. 2 is a cross-sectional view taken along line II-II of FIG. 1.

The hologram holder 10 illustrated in FIGS. 1 and 2 includes a hologram layer 1, a reflection layer 2 laminated on one surface of the hologram layer 1, and a substrate 4 laminated on the other surface of the hologram layer 1. The reflection type hologram structure 11 is provided in a part of the hologram holder 10. In the hologram structure 11, one surface of the hologram layer 1 is an uneven surface 1a, and the reflection layer 2 covering the uneven surface 1a also has an uneven shape. The uneven surface 1a of the hologram structure 11 has an uneven pattern corresponding to a Fourier transformed image of the original image, and has an unevenness depth corresponding to each pixel of the Fourier transformed image. For example, the hologram holder 10 illustrated in FIGS. 1 and 2 can be manufactured by forming a resin (for example, a UV-curable resin or a thermoplastic resin) for forming the hologram layer 1 on the substrate 4 (for example, polyethylene terephthalate (PET)) by coating or the like, performing a UV curing treatment or hot pressing treatment, and an unevenness forming treatment of pressing an uneven surface of an original plate, on the hologram layer 1, and then forming the reflection layer 2 (for example, Al, ZnS, or $TiO_2$) on the uneven surface 1a of the hologram layer 1. Note that, although not illustrated, other members such as a gluing material, an adhesive, and/or a heat seal layer may be further formed on the reflection layer 2.

When light is incident on such a hologram structure 11 from a point light source or a parallel light source, a light image (that is, an original image) corresponding to the uneven pattern of the uneven surface 1a is reproduced. This type of light modulation element does not require a screen or the like for projecting a light image and reproduces a light image with significantly high quality when light from a specific light source such as a point light source or a parallel light source is incident, and thus can be conveniently and widely used for design use, security use, or other uses. A light image that can be reproduced by such a light modulation element is not particularly limited, and for example, a letter, a symbol, a line drawing, a picture, a pattern, and a combination thereof can be used as an original image and a reproducible light image.

As described above, the hologram holder 10 illustrated in FIGS. 1 and 2 including the hologram structure 11 functioning as a light modulation element and the substrate 4 supporting the hologram structure 11 can suitably implement, for example, an information recording medium such as a passport. For example, it is possible to suitably use the hologram structure 11 for security use such as authenticity determination by designing the hologram structure 11 so that a light image reproduced by the hologram structure 11 indicates information based on at least one of a letter, a symbol, and a picture. Note that, in the hologram holder 10 illustrated in FIGS. 1 and 2, the substrate 4 that is transparent is used, but an opaque substrate may be used instead. In this case, for example, an opening portion 4a (see FIG. 2) having a predetermined size is formed in the substrate, and at least a part of the hologram structure 11 provided as the light modulation element is arranged at a position corresponding to the opening portion 4a, such that the hologram holder 10 can suitably implement an information recording medium such as a passport. Note that a hole (space) may be provided as the opening portion 4a, or only the opening portion 4a may be a transparent body (that is, a transparent substrate) provided together with a hole (space) or provided instead of a hole (space). Further, even in a case of using the transparent substrate 4, the hologram holder 10 may be configured so that light is basically transmitted only through the opening portion 4a in the substrate 4, by, for example, providing a printed body that hinders transmission of light at a portion other than the opening portion 4a in the substrate 4. Alternatively, an opening may be formed in an information recording medium such as a passport, and the hologram holder 10 may be arranged in the opening. In this case, a hole (space) and/or a transparent body may be provided in the opening of the information recording medium, a printed body that hinders transmission of light may be provided at a portion other than the opening of the information recording medium, and the information recording medium may be configured so that light is transmitted only through the opening in the information recording medium.

Figure 3:
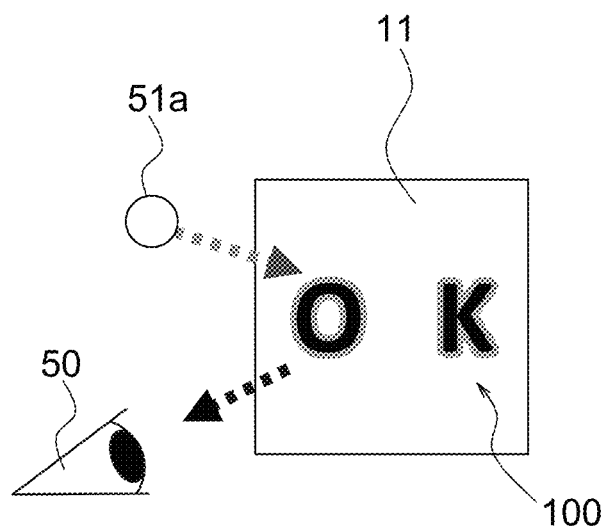
FIG. 3 is a conceptual diagram of a reflection type hologram structure.
Figure 4:
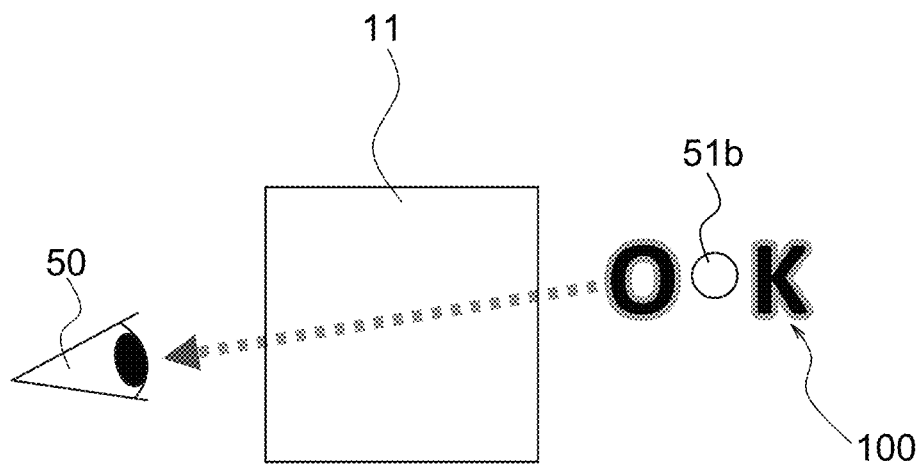
FIG. 4 is a conceptual diagram of a transmission type hologram structure.

The hologram structure 11 can be classified into a reflection type hologram structure in which an observer 50 and a light source 51a are present on the same side of the hologram structure 11 as illustrated in FIG. 3, and a transmission type hologram structure in which the observer 50 and a light source 51b are present on different sides while interposing the hologram structure 11 therebetween as illustrated in FIG. 4. Examples of the reflection type hologram structure include a structure in which an additional reflection layer is not provided and the uneven surface 1a of the hologram layer 1 is exposed to air to reflect the reproduction light by using a difference in refractive index between the hologram layer 1 such as a UV-curable resin, and the air, in addition to a structure in which an additional layer is provided to reflect the reproduction light, such as the reflection layer 2 illustrated in FIG. 2. On the other hand, such a reflection layer is not provided in the transmission type hologram structure. However, the reflection type hologram structure and the transmission type hologram structure are common in that the uneven surface 1a is formed in the hologram layer 1 and a desired light image is reproduced by a diffraction phenomenon caused by a light path length difference of the uneven surface 1a. Note that there is an optimum value for a specific unevenness depth of the uneven surface 1a in each of the transmission type hologram structure and the reflection type hologram structure. In the following, unless otherwise specified, the contents described for only one of the reflection type hologram structure and the transmission type hologram structure can be basically applied to both the reflection type hologram structure and the transmission type hologram structure.

Figure 5:
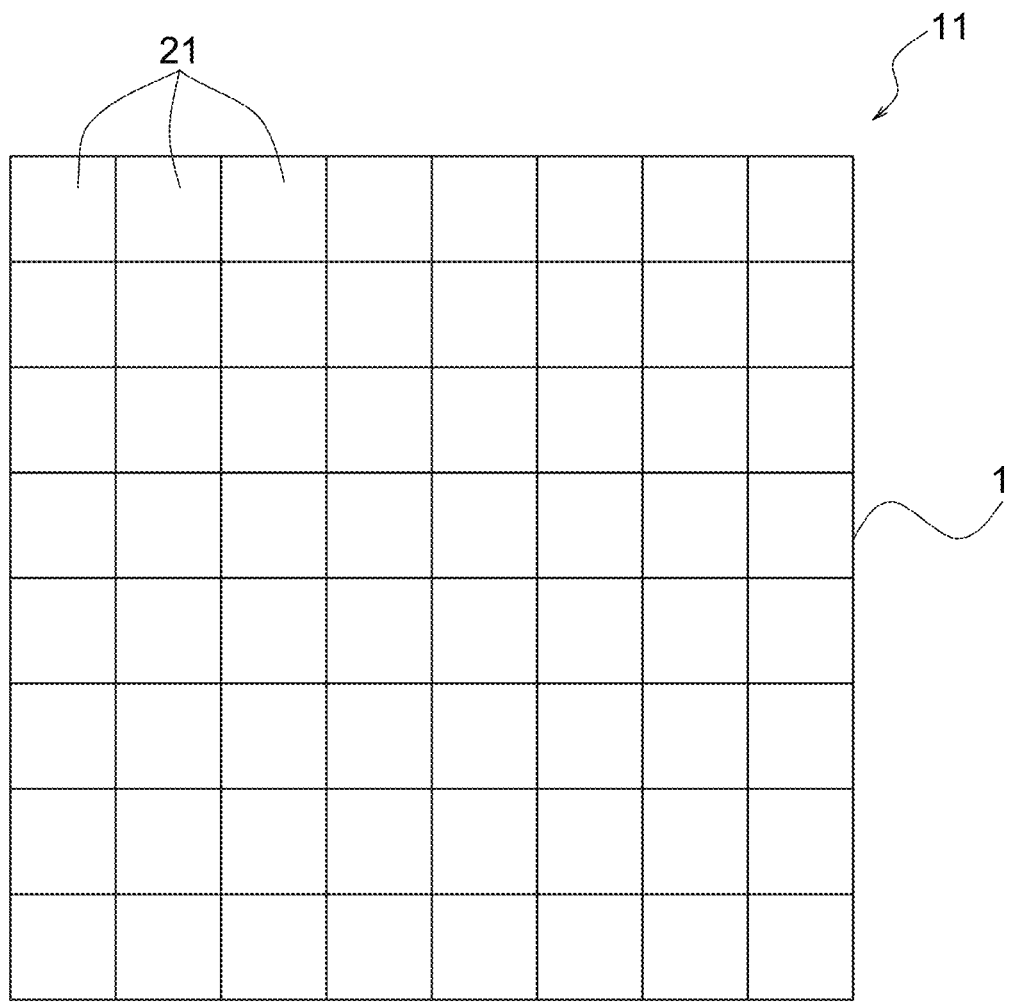
FIG. 5 is a conceptual diagram illustrating a plane structure of a hologram structure.

FIG. 5 is a conceptual diagram illustrating a plane structure of the hologram structure 11. The hologram structure 11 of the present embodiment includes a plurality of factor elements (also referred to as "hologram cells") 21 that are two-dimensionally and regularly arranged. Each factor element 21 has the above-mentioned uneven surface 1a, has a plane size of several nm to several mm square (for example, 2 mm square), and reproduces a light image by modulating a phase of incident reproduction light.

Figure 6:
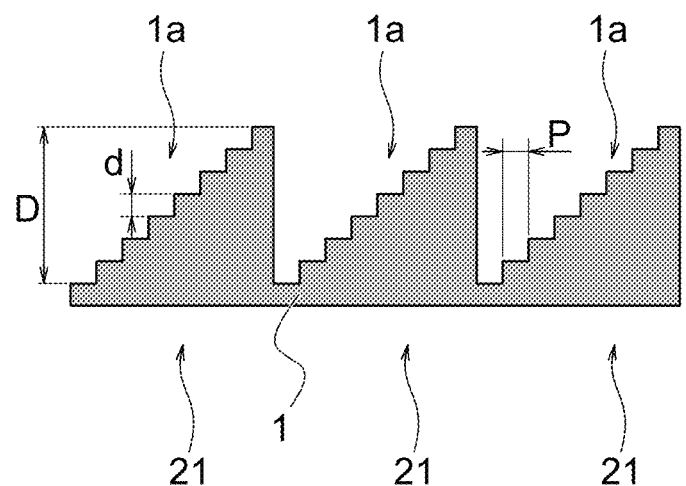
FIG. 6 is a cross-sectional view of factor elements schematically illustrating an example of a stepped structure of an uneven surface.
Figure 7:
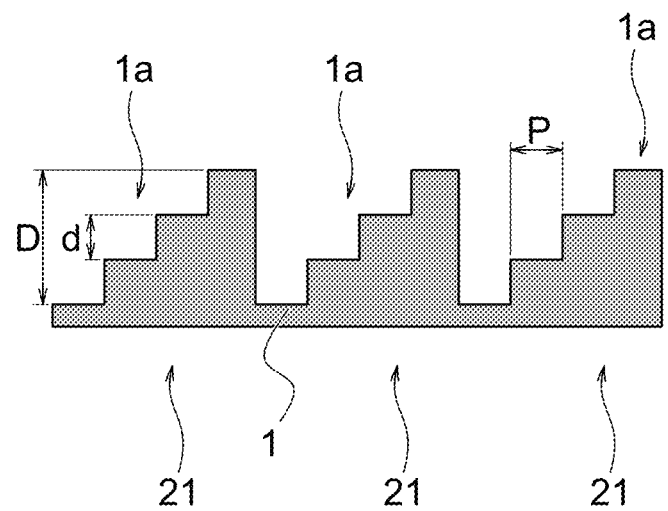
FIG. 7 is a cross-sectional view of factor elements schematically illustrating another example of a stepped structure of an uneven surface.

The uneven surface 1a has a multi-step shape (that is, two or more steps), and the number of steps of the uneven surface 1a is not particularly limited. In a case of reproducing a light image in a plurality of colors, the uneven surface 1a preferably has three or more steps, and in particular, in a case of using the uneven surface 1a having four or more steps, it is possible to reproduce an original image having a complicated composition with high definition. FIGS. 6 and 7 each are a cross-sectional view of the factor elements 21 schematically illustrating the step structure of the uneven surface 1a, FIG. 6 illustrates an eight-step type uneven surface 1a, and FIG. 7 illustrates a four-step type uneven surface 1a. Note that FIGS. 6 and 7 illustrate the factor elements 21 of which the uneven surfaces 1a have the same step shape, but the actual uneven surface 1a has a step shape corresponding to the reproduced light image (that is, the original image). Note that a pitch (that is, a pixel pitch (see Reference Sign "P" illustrated in FIGS. 6 and 7)) of an uneven pattern on the uneven surface 1a is preferably in a range of 0.1 μm to 80.0 μm from the viewpoint of accurately reproducing a light image, and in general, is preferably 1 μm or more.

Figure 8:
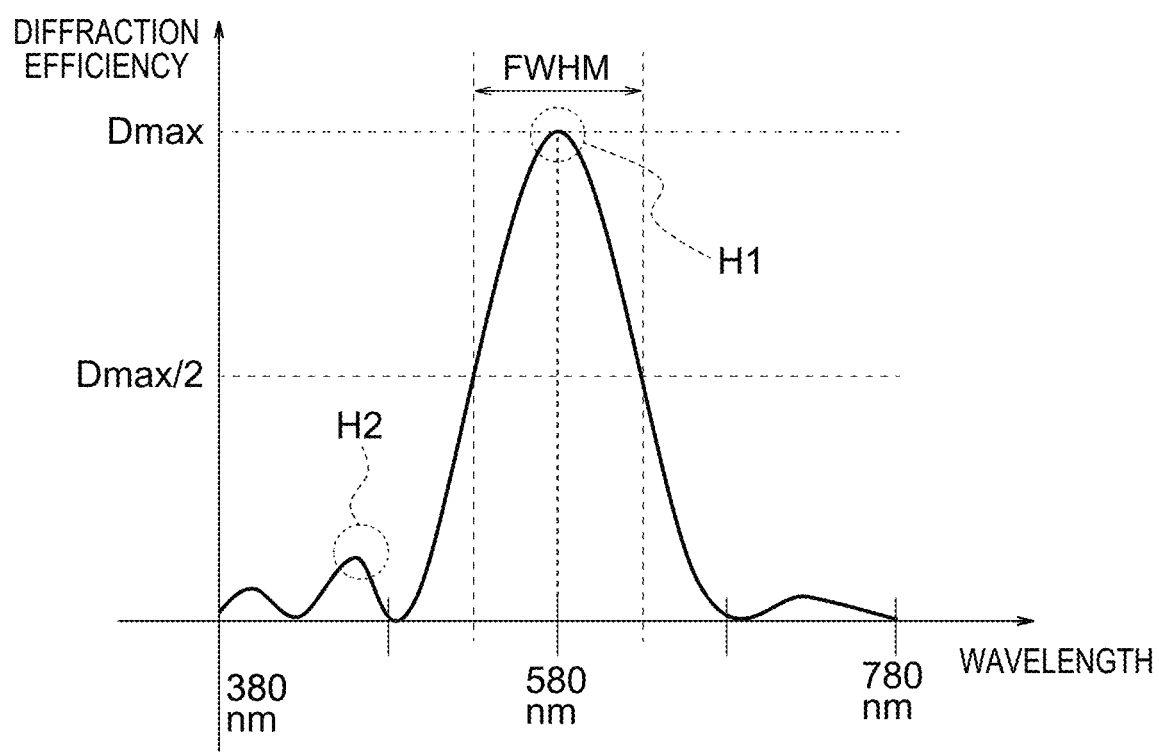
FIG. 8 is a graph illustrating an example of a relationship between wavelength distribution and diffraction efficiency of first-order diffracted light of each factor element.

FIG. 8 is a graph illustrating an example of a relationship between wavelength distribution and diffraction efficiency of first-order diffracted light for each factor element 21. In FIG. 8, a horizontal axis represents a wavelength, and a vertical axis represents diffraction efficiency. When the diffraction efficiency is represented by an amount obtained by dividing a radiant flux of light diffracted in a certain direction by a radiant flux of light incident on each factor element 21, the radiant flux of the diffracted light in a certain direction is represented by P, and the radiant flux of the incident light is represented by P0, the diffraction efficiency η is a dimensionless number represented by "η=P/P0". Each factor element 21 exhibits a specific diffraction efficiency according to a wavelength, and in the example illustrated in FIG. 8, in a case of the first-order diffracted light, light having a wavelength (see Reference Sign "H1" in FIG. 8) near 580 nm has a maximum diffraction efficiency Dmax. Note that although FIG. 8 illustrates an example of wavelength distribution of the first-order diffracted light, wavelength distribution of negative first-order diffracted light also shows a specific diffraction efficiency according to the wavelength and shows a maximum diffraction efficiency at a specific wavelength.

In the present embodiment, a maximum diffraction efficiency Dmax in a wavelength band of not less than 380 nm and not more than 780 nm in the wavelength distribution of the first-order diffracted light with respect to diffraction efficiency and the wavelength distribution of the negative first-order diffracted light with respect to diffraction efficiency for each factor element 21 has a local maximum value with a full width at half maximum FWHM of 200 nm or less in wavelength distribution with respect to diffraction efficiency having the maximum diffraction efficiency Dmax. The full width at half maximum FWHM here indicates a wavelength band (wavelength width) between positions each having a value (Dmax/2) that is half of the maximum diffraction efficiency Dmax in the wavelength distribution with respect to diffraction efficiency (see FIG. 8).

Since each factor element 21 has such a diffraction characteristic, light having a wavelength corresponding to the maximum diffraction efficiency Dmax and light having a wavelength in the vicinity thereof are more efficiently diffracted than light in other wavelength bands, and contribute to a reproduced image. Therefore, even in a case where white light including light having various wavelengths is incident on each factor element 21, each factor element 21 reproduces a light image with a color other than white by light having a wavelength corresponding to the maximum diffraction efficiency Dmax and light having a wavelength in the vicinity thereof. Therefore, even in a case where white light is incident on each factor element 21, it is possible to reproduce a light image in a specific color by adjusting the diffraction characteristic (particularly, the wavelength distribution of the first-order diffracted light and the wavelength distribution of the negative first-order diffracted light) of each factor element 21 so as to make the wavelength corresponding to the maximum diffraction efficiency Dmax correspond to the color of the reproduced image.

Note that the uneven surface 1a of each factor element 21 has a different height of three or more steps, and it is preferable that there is no other local maximum value of the diffraction efficiency that is half or more of the maximum diffraction efficiency in the wavelength band of not less than 380 nm and not more than 780 nm in the wavelength distribution of the first-order diffracted light with respect to diffraction efficiency and the wavelength distribution of the negative first-order diffracted light with respect to diffraction efficiency. That is, it is preferable that a local maximum value of the second highest diffraction efficiency (see Reference Sign "H2" in FIG. 8) in the wavelength band of not less than 380 nm and not more than 780 nm in the wavelength distribution of the first-order diffracted light with respect to diffraction efficiency and the wavelength distribution of the negative first-order diffracted light with respect to diffraction efficiency for each factor element 21 is less than half of the maximum diffraction efficiency Dmax. In this case, color bleeding or line thickening in the reproduced image can be effectively prevented, and thus the light image can be reproduced with high definition.

Figure 9:
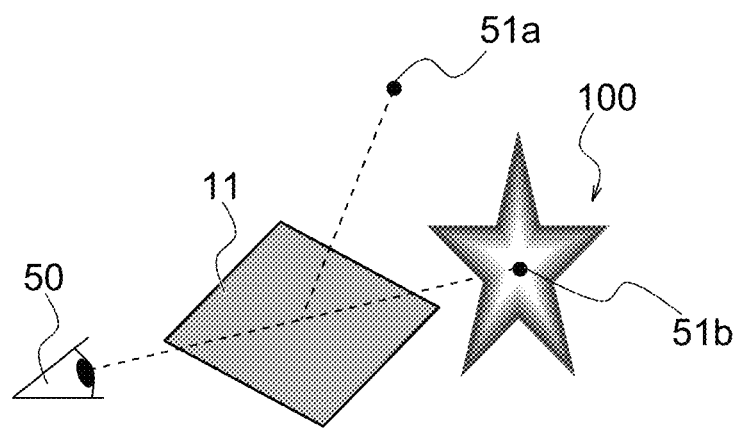
FIG. 9 is a schematic diagram for describing a light image reproduced by a hologram structure.
Figure 10:
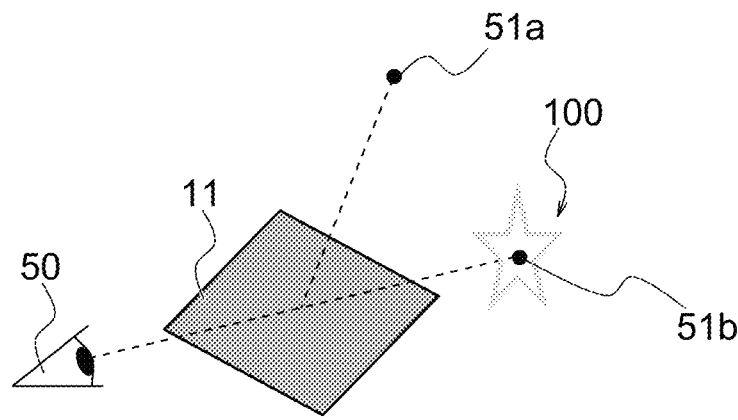
FIG. 10 is a schematic diagram for describing a light image reproduced by a hologram structure.
Figure 11:
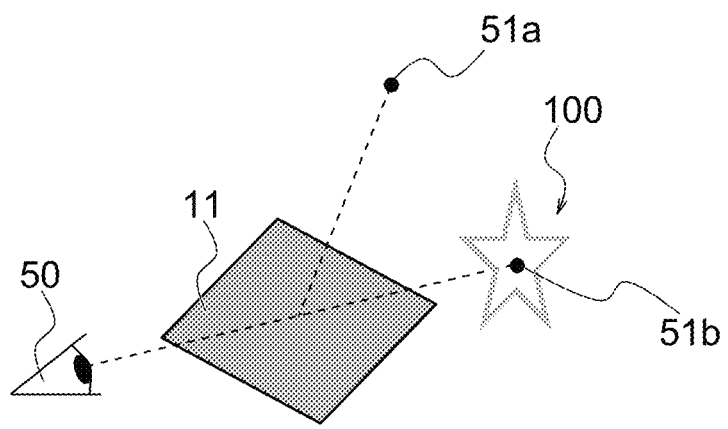
FIG. 11 is a schematic diagram for describing a light image reproduced by a hologram structure.
Figure 12:
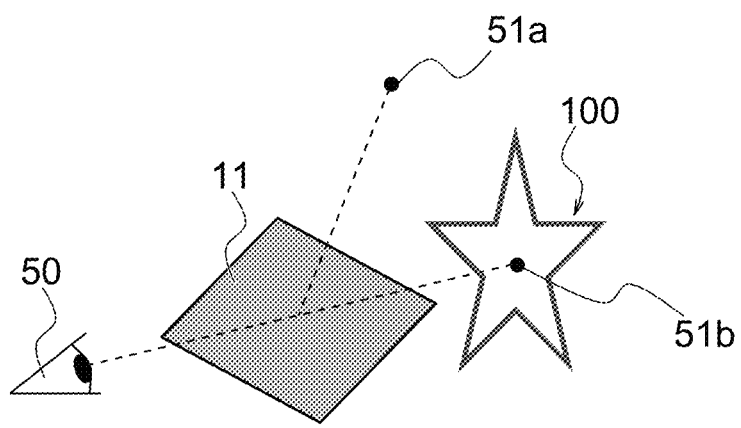
FIG. 12 is a schematic diagram for describing a light image reproduced by a hologram structure.

FIG. 9 is a schematic diagram for describing a light image 100 reproduced by the general hologram structure 11. FIGS. 10 to 12 are each a schematic diagram for describing the light image 100 reproduced by the hologram structure 11 of the 1-1-th embodiment. Note that, in each of FIGS. 9 to 12, a light source used in the reflection type hologram structure 11 is denoted by Reference Sign "51a", and a light source used in the transmission type hologram structure 11 is denoted by Reference Sign "51b". Further, in the following description, these light sources 51a and 51b are collectively denoted by Reference Sign "51".

In general, in the diffraction phenomenon, as the wavelength of the incident light increases, a diffraction angle of the diffracted light other than the 0th-order diffracted light increases. Therefore, when white light is incident, from the light source 51, on the general hologram structure 11 that exhibits substantially the same diffraction efficiency over the entire visible light wavelength band, the hologram structure 11 reproduces an iridescent light image 100 as illustrated in FIG. 9. On the other hand, when white light is incident, from the light source 51, on the hologram structure 11 of the present embodiment that exhibits the above-described maximum diffraction efficiency in the wavelength band of not less than 380 nm and not more than 780 nm, the hologram structure 11 reproduces a light image 100 in a single color illustrated in FIGS. 10 to 12. That is, the hologram structure 11 (especially, the uneven surface 1a) of the present embodiment has a diffraction structure optimized for light having a specific wavelength and light in a wavelength band in the vicinity of the specific wavelength, and a light image 100 with a specific color is reproduced by selectively using the light having the specific wavelength and the light in the wavelength band in the vicinity of the specific wavelength among light having various wavelengths. For example, the hologram structure 11 illustrated in FIG. 10 exhibits the maximum diffraction efficiency in a wavelength band corresponding to blue and reproduces a blue light image 100. The hologram structure 11 illustrated in FIG. 11 exhibits the maximum diffraction efficiency in a green wavelength band and reproduces a green light image 100. The hologram structure 11 illustrated in FIG. 12 exhibits the maximum diffraction efficiency in a red wavelength band and reproduces a red light image 100. Note that the light images 100 in FIGS. 10 to 12 are different in size from each other, but this difference is based on a difference in diffraction angle caused by a difference in wavelength of the light (that is, the first-order diffracted light and/or the negative first-order diffracted light) forming the light image 100.

As described above, the hologram structure 11 of the present embodiment can reproduce the light image 100 in a single color even in a case where white light is incident. The light image 100 reproduced in this way is a clear image with almost no blur resulting from chromatic dispersion. In addition, since the light image 100 can be reproduced in a specific color, it is possible to give the observer 50 a specific impression based on the color, for example, it is possible to reproduce the light image 100 with a color that matches a specific concept expressed by the light image 100 in terms of common belief to clearly express the concept represented by the light image 100 to the observer 50. Furthermore, since the hologram structure 11 is configured to reproduce the light image 100 in a single specific color, for example, in authenticity determination, not only a "picture" of the reproduced light image 100 but also a "color" of the light image 100 can be used, which enables highly reliable authenticity determination. In addition, the hologram structure 11 of the present embodiment does not require addition of a layer that selectively transmits or reflects light in a specific wavelength band, and thus manufacturing costs can be reduced and even when the observer 50 observes a surrounding area through the hologram structure 11, an observed image does not cause any discomfort.

[Method of Manufacturing Hologram Structure 11]

Next, an example of a method of manufacturing the hologram structure 11 (particularly, the uneven surface 1a) will be described. The method described below is merely an example, and another method capable of appropriately manufacturing the hologram structure 11 including the desired uneven surface 1a can be adopted. The manufacturing method described below is applicable to both the reflection type hologram structure 11 (see FIG. 3) and the transmission type hologram structure 11 (see FIG. 4).

First, a two-dimensional image of an original image is read by a computer (Step 1). Then, the computer obtains a two-dimensional complex amplitude image by converting each pixel value of the read two-dimensional image to an amplitude value and assigning, as a phase value, a random value between 0 and $2\pi$ to each pixel (Step 2). Then, the computer performs a two-dimensional Fourier transform of the two-dimensional complex amplitude image to obtain a two-dimensional Fourier transformed image (Step 3). Note that the computer may perform any optimization processing such as an iterative Fourier transform algorithm or a genetic algorithm as needed (Step 4). Then, the computer discretizes the phase value of each pixel of the two-dimensional Fourier transformed image into a plurality of stages (for example, four stages of "0", "$\pi/2$", "$\pi$" and "$3\pi/2$", or eight stages of "0", "$\pi/4$", "$\pi/2$", "$3\pi/4$", "$\pi$", "$5\pi/4$", "$3\pi/2$", and "$7\pi/4$") (Step 5).

Then, the hologram structure 11 (particularly, the uneven surface 1a) corresponding to the two-dimensional Fourier transformed image is produced so that each pixel has a depth corresponding to the corresponding discretized phase value (Step 6). For example, in a case where the pixel value of the two-dimensional Fourier transformed image is discretized into four stages in Step 5 described above, an uneven surface 1a (see FIG. 7) having a four-step depth is formed in the hologram layer 1 in Step 6. The depth of the uneven surface 1a is determined by a computer in view not only of the diffraction efficiency characteristic to be realized, but also of various other related parameters (for example, a refractive index of a material for forming the hologram structure 11 (particularly, the hologram layer 1)). For example, as the reflection type hologram structure 11 for reproducing a blue light image, a hologram structure 11 in which the number of steps of the uneven surface 1a is four and the uneven surface 1a has a light path length of 330 nm per step can be produced. Note that the reflection type hologram structure 11 and the transmission type hologram structure 11 each have a unique depth structure of the uneven surface 1a, and for example, even when the same diffraction characteristic is to be realized, a specific value of the depth of the uneven surface 1a of the hologram structure 11 differs between the reflection type and the transmission type.

A manufacturing apparatus for the hologram structure 11 is not particularly limited, and may be, for example, an apparatus controlled by the computer that executes Steps 1 to 5 described above, or may be an apparatus provided separately from the computer. Further, if necessary, a mother plate (that is, a master original plate) corresponding to the structure of the hologram structure 11 (particularly, the uneven surface 1a) may be formed by using an exposure apparatus or an electron beam lithography apparatus based on a photolithography technique (Step 7). For example, a liquid UV-curable resin is dropped on the mother plate, and ultraviolet rays are irradiated on the UV-curable resin sandwiched between a base film (for example, a polyethylene terephthalate film (PET film)) and the mother plate to cure the UV-curable resin, and then, the UV-curable resin is peeled off from the mother plate together with the base film, whereby the hologram structure 11 having a desired uneven surface 1a can be produced. As other methods, for example, a method using a thermoplastic UV-curable resin, a method using a thermoplastic resin, a method using a thermosetting resin, and a method using an ionizing radiation curable resin may be adopted. By using the mother plate in this way, the hologram structure 11 having the desired uneven surface 1a can be copied easily and in large quantities.

In a case of the reflection type hologram structure 11, the reflection layer 2 (for example, a reflection layer formed of Al or a reflection layer formed of ZnS or $TiO_2$ (high refractive index layer)) may be further formed on the uneven surface 1a by the manufacturing apparatus. However, in a case of the hologram structure 11 that reflects the reproduction light using the difference in refractive index between the hologram layer 1 and the air, the reflection layer 2 may not be additionally provided and the uneven surface 1a of the hologram layer 1 may be left exposed to the air. Further, if necessary, another functional layer (for example, a heat seal layer or a primer layer for increasing the adhesion between adjacent layers) such as an adhesive layer may be formed on the hologram layer 1. Further, for example, in a case where the reflection layer 2 is formed on the uneven surface 1a of the hologram layer 1, an adhesive layer may be formed on a surface (which is opposite to a surface facing the hologram layer 1) of the reflection layer 2 having the uneven shape, such that a concave portion of the surface of the reflection layer 2 is filled with the adhesive layer.

[Depth of Uneven Surface]

As an example, in the reflection type hologram structure 11, in a case where a refractive index of the hologram layer 1 is 1.5, and a depth per step (see Reference Sign "d" in FIGS. 6 and 7) of the uneven surface 1a is 110 nm, a light path length per step of the uneven surface 1a is 330 nm. In this case, since the uneven surface 1a has a four-step depth structure, the hologram structure 11 exhibits the above-described maximum diffraction efficiency in the blue wavelength band, and reproduces a blue light image.

As another example, in the reflection type hologram structure 11, in a case where a refractive index of the hologram layer 1 is 1.5, the uneven surface 1a has an eight-step depth structure, and a depth per step of the uneven surface 1a is 130 nm, the hologram structure 11 reproduces a blue light image. Further, in the transmission type hologram structure 11, in a case where a refractive index of the hologram layer 1 is 1.5, the uneven surface 1a has a four-step depth structure, and a depth per step of the uneven surface 1a is 660 nm, the hologram structure 11 reproduces a blue light image. Further, in the reflection type hologram structure 11, in a case where a refractive index of the hologram layer 1 is 1.5, the uneven surface 1a has the eight-step depth structure, and a depth per step of the uneven surface 1a is 230 nm, the hologram structure 11 reproduces a red light image. Further, in the reflection type hologram structure 11, in a case where a refractive index of the hologram layer 1 is 1.5, the uneven surface 1a has a six-step depth structure, and a depth per step of the uneven surface 1a is 220 nm, the hologram structure 11 reproduces a green light image.

Note that the color (wavelength band) of the light image reproduced by the transmission type hologram structure 11 is under the assumption that the transmission type hologram structure 11 is used in an air environment having a refractive index of 1.0. Further, when the observer observes the light image 100 reproduced by the reflection type hologram structure 11, the uneven surface 1a of the hologram layer 1 is arranged on a side opposite to a side that the observer faces, and the observer observes an uneven structure (that is, the uneven surface 1a) through the hologram layer 1. Note that when the uneven surface 1a of the hologram layer 1 is arranged on the same side as that the observer faces, a reflection image of the hologram structure 11 observed by the observer is formed by light reflected by the surface without passing through the hologram layer 1. For example, in a case where the uneven surface 1a is formed on the surface of a card type hologram holder 10, the observer observes light reflected by the uneven surface 1a without passing through the hologram layer 1. In such a case, it is necessary to set a depth per step of the uneven surface 1a with a light path length based on a refractive index of a medium that is more adjacent to the observer than the hologram layer 1 is, for example, a refractive index of 1.0 of air, rather than a refractive index of the hologram layer 1. Therefore, the observer can observe a desired image by designing the structure of the uneven surface 1a while assuming that the refractive index of the hologram layer 1 (hologram structure 11) is the refractive index of air, that is, 1.0. Specifically, in a case where the refractive index of air is 1.0 and the depth per step of the uneven surface 1a is 165 nm, the light path length per step of the uneven surface 1a is 330 nm. In this case, since the uneven surface 1a has the four-step depth structure, the hologram structure 11 exhibits the maximum diffraction efficiency in the blue wavelength band, and reproduces a blue light image.

[Relationship Between Depth of Uneven Surface and Peak Wavelength of Diffracted Light]

When the number of steps of the uneven surface 1a of the hologram structure 11 is represented by N, a light path length modulated per step of the uneven surface 1a is represented by l, and a natural number is represented by m, a peak wavelength λ of the diffracted light is represented by the following equation.

$$\lambda = N \cdot l / (mN \pm 1)$$

As described above, the hologram structure 11 of the present embodiment can reproduce a light image in a single color even in a case where white light is incident. This can be realized, for example, when any one of the first-order diffracted light and the negative first-order diffracted light of the hologram structure 11 has only one peak wavelength λ in the visible light wavelength band for an arbitrary natural number m. For example, when the light path length l is 330 nm and the number N of steps of the uneven surface 1a is four, $\lambda=1320/(4m\pm1)$. Therefore, $\lambda=440$ nm and 264 nm when m=1, $\lambda=188$ nm and 146 nm when m=2, and $\lambda=120$ nm and 101 nm when m=3. When m is 4 or more, the peak wavelength $\lambda$ has a smaller value. Among these, the peak wavelength $\lambda$ included in the visible light wavelength band is only 440 nm ($\lambda=440$ nm) when m=1. Therefore, when the hologram structure 11 in which the number N of steps of the uneven surface 1a is four (N=4) and the light path length per step is 330 nm (l=330 nm) is used, a light image with a single color that is visible to the observer 50 can be reproduced with light having the wavelength of 440 nm and light having a wavelength in the vicinity thereof.

Modified Example 1-1

In a hologram structure 11 of the present modified example, a combination of a plurality of types of factor elements 21 between which a wavelength showing the maximum diffraction efficiency in the wavelength band of not less than 380 nm and not more than 780 nm is different is provided, and a light image can be reproduced in a plurality of colors in a case where white light is incident. That is, in a case where the hologram structure 11 includes at least two types of factor elements 21, and a wavelength (particularly, a wavelength in the visible light wavelength band (especially, the wavelength band of not less than 380 nm and not more than 780 nm)) showing the maximum diffraction efficiency is different between the at least two types of factor elements 21, a light image can be reproduced in a color corresponding to the wavelength showing the maximum diffraction efficiency for each type of factor element 21.

Figure 13:
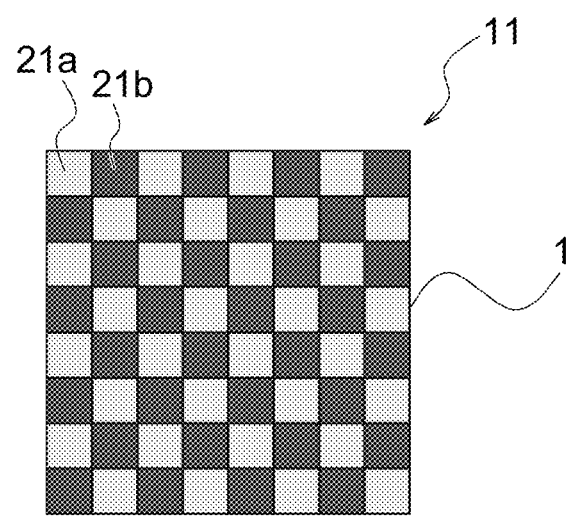
FIG. 13 is a conceptual diagram illustrating an example of a plane structure of a transmission type hologram structure according to Modified Example 1-1 of a first exemplary embodiment.
Figure 14:
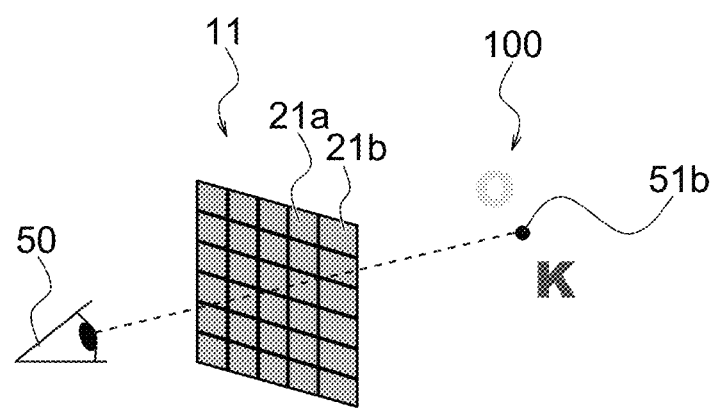
FIG. 14 is a schematic diagram for describing a light image reproduced by the transmission type hologram structure of FIG. 13.

FIG. 13 is a conceptual diagram illustrating an example of a plane structure of the transmission type hologram structure 11 according to Modified Example 1-1. FIG. 14 is a schematic diagram for describing a light image 100 reproduced by the transmission type hologram structure 11 of FIG. 13. The hologram structure 11 illustrated in FIGS. 13 and 14 includes a plurality of first factor elements 21a and a plurality of second factor elements 21b arranged in a checkerboard pattern. For example, the plurality of first factor elements 21a each have an uneven surface 1a (that is, the maximum diffraction efficiency described above) that enables reproduction of a light image 100 of a blue letter "O", and the plurality of second factor elements 21b each have an uneven surface 1a that enables reproduction of a light image 100 of a red letter "K". In this case, when white light is incident on the hologram structure 11, the hologram structure 11 reproduces blue "O" and red "K" as illustrated in FIG. 14. As described above, the hologram structure 11 of the present modified example can visibly reproduce the two types of light images 100 each having a single color. Note that, in the example illustrated in FIG. 14, the first factor element 21a and the second factor element 21b each reproduce an independent light image 100, and the light image reproduced by the first factor element 21a and the light image reproduced by the second factor element 21b may be at least partially superimposed. In this case, a light image of the superimposed portion has a color in which the color of the light image reproduced by the first factor element 21a and the color of the light image reproduced by the second factor element 21b are mixed.

Figure 15:
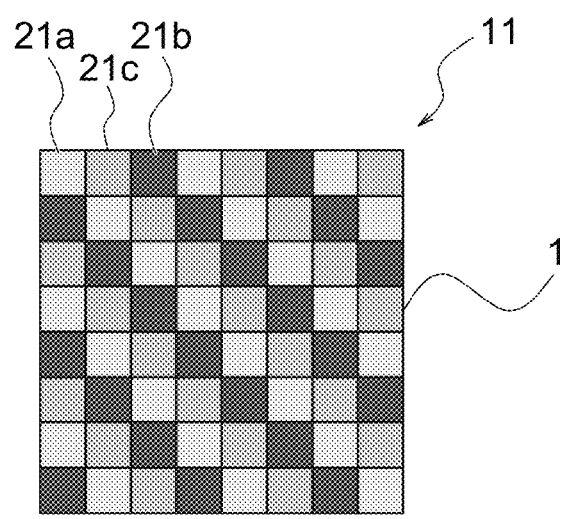
FIG. 15 is a conceptual diagram illustrating another example of the plane structure of the transmission type hologram structure according to Modified Example 1-1 of the first exemplary embodiment.
Figure 16:
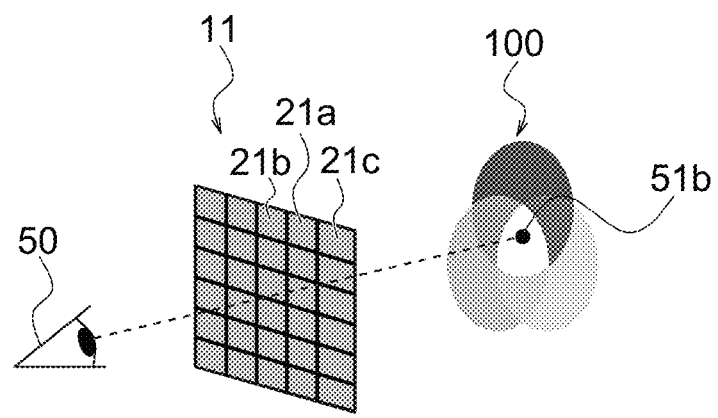
FIG. 16 is a schematic diagram for describing a light image reproduced by the transmission type hologram structure of FIG. 15.

FIG. 15 is a conceptual diagram illustrating another example of a plane structure of the transmission type hologram structure 11 according to Modified Example 1-1. FIG. 16 is a schematic diagram for describing a light image 100 reproduced by the transmission type hologram structure 11 of FIG. 15. The hologram structure 11 illustrated in FIGS. 15 and 16 includes a plurality of first factor elements 21a, a plurality of second factor elements 21b, and a plurality of third factor elements 21c arranged in a checkerboard pattern. For example, the plurality of first factor elements 21a each have an uneven surface 1a (that is, the maximum diffraction efficiency described above) that enables reproduction of a blue light image 100, the plurality of second factor elements 21b each have an uneven surface 1a that enables reproduction of a red light image 100, and the plurality of third factor elements 21c each have an uneven surface 1a that enables reproduction of a green light image 100. In this case, the hologram structure 11 can reproduce not only the red, blue, and green light images 100, but also light images 100 with other colors by superimposing two or more of these light images 100. For example, as illustrated in FIG. 16, by superimposing and reproducing a light image 100 of a red circle, a light image 100 of a green circle, and a light image 100 of blue circle, a portion where the red circle and the green circle are superimposed becomes a yellow light image 100, a portion where the green circle and the blue circle are superimposed becomes a pale blue light image 100, a portion where the blue circle and the red circle are superimposed becomes a purple light image 100, and a portion where the red circle, the green circle, and the blue circle are superimposed becomes a white light image 100.

Figure 17:
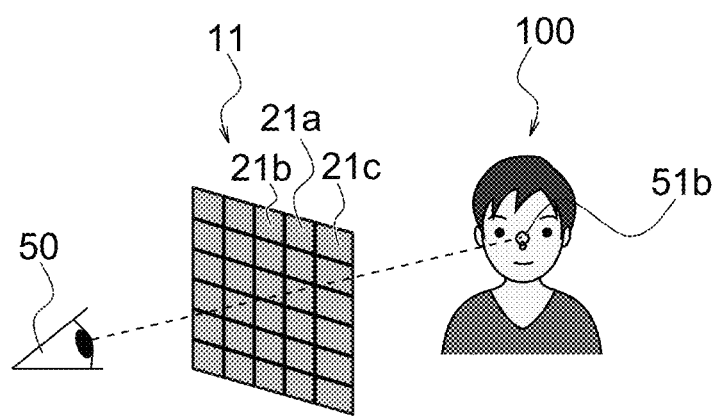
FIG. 17 is a schematic diagram for describing a light image reproduced by another example of the transmission type hologram structure according to Modified Example 1-1 of the first exemplary embodiment.

FIG. 17 is a schematic diagram for describing a light image 100 reproduced by another example of the transmission type hologram structure 11 according to Modified Example 1-1. Each factor element 21 can also reproduce a light image with a color having an arbitrary gradation, and each of the first factor elements 21a that reproduce a red light image, the second factor elements 21b that reproduce a blue light image, and the third factor elements 21c that reproduce a green light image can include a plurality of types of factor elements having different gradations. Even in a case where each factor element 21 is designed based on an original image having an arbitrary gradation, a light image can be reproduced in a color having an arbitrary gradation. In these cases, the hologram structure 11 can also reproduce a full-color light image 100 as illustrated in FIG. 17 in a case where white light is incident.

Note that, in the hologram structures 11 illustrated in FIGS. 13 and 15 described above, the types of the factor elements 21 arranged adjacent to each other in both the vertical direction and the horizontal direction are different from each other, but an arrangement mode of the plurality of types of factor elements 21 is not particularly limited. For example, the hologram structure 11 may include a plurality of types of factor elements 21 arranged in a stripe shape, and the types of the factor elements 21 arranged adjacent to each other in one of the vertical direction and the horizontal direction may be different from each other and the types of the factor elements 21 arranged adjacent to each other in the other one of the vertical direction and the horizontal direction may be the same as each other. In addition, a plurality of types of factor elements 21 may be arranged according to an arrangement mode in which the above-described arrangement in the checkerboard pattern and the arrangement in the stripe shape are combined.

Modified Example 1-2

In the hologram structure 11, different types of factor elements 21 may be arranged in different regions, and a wavelength showing the maximum diffraction efficiency of the first-order diffracted light and/or the negative first-order diffracted light in the wavelength band of not less than 380 nm and not more than 780 nm may be different between the different types of factor elements 21. Meanwhile, light images reproduced by different types of factor elements 21 arranged in different regions may have shape similarity. Examples of the light images having shape similarity here include pairs of light images having the same or almost the same shape visually, and the sizes of these light images may be the same as each other or may be different from each other. In addition, examples of the light images having the shape similarity also include a pair of light images that form a picture, a letter, or the like with a specific intention by being combined with each other. For example, the hologram structures 11 illustrated in FIGS. 13 to 17 can reproduce one picture, letter, or the like as a light image without relatively moving the hologram structure 11 with respect to the observer. Meanwhile, in a case of a hologram structure 11 illustrated in FIGS. 18A and 18B and a hologram structure 11 illustrated in FIGS. 19A and 19B described below, the "light images having shape similarity" can be formed by continuously relatively reciprocating the hologram structure 11 with respect to the observer and by combining an afterimage of a light image reproduced by factor elements 21 in a first region 25 and an afterimage of a light image reproduced by factor elements 21 in a second region 26.

Figure 18A:
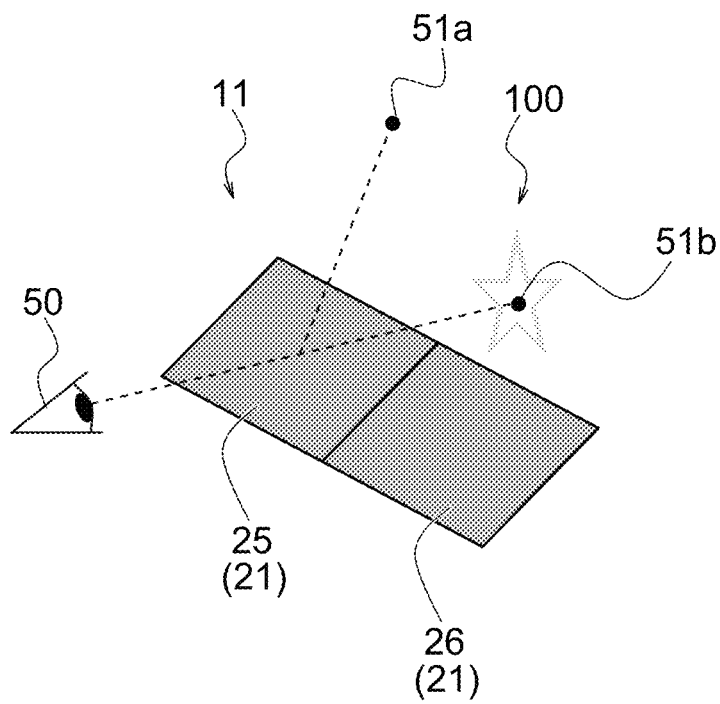
FIG. 18A is a schematic diagram for describing a light image reproduced by an example of a hologram structure according to Modified Example 1-2 of the first exemplary embodiment, and illustrates a light image reproduced through a first region.
Figure 18B:
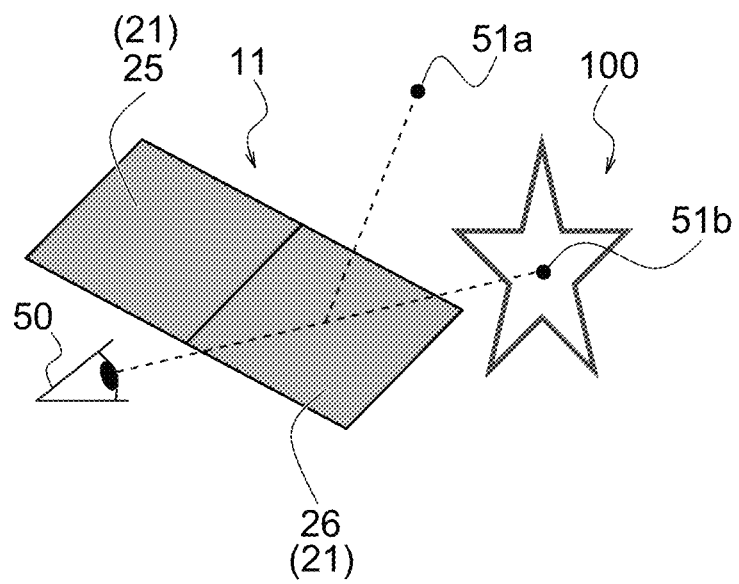
FIG. 18B illustrates a light image reproduced through a second region of the hologram structure of FIG. 18A.

FIG. 18A is a schematic diagram for describing a light image 100 reproduced by an example of the hologram structure 11 according to Modified Example 1-2, and illustrates a light image 100 reproduced through the first region 25. FIG. 18B illustrates a light image 100 reproduced through the second region 26 of the hologram structure 11 of FIG. 18A. The hologram structure 11 of FIGS. 18A and 18B includes the first region 25 and the second region 26. In the first region 25, a plurality of factor elements 21 including at least a first type factor element are arranged, and in the second region 26, a plurality of factor elements 21 including at least a second type factor element are arranged. In the wavelength band of not less than 380 nm and not more than 780 nm, the wavelength showing the maximum diffraction efficiency for the first type factor element is different from the wavelength showing the maximum diffraction efficiency for the second type factor element. In the hologram structure 11 illustrated in FIGS. 18A and 18B, the first type factor element 21 in which the wavelength showing the maximum diffraction efficiency is included in the blue wavelength band is arranged in the first region 25, and the second type factor element 21 in which the wavelength showing the maximum diffraction efficiency is included in the red wavelength band is arranged in the second region 26. Further, a light image 100 reproduced by the plurality of factor elements 21 arranged in the first region 25 and a light image 100 reproduced by the plurality of factor elements 21 arranged in the second region 26 have shape similarity. Specifically, the light images 100 having the same star shape and different colors are reproduced by the factor elements 21 in the first region 25 and the factor elements 21 in the second region 26.

Figure 19A:
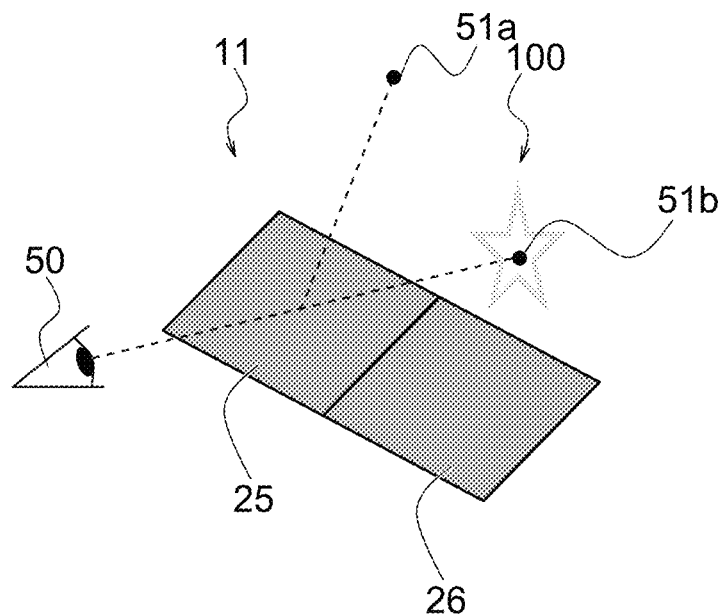
FIG. 19A is a schematic diagram for describing a light image reproduced by another example of the hologram structure according to Modified Example 1-2 of the first exemplary embodiment, and illustrates a light image reproduced through the first region.
Figure 19B:
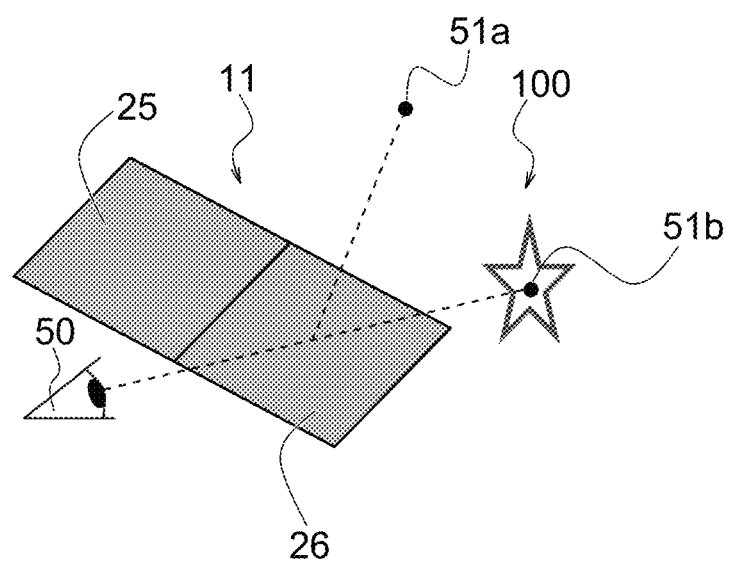
FIG. 19B illustrates a light image reproduced through the second region of the hologram structure of FIG. 19A.

FIG. 19A is a schematic diagram for describing a light image 100 reproduced by another example of the hologram structure 11 according to Modified Example 1-2, and illustrates a light image 100 reproduced through the first region 25. FIG. 19B illustrates a light image 100 reproduced through the second region 26 of the hologram structure 11 of FIG. 19A. The hologram structure 11 of FIGS. 19A and 19B has substantially the same structure as the hologram structure 11 of FIGS. 18A and 18B. However, in the hologram structure 11 of FIGS. 18A and 18B, the light image 100 reproduced by the factor elements 21 in the first region 25 and the light image 100 reproduced by the factor elements 21 in the second region 26 have different sizes, whereas, in the hologram structure 11 of FIGS. 19A and 19B, the light image 100 reproduced by factor elements 21 in the first region 25 and the light image 100 reproduced by factor elements 21 in the second region 26 have substantially the same size.

In a case where an uneven surface 1a of the factor element 21 in the first region 25 and an uneven surface 1a of the factor element 21 in the second region 26 are produced based on original images having the same size, a size of the reproduced light image 100 is different between the first region 25 and the second region 26 depending on a difference in wavelength (color) of the diffracted light (see FIGS. 18A and 18B). On the other hand, it is possible to make the light image 100 reproduced by the factor elements 21 in the first region 25 and the light image 100 reproduced by the factor elements 21 in the second region 26 have substantially the same size as illustrated in FIGS. 19A and 19B by producing the factor elements 21 in the first region 25 and the factor elements 21 in the second region 26 in consideration of a difference in size of the light image 100 based on the difference in wavelength of the diffracted light. Specifically, it is possible to make the light image 100 reproduced through the first region 25 and the light image 100 reproduced through the second region 26 have substantially the same size by changing the size of the original image used when designing the factor elements 21 in the first region 25 to be different from the size of the original image used when designing the factor elements 21 in the second region 26. Further, since a diffraction angle can be changed according to the size of the pixel of each factor element 21, it is possible to make the light image 100 reproduced through the first region 25 and the light image 100 reproduced through the second region 26 have substantially the same size by changing the size of each pixel constituting the factor element 21 to be different between the first region 25 and the second region 26.

As described above, in the hologram structures 11 of the present modified example, as illustrated in FIG. 18A, FIG. 18B, FIG. 19A and FIG. 19B, the first region 25 and the second region 26 through which the light images 100 having shape similarity and different colors are reproduced, respectively, are provided side by side. The observer 50 can recognize a change in color of the light image 100 while recognizing the sameness of shape of the light images 100 by continuously and repeatedly performing observation of the light image 100 through the first region 25 and observation of the light image 100 through the second region 26 while moving the hologram structure 11. Such a hologram structure 11 can be used for design use, and is particularly suitable for security use such as authenticity determination. The observer 50 can easily and accurately determine authenticity of the hologram holder 10 (see FIG. 1) by checking, with white light, the presence or absence of the sameness of shape of the light images 100 and the presence or absence of a change in color of the light image 100. In particular, with the hologram structure 11 illustrated in FIGS. 19A and 19B, it is possible to check not only the change in color of the light image 100 and the sameness of shape of the light images 100, but also whether or not the light images 100 have the same size, and thus it is possible to perform highly accurate authenticity determination.

1-2-th Embodiment

In the present embodiment, the same or similar elements as those in the 1-1-th embodiment and the modified examples thereof are denoted by the same reference signs, and a detailed description thereof will be omitted. In addition, among the description items related to the 1-1-th embodiment and the modified examples thereof, a detailed description of items that can be similarly applied to a hologram structure 11 of the present embodiment will be omitted.

A hologram holder 10 and the hologram structure 11 according to the present embodiment have the same configurations as those of the 1-1-th embodiment, and it is sufficient that the hologram structure 11 includes factor elements 21 and an uneven surface 1a as illustrated in FIGS. 1, 2, and 5 to 7, and may be a reflection type (see FIG. 3) or a transmission type (see FIG. 4). Further, a maximum diffraction efficiency in the wavelength band of not less than 380 nm and not more than 780 nm in wavelength distribution of first-order diffracted light with respect to diffraction efficiency and wavelength distribution of negative first-order diffracted light with respect to diffraction efficiency for each factor element 21 of the hologram structure 11 has a local maximum value with a full width at half maximum of 200 nm or less in wavelength distribution with respect to diffraction efficiency having the maximum diffraction efficiency.

In the hologram structure 11 according to one mode of the present embodiment, the maximum diffraction efficiency described above is shown in one of the wavelength distribution of the first-order diffracted light with respect to diffraction efficiency and the wavelength distribution of the negative first-order diffracted light with respect to diffraction efficiency. In addition, a maximum diffraction efficiency in the wavelength band of not less than 380 nm and not more than 780 nm in the other one of the wavelength distribution of the first-order diffracted light with respect to diffraction efficiency and the wavelength distribution of the negative first-order diffracted light with respect to diffraction efficiency has a local maximum value with a full width at half maximum of 200 nm or less in the other wavelength distribution with respect to diffraction efficiency. Further, in the hologram structure 11 according to another mode of the present embodiment, the maximum diffraction efficiency described above is shown in both of the wavelength distribution of the first-order diffracted light with respect to diffraction efficiency and the wavelength distribution of the negative first-order diffracted light with respect to diffraction efficiency. That is, in the hologram structure 11 according to the another mode, the maximum diffraction efficiency in the wavelength band of not less than 380 nm and not more than 780 nm in the wavelength distribution of the first-order diffracted light with respect to diffraction efficiency and the maximum diffraction efficiency in the wavelength band of not less than 380 nm and not more than 780 nm in the wavelength distribution of the negative first-order diffracted light with respect to diffraction efficiency are equal to each other. In a case where white light is incident, the hologram structure 11 according to these modes can reproduce a first light image and a second light image with colors other than white with the first-order diffracted light and the negative first-order diffracted light.

Note that, in the hologram structure 11 of the present embodiment, it is preferable that a difference between the wavelength showing the maximum diffraction efficiency in the wavelength band of not less than 380 nm and not more than 780 nm in one of the wavelength distribution of the first-order diffracted light with respect to diffraction efficiency and the wavelength distribution of the negative first-order diffracted light with respect to diffraction efficiency and the wavelength showing the maximum diffraction efficiency in the wavelength band of not less than 380 nm and not more than 780 nm in the other one of the wavelength distribution of the first-order diffracted light with respect to diffraction efficiency and the wavelength distribution of the negative first-order diffracted light with respect to diffraction efficiency is 100 nm or less. In this case, in the wavelength band of not less than 380 nm and not more than 780 nm, the wavelength showing the maximum diffraction efficiency of the first-order diffracted light and the wavelength showing the maximum diffraction efficiency of the negative first-order diffracted light are significantly close to each other, and the color of the light image reproduced with the first-order diffracted light and the color of the light image reproduced with the negative first-order diffracted light are included in the same color system or significantly similar color systems.

Note that it is preferable that there is no other local maximum value of the diffraction efficiency that is half or more of the maximum diffraction efficiency in one of the wavelength distribution of the first-order diffracted light with respect to diffraction efficiency and the wavelength distribution of the negative first-order diffracted light with respect to diffraction efficiency, in the wavelength band of not less than 380 nm and not more than 780 nm in the one wavelength distribution with respect to diffraction efficiency. That is, it is preferable that a local maximum value of the second highest diffraction efficiency in the wavelength band of not less than 380 nm and not more than 780 nm in one of the wavelength distribution of the first-order diffracted light with respect to diffraction efficiency and the wavelength distribution of the negative first-order diffracted light with respect to diffraction efficiency is less than half of the maximum diffraction efficiency in the wavelength band of not less than 380 nm and not more than 780 nm in one of the wavelength distribution of the first-order diffracted light with respect to diffraction efficiency and the wavelength distribution of the negative first-order diffracted light with respect to diffraction efficiency. Further, it is preferable that there is no other local maximum value of the diffraction efficiency that is half or more of the maximum diffraction efficiency in the other one of the wavelength distribution of the first-order diffracted light with respect to diffraction efficiency and the wavelength distribution of the negative first-order diffracted light with respect to diffraction efficiency, in the wavelength band of not less than 380 nm and not more than 780 nm in the other one wavelength distribution with respect to diffraction efficiency. That is, it is preferable that a local maximum value of the second highest diffraction efficiency in the wavelength band of not less than 380 nm and not more than 780 nm in the other one of the wavelength distribution of the first-order diffracted light with respect to diffraction efficiency and the wavelength distribution of the negative first-order diffracted light with respect to diffraction efficiency is less than half of the maximum diffraction efficiency in the wavelength band of not less than 380 nm and not more than 780 nm in the other one of the wavelength distribution of the first-order diffracted light with respect to diffraction efficiency and the wavelength distribution of the negative first-order diffracted light with respect to diffraction efficiency.

The hologram structure 11 that satisfies these conditions can reproduce the first light image and the second light image with high definition and different colors by effectively preventing color bleeding (color change) or line thickening.

Hereinafter, a specific example of the light image 100 reproduced by the hologram structure 11 of the present embodiment will be described. Note that, in the following description, the "maximum diffraction efficiency" refers to a maximum diffraction efficiency in the wavelength band of not less than 380 nm and not more than 780 nm included in the visible light wavelength band.

Figure 20:
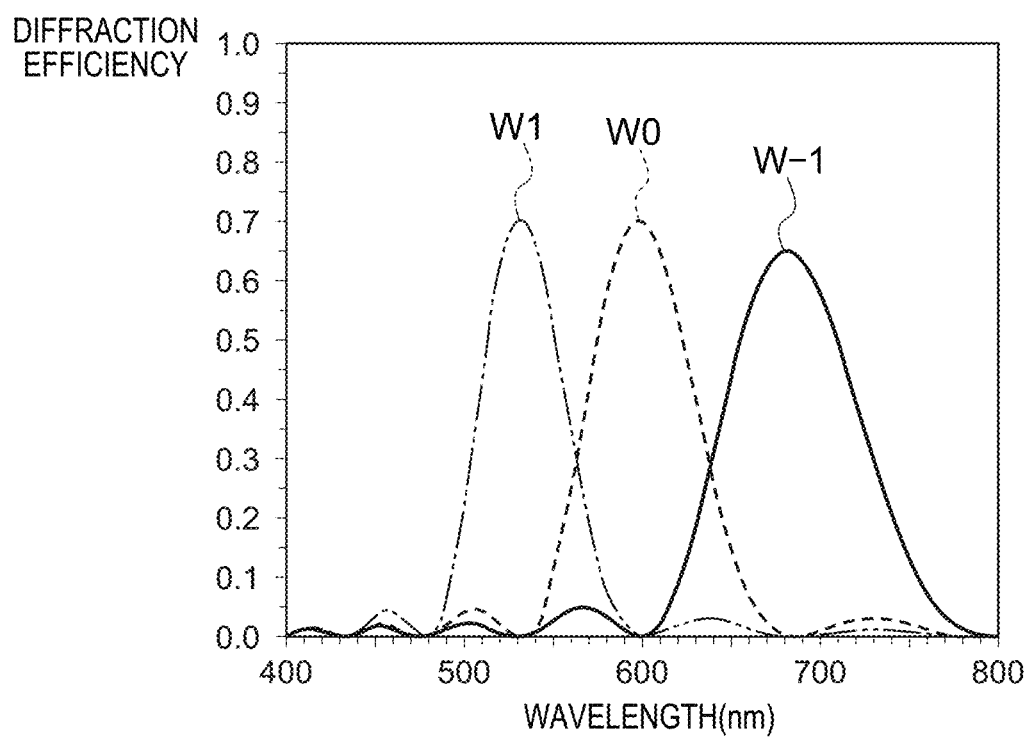
FIG. 20 is a graph illustrating wavelength distribution of each of 0th-order diffracted light (W0), first-order diffracted light (W1), and negative first-order diffracted light (W-1) in a case of an example of a reflection type hologram structure according to a 1-2-th embodiment of the first exemplary embodiment.
Figure 21:
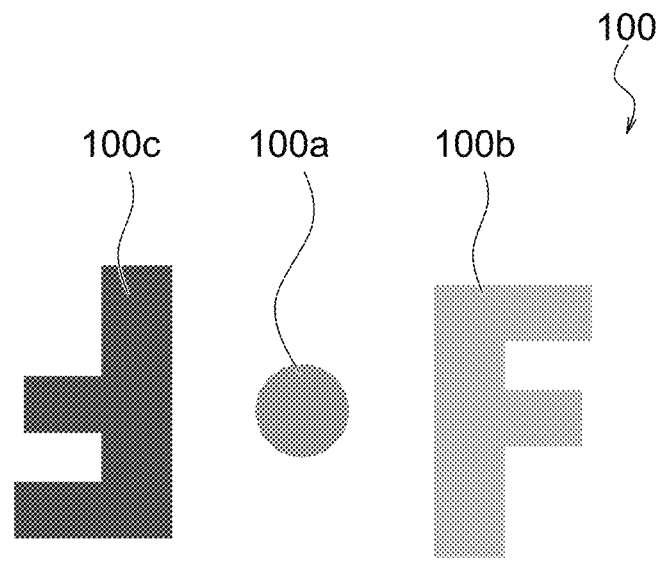
FIG. 21 illustrates an example of a light image reproduced by a hologram structure having the characteristics illustrated in FIG. 20.

FIG. 20 is a graph illustrating wavelength distribution of each of 0th-order diffracted light, first-order diffracted light, and negative first-order diffracted light in a case of an example of the reflection type hologram structure 11 according to the 1-2-th embodiment, and a horizontal axis represents a wavelength and a vertical axis represents diffraction efficiency. In each drawing (particularly, a graph) such as FIG. 20, wavelength distribution of the 0th-order diffracted light is indicated by "W0", wavelength distribution of the first-order diffracted light is indicated by "W1", and wavelength distribution of the negative first-order diffracted light is indicated by "W-1". FIG. 21 illustrates an example of a light image 100 reproduced by a hologram structure 11 having the characteristics illustrated in FIG. 20. In the following description and each drawing, a reproduced image of the 0th-order diffracted light is also referred to as "0th-order diffracted light image 100a", a reproduced image of the first-order diffracted light is also referred to as "first-order diffracted light image 100b", and a reproduced image of the negative first-order diffracted light is also referred to as "negative first-order diffracted light image 100c", these light images 100a, 100b, and 100c are collectively denoted by Reference Sign "100".

For example, in a case where the number of steps and a depth per step of the uneven surface 1a of the hologram structure 11 are eight and 200 nm (a maximum depth is 1400 nm (see Reference Sign "D" in FIG. 6)), respectively, a wavelength showing the maximum diffraction efficiency of the 0th-order diffracted light can be set to 600 nm, a wavelength showing the maximum diffraction efficiency of the first-order diffracted light can be set to 533 nm, and a wavelength showing the maximum diffraction efficiency of the negative first-order diffracted light can be set to 685 nm as illustrated in FIG. 20. As illustrated in FIG. 21, the light images 100 reproduced with reproduction light of white light by the hologram structure 11 include a green first-order diffracted light image 100b and a red negative first-order diffracted light image 100c that are arranged to be point symmetric with respect to a yellow-orange 0th-order diffracted light image 100a. Further, the first-order diffracted light image 100b and the negative first-order diffracted light image 100c have the same shape ("F" shape in the illustrated example). Note that the 0th-order diffracted light image 100a has a color that depends on a non-diffraction wavelength and the diffraction efficiency.

Figure 22:
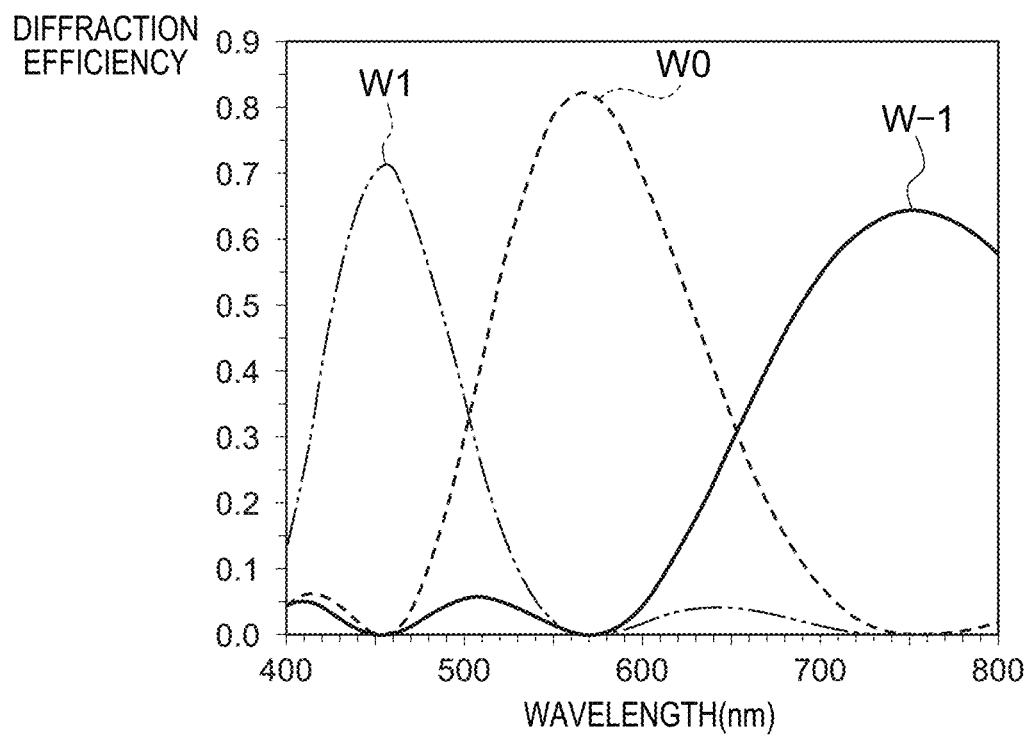
FIG. 22 is a graph illustrating wavelength distribution of each of 0th-order diffracted light (W0), first-order diffracted light (W1), and negative first-order diffracted light (W-1) in a case of another example of the reflection type hologram structure according to the 1-2-th embodiment of the first exemplary embodiment.
Figure 23:
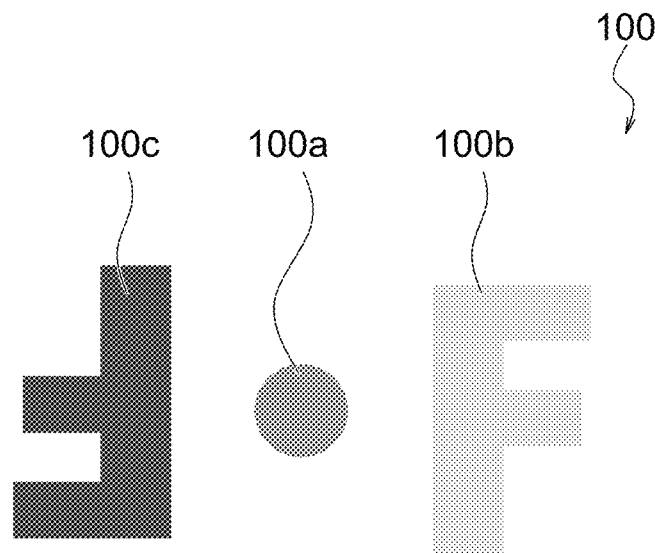
FIG. 23 illustrates an example of a light image reproduced by a hologram structure having the characteristics illustrated in FIG. 22.

Further, in a case where the number of steps and a depth per step of the uneven surface 1a of the hologram structure 11 are four and 190 nm (a maximum depth is 570 nm (see Reference Sign "D" in FIG. 7)), respectively, a wavelength showing the maximum diffraction efficiency of the 0th-order diffracted light can be set to 570 nm, a wavelength showing the maximum diffraction efficiency of the first-order diffracted light can be set to 456 nm, and a wavelength showing the maximum diffraction efficiency of the negative first-order diffracted light can be set to 760 nm as illustrated in FIG. 22. As illustrated in FIG. 23, the light images 100 reproduced with reproduction light of white light by the hologram structure 11 include a blue first-order diffracted light image 100b and a red negative first-order diffracted light image 100c that have the same shape and are arranged to be point symmetric with respect to a 0th-order diffracted light image 100a.

Figure 24:
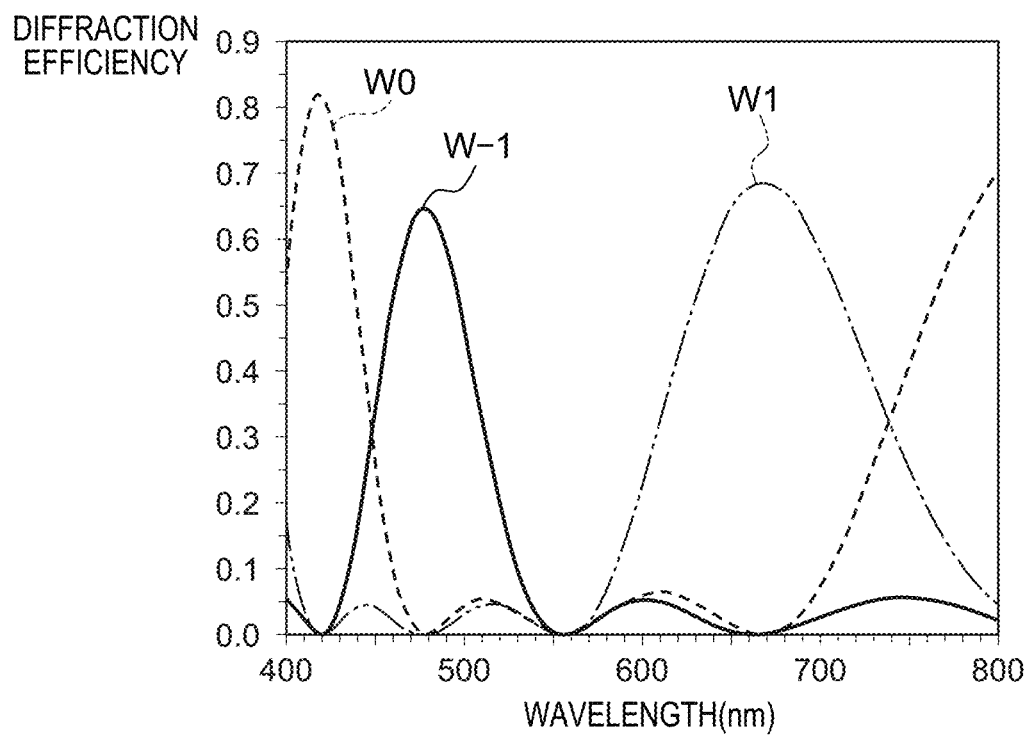
FIG. 24 is a graph illustrating wavelength distribution of each of 0th-order diffracted light (W0), first-order diffracted light (W1), and negative first-order diffracted light (W-1) in a case of another example of the reflection type hologram structure according to the 1-2-th embodiment of the first exemplary embodiment.
Figure 25:
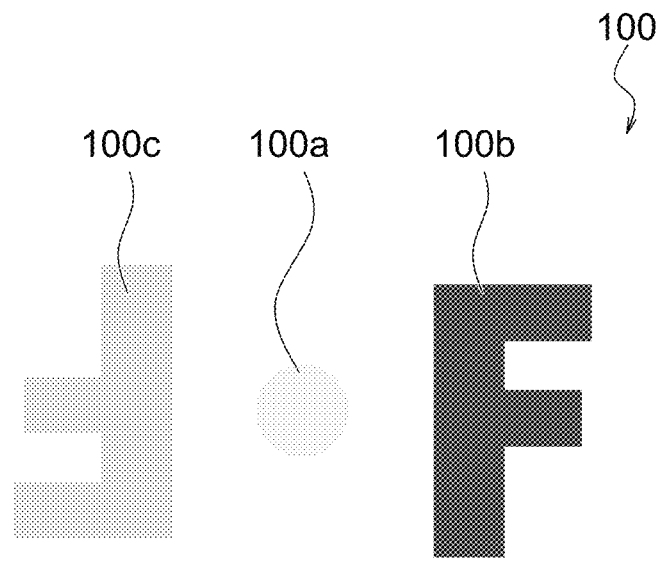
FIG. 25 illustrates an example of a light image reproduced by a hologram structure having the characteristics illustrated in FIG. 24.

Further, in a case where the number of steps and a depth per step of the uneven surface 1a of the hologram structure 11 are four and 280 nm (a maximum depth is 840 nm), respectively, a wavelength showing the maximum diffraction efficiency of the 0th-order diffracted light can be set to 420 nm, a wavelength showing the maximum diffraction efficiency of the first-order diffracted light can be set to 672 nm, and a wavelength showing the maximum diffraction efficiency of the negative first-order diffracted light can be set to 480 nm as illustrated in FIG. 24. As illustrated in FIG. 25, the light images 100 reproduced with reproduction light of white light by the hologram structure 11 include a red first-order diffracted light image 100b and a blue negative first-order diffracted light image 100c that have the same shape and are arranged at point symmetrical positions with respect to a 0th-order diffracted light image 100a. Note that it is possible to prevent the 0th-order diffracted light image 100a being visible by setting a wavelength showing the maximum diffraction efficiency of the 0th-order diffracted light to be outside the visible light wavelength band.

Figure 26:
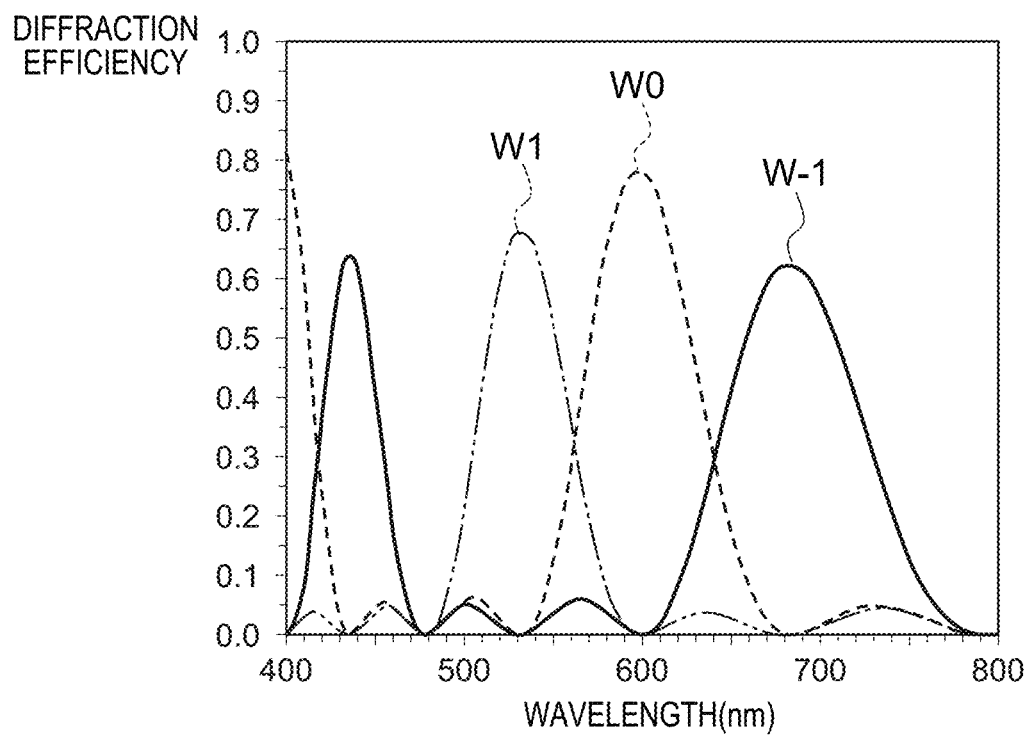
FIG. 26 is a graph illustrating wavelength distribution of each of 0th-order diffracted light (W0), first-order diffracted light (W1), and negative first-order diffracted light (W-1) in a case of another example of the reflection type hologram structure according to the 1-2-th embodiment of the first exemplary embodiment.
Figure 27:
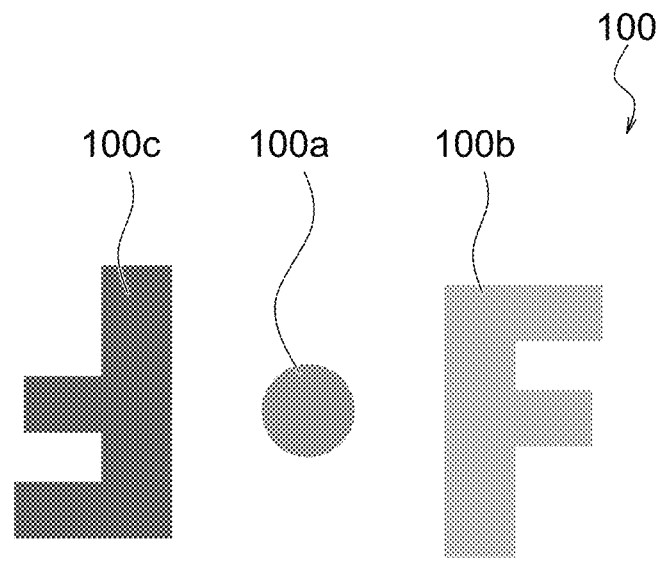
FIG. 27 illustrates an example of a light image reproduced by a hologram structure having the characteristics illustrated in FIG. 26.

Further, in a case where the number of steps and a depth per step of the uneven surface 1a of the hologram structure 11 are four and 400 nm (a maximum depth is 1200 nm), respectively, a wavelength showing the maximum diffraction efficiency of the 0th-order diffracted light can be set to 600 nm, a wavelength showing the maximum diffraction efficiency of the first-order diffracted light can be set to 533 nm, and a wavelength showing the maximum diffraction efficiency of the negative first-order diffracted light can be set to 436 nm as illustrated in FIG. 26. Note that, in this example, a wavelength showing the second highest diffraction efficiency of the negative first-order diffracted light is set within the visible light wavelength band (specifically, 685 nm), and the diffraction efficiency also has a high value of 0.6 or more. Therefore, the color of the negative first-order diffracted light image 100c is a color (that is, purple) in which a color (that is, blue) corresponding to a wavelength of 436 nm and a wavelength in the vicinity thereof and a color (that is, red) corresponding to a wavelength of 685 nm and a wavelength in the vicinity thereof are mixed. Therefore, as illustrated in FIG. 27, the light images 100 reproduced with reproduction light of white light by the hologram structure 11 include a green first-order diffracted light image 100b and a purple negative first-order diffracted light image 100c that have the same shape and are arranged at point symmetrical positions with respect to a 0th-order diffracted light image 100a.

Note that the light images 100 illustrated in FIGS. 20 to 27 are only examples of the light image 100 that can be reproduced by the hologram structure 11 of the present embodiment, and it is also possible to reproduce the light image 100 with other colors by adjusting the diffraction characteristic of the hologram structure 11. The diffraction characteristic of the hologram structure 11 can be adjusted by any method, for example, the wavelength distributions of the 0th-order diffracted light, the first-order diffracted light, and the negative first-order diffracted light can be adjusted by appropriately selecting the number of steps and an unevenness depth of the uneven surface 1a, and a refractive index of the hologram structure 11 (particularly, the hologram layer 1).

As described above, with the hologram structure 11 of the present embodiment, even in a case where white light is used as the reproduction light, a light image 100 having a specific wavelength (that is, a specific color) can be reproduced with the first-order diffracted light and the negative first-order diffracted light. In particular, in a case where the wavelength showing the maximum diffraction efficiency of the first-order diffracted light and the wavelength showing the maximum diffraction efficiency of the negative first-order diffracted light are included in the wavelength bands of different color systems, respectively, a first-order diffracted light image 100b and a negative first-order diffracted light image 100c with different colors can be reproduced at point symmetrical positions with respect to a 0th-order diffracted light image 100a. Note that the hologram structure 11 of the present embodiment also reproduces a light image 100 in a specific color other than iridescence, similarly to the hologram structure 11 of the 1-1-th embodiment, such that a high-definition light image 100 can be reproduced and a specific impression based on the specific color can be given to the observer 50. Further, the wavelength showing the maximum diffraction efficiency of the first-order diffracted light and the wavelength showing the maximum diffraction efficiency of the negative first-order diffracted light may be set to wavelengths included in the same color system. In this case, a first-order diffracted light image 100b and a negative first-order diffracted light image 100c with the same color system can be reproduced at point symmetrical positions with respect to a 0th-order diffracted light image 100a.

Modified Example 2-1

Figure 28A:
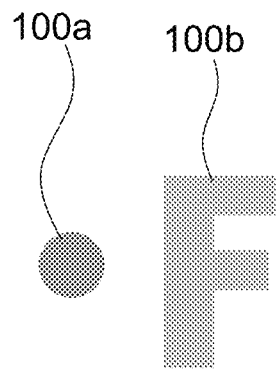
FIG. 28A is a diagram illustrating an example of a light image b of first-order diffracted light reproduced by the hologram structure according to Modified Example 2-1 of the first exemplary embodiment.
Figure 28B:
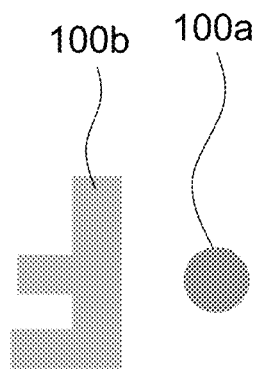
FIG. 28B is a diagram illustrating an example of a light image b of first-order diffracted light reproduced by the hologram structure according to Modified Example 2-1.
Figure 29:
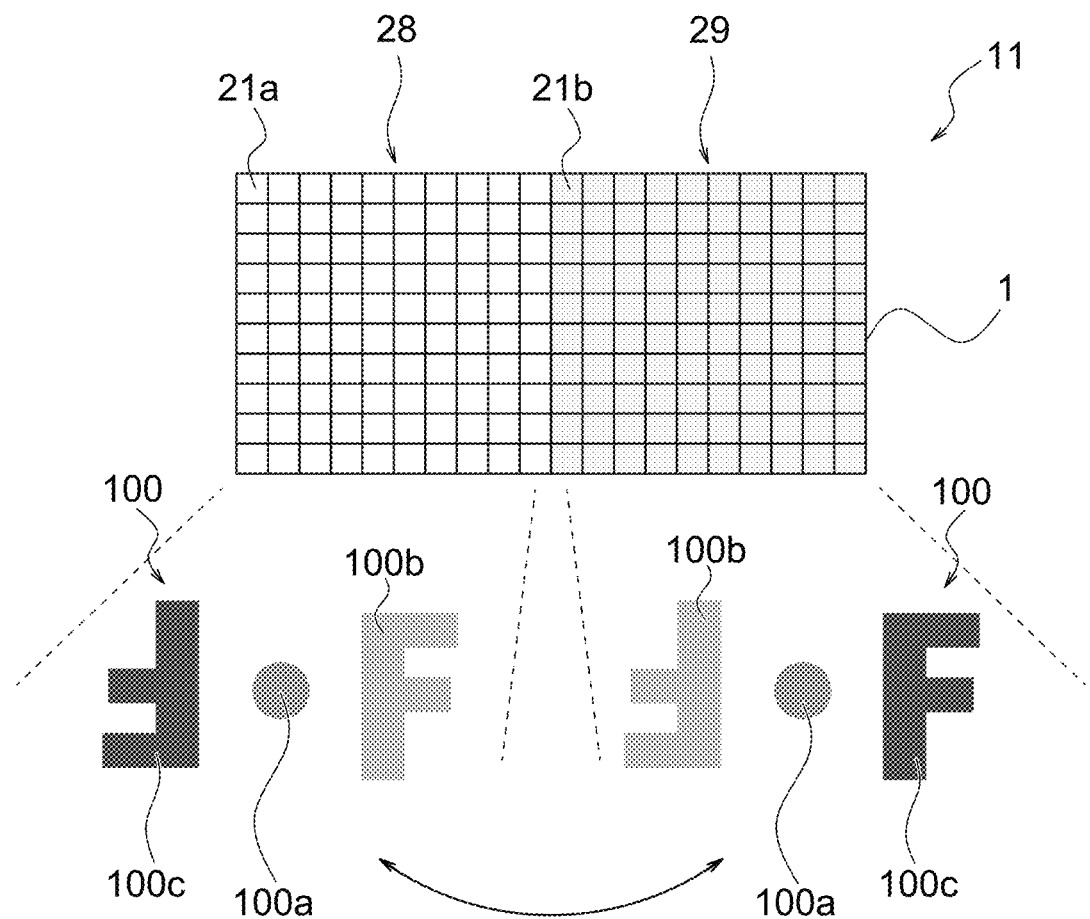
FIG. 29 is a diagram schematically illustrating a plane structure of the hologram structure according to Modified Example 2-1 of the first exemplary embodiment, and light images reproduced by the hologram structure.

FIGS. 28A and 28B each are a diagram illustrating an example of a light image 100b of first-order diffracted light reproduced by a hologram structure 11 according to Modified Example 2-1. Note that FIG. 28A illustrates a light image 100a of 0th-order diffracted light and a light image 100b of first-order diffracted light reproduced by a first factor element 21a as described later, and FIG. 28B illustrates a light image 100a of 0th-order diffracted light and a light image 100b of first-order diffracted light reproduced by a second factor element 21b as described later. FIG. 29 is a diagram schematically illustrating a plane structure of the hologram structure 11 according to Modified Example 2-1, and light images 100 reproduced by the hologram structure 11.

The hologram structure 11 according to the present modified example includes a first region 28 and a second region 29, a plurality of first type factor elements 21 (hereinafter, also referred to as "first factor elements 21a") are arranged in the first region 28, and a plurality of second type factor elements 21 (hereinafter, also referred to as "second factor elements 21b") are arranged in the second region 29. In the wavelength band of not less than 380 nm and not more than 780 nm, wavelength distribution of the first-order diffracted light with respect to diffraction efficiency for the first factor elements 21a is the same as wavelength distribution of first-order diffracted light with respect to diffraction efficiency for the second factor elements 21b, and wavelength distribution of negative first-order diffracted light with respect to diffraction efficiency for the first factor elements 21a is the same as wavelength distribution of negative first-order diffracted light with respect to diffraction efficiency for the second factor elements 21b. Further, a first-order diffracted light image 100b reproduced by the first factor elements 21a has the same shape as that of a negative first-order diffracted light image 100c reproduced by the second factor elements 21b, and a negative first-order diffracted light image 100c reproduced by the first factor elements 21a has the same shape as that of the first-order diffracted light image 100b reproduced by the second factor elements 21b. Further, relative positions of the light image reproduced with the first-order diffracted light of the first factor elements 21a and the light image reproduced with the negative first-order diffracted light are opposite to relative positions of the light image reproduced with the first-order diffracted light of the second factor elements 21b and the light image reproduced with the negative first-order diffracted light.

In a case of the hologram structure 11 illustrated in FIGS. 28A, 28B, and 29, the first factor elements 21a reproduce the first-order diffracted light image 100b to one side (the right side in the drawing) of the 0th-order diffracted light image 100a and reproduce the negative first-order diffracted light image 100c to the other side (the left side of the drawing) of the 0th-order diffracted light image 100a. On the other hand, the second factor elements 21b reproduce the negative first-order diffracted light image 100c to one side (the right side in the drawing) of the 0th-order diffracted light image 100a and reproduce the first-order diffracted light image 100b to the other side (the left side in the drawing) of the 0th-order diffracted light image 100a. As such, a relationship between the relative positions of the first-order diffracted light image 100b and the negative first-order diffracted light image 100c with respect to the 0th-order diffracted light image 100a is opposite between the first factor elements 21a and the second factor elements 21b. Note that a diffraction angle of the first factor elements 21a is set to be the same as a diffraction angle of the second factor elements 21b. Meanwhile, the wavelength distribution of the first-order diffracted light and the negative first-order diffracted light for the first factor elements 21a is the same as the wavelength distribution of the first-order diffracted light and the negative first-order diffracted light for the second factor elements 21b. Therefore, as illustrated in FIG. 29, the first-order diffracted light image 100b reproduced by the first factor elements 21a has the same color (green in FIG. 29) as that of the first-order diffracted light image 100b reproduced by the second factor elements 21b, and the negative first-order diffracted light image 100c reproduced by the first factor elements 21a has the same color (red in FIG. 29) as that of the negative first-order diffracted light image 100c reproduced by the second factor elements 21b.

By arranging the first region 28 and the second region 29 having the above-described configurations side by side, diffraction elements (that is, the first factor elements 21a and the second factor elements 21b) that reproduce the light images 100 with reversed colors at point symmetrical positions with respect to the 0th-order diffracted light image 100a are positioned adjacent to each other. Therefore, it is possible to switch the colors of the light images reproduced to the opposite sides of the 0th-order diffracted light image 100a while substantially keeping the sameness of shape, by switching a region to be irradiated with white light between the first region 28 and the second region 29.

Note that the hologram structure 11 can be implemented by forming the first factor elements 21a in the first region 28 and the second factor elements 21b in the second region 29 by using two original images having the same shape and the same color and arranged point-symmetrically. Further, the number of steps and a depth per step of an uneven surface 1a of the first factor element 21a can be the same as the number of steps and a depth per step of an uneven surface 1a of the second factor element 21b. Further, a position where the light image 100 is reproduced by the first factor element 21a in the first region 28 and a position where the light image 100 is reproduced by the second factor element 21*b* in the second region 29 may at least partially overlap each other or may be different from each other.

Modified Example 2-2

Figure 30:
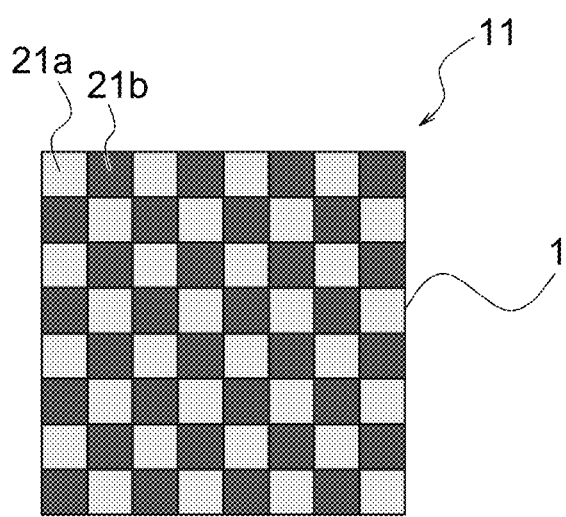
FIG. 30 is a conceptual diagram illustrating an example of a plane structure of a transmission type hologram structure according to Modified Example 2-2 of the first exemplary embodiment.
Figure 31A:
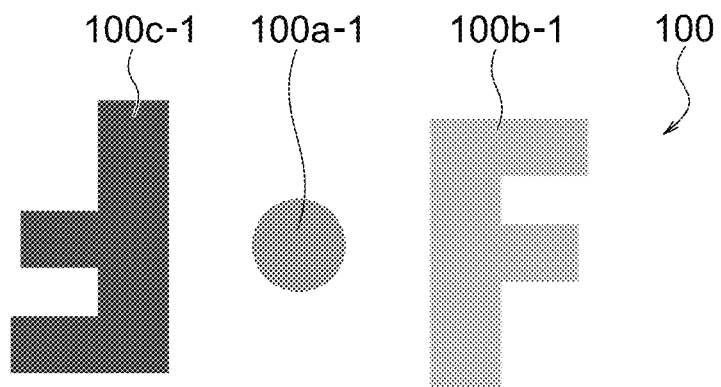
FIG. 31A is a schematic diagram for describing an example of a light image reproduced by the transmission type hologram structure of FIG. 30, and illustrates a light image reproduced by first factor elements.
Figure 31B:
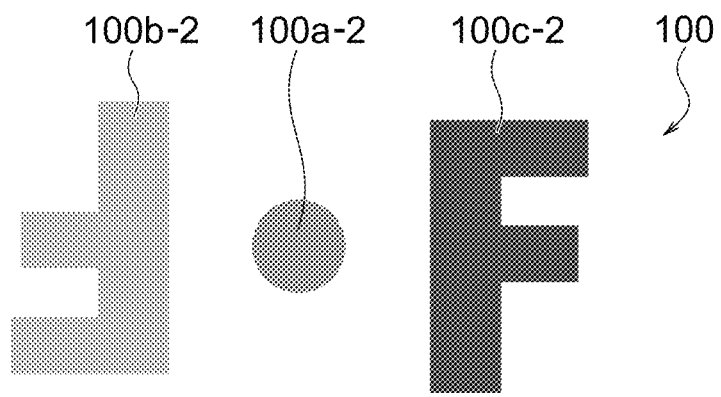
FIG. 31B illustrates a light image reproduced by second factor elements of the hologram structure of FIG. 30.
Figure 31C:
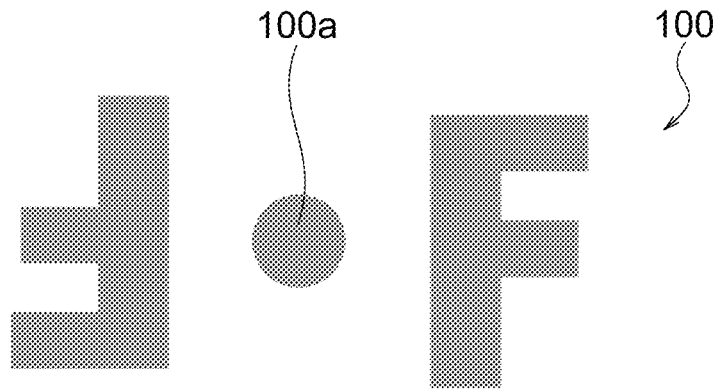
FIG. 31C illustrates a light image reproduced by superimposing the light image illustrated in FIG. 31A and the light image illustrates in FIG. 31B.

FIG. 30 is a conceptual diagram illustrating an example of a plane structure of a transmission type hologram structure 11 according to Modified Example 2-2. FIG. 31A is a schematic diagram for describing an example of a light image 100 reproduced by the transmission type hologram structure 11 of FIG. 30, and illustrates a light image 100 reproduced by first factor elements 21*a*. FIG. 31B illustrates a light image 100 reproduced by second factor elements 21*b* of the hologram structure 11 of FIG. 30. FIG. 31C illustrates a light image 100 reproduced by superimposing the light image illustrated in FIG. 31A and the light image illustrated in FIG. 31B.

Factor elements 21 included in the hologram structure 11 of the present modified example include a plurality of first type factor elements (that is, the first factor elements 21*a*) and a plurality of second type factor elements (that is, the second factor elements 21*b*). The first factor elements 21*a* and the second factor elements 21*b* are mixed in the same region, and in the illustrated example, the first factor elements 21*a* and the second factor elements 21*b* are arranged in a checkerboard pattern. In the wavelength band of not less than 380 nm and not more than 780 nm, wavelength distribution of the first-order diffracted light with respect to diffraction efficiency for the first factor elements 21*a* is the same as wavelength distribution of first-order diffracted light with respect to diffraction efficiency for the second factor elements 21*b*, and wavelength distribution of negative first-order diffracted light with respect to diffraction efficiency for the first factor elements 21*a* is the same as wavelength distribution of negative first-order diffracted light with respect to diffraction efficiency for the second factor elements 21*b*. Further, a light image 100*b*-1 of the first-order diffracted light and a light image 100*c*-1 of the negative first-order diffracted light reproduced by the first factor elements 21*a* have the same shape and have a relationship of point symmetry with respect to a light image 100*a*-1 of the 0th-order diffracted light. Similarly, a light image 100*b*-2 of the first-order diffracted light and a light image 100*c*-2 of the negative first-order diffracted light reproduced by the second factor elements 21*b* have the same shape and have a relationship of point symmetry with respect to a light image 100*a*-2 of the 0th-order diffracted light.

Further, the light image 100*b*-1 of the first-order diffracted light reproduced by the first factor elements 21*a* has the same shape as that of the light image 100*c*-2 of the negative first-order diffracted light reproduced by the second factor elements 21*b*, and the light image 100*c*-1 of the negative first-order diffracted light reproduced by the first factor elements 21*a* has the same shape as that of the light image 100*b*-2 of the first-order diffracted light reproduced by the second factor elements 21*b*. The light image 100*b*-1 of the first-order diffracted light reproduced by the first factor elements 21*a* and the light image 100*c*-2 of the negative first-order diffracted light reproduced by the second factor elements 21*b* are superimposed, and the light image 100*c*-1 of the negative first-order diffracted light reproduced by the first factor elements 21*a* and the light image 100*b*-2 of the first-order diffracted light reproduced by the second factor elements 21*b* are superimposed. Note that it is preferable that the light image 100*b*-1 of the first-order diffracted light reproduced by the first factor elements 21*a* and the light image 100*c*-2 of the negative first-order diffracted light reproduced by the second factor elements 21*b* have substantially the same size and are superimposed to a significant extent (for example, 50% or more of each of the light image 100*b*-1 of the first-order diffracted light and the light image 100*c*-2 of the negative first-order diffracted light). Similarly, it is preferable that the light image 100*c*-1 of the negative first-order diffracted light reproduced by the first factor elements 21*a* and the light image 100*b*-2 of the first-order diffracted light reproduced by the second factor elements 21*b* have substantially the same size and are superimposed to a significant extent (for example, 50% or more of each of the light image 100*c*-1 of the negative first-order diffracted light and the light image 100*b*-2 of the first-order diffracted light).

The light image 100 finally reproduced by the hologram structure 11 of the present modified example having the above-described configuration is a combined image obtained by superimposing a light image (see FIG. 31A) reproduced by the first factor elements 21*a* and a light image (FIG. 31B) reproduced by the second factor elements 21*b* as illustrated in FIG. 31C. That is, light images having the same shape and the same color are reproduced at point symmetrical positions with respect to a 0th-order diffracted light image 100*a*. With the hologram structure 11 of the present modified example, it is possible to easily reproduce light images with the same color at point symmetrical positions with respect to the 0th-order diffracted light image 100*a*.

Note that the hologram holder 10 may include a plurality of hologram structures 11 of the present modified example, and the wavelength distribution of the first-order diffracted light and the wavelength distribution of the negative first-order diffracted light for the first factor elements 21*a* and the second factor elements 21*b* included in each hologram structure 11 may be different between the hologram structures 11. In this case, each hologram structure 11 can reproduce a plurality of types of light images 100 (for example, light images 100 having different colors).

Note that in the above-described example, the wavelength distribution of the first-order diffracted light with respect to diffraction efficiency and the wavelength distribution of the negative first-order diffracted light with respect to diffraction efficiency are the same for both of the first factor elements 21*a* and the second factor elements 21*b*, but these wavelength distributions may be different between the first factor elements 21*a* and the second factor elements 21*b*. That is, in the wavelength band of not less than 380 nm and not more than 780 nm, the wavelength distribution of the first-order diffracted light with respect to diffraction efficiency for the first factor elements 21*a* may be different from the wavelength distribution of the first-order diffracted light with respect to diffraction efficiency for the second factor elements 21*b*, and the wavelength distribution of the negative first-order diffracted light with respect to diffraction efficiency for the first factor elements 21*a* may be different from the wavelength distribution of the negative first-order diffracted light with respect to diffraction efficiency for the second factor elements 21*b*. In this case, similarly to the above-described example, the light image 100*b*-1 of the first-order diffracted light reproduced by the first factor elements 21*a* and the light image 100*c*-2 of the negative first-order diffracted light reproduced by the second factor elements 21*b* may have the same shape and be superimposed, and the light image 100*c*-1 of the negative first-order diffracted light reproduced by the first factor elements 21*a* and the light image 100*b*-2 of the first-order diffracted light reproduced by the second factor elements 21*b* may have the same shape and be superimposed. In particular, it is preferable that the light image 100*b*-1 of the first-order diffracted light reproduced by the first factor elements 21*a* and the light image 100*c*-2 of the negative first-order diffracted light reproduced by the second factor elements 21*b* have substantially the same size and are superimposed to a significant extent (for example, 50% or more of each of the light image 100*b*-1 of the first-order diffracted light and the light image 100*c*-2 of the negative first-order diffracted light). Similarly, it is preferable that the light image 100*c*-1 of the negative first-order diffracted light reproduced by the first factor elements 21*a* and the light image 100*b*-2 of the first-order diffracted light reproduced by the second factor elements 21*b* have substantially the same size and are superimposed to a significant extent (for example, 50% or more of each of the light image 100*c*-1 of the negative first-order diffracted light and the light image 100*b*-2 of the first-order diffracted light).

Figure 32A:
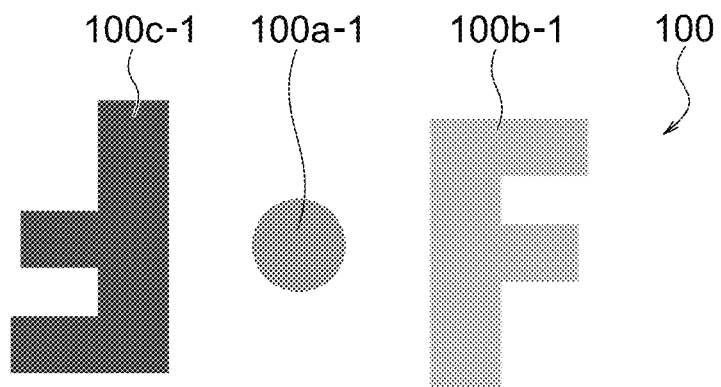
FIG. 32A is a schematic diagram for describing another example of the light image reproduced by the transmission type hologram structure according to Modified Example 2-2 of the first exemplary embodiment, and illustrates a light image reproduced by the first factor element.
Figure 32B:
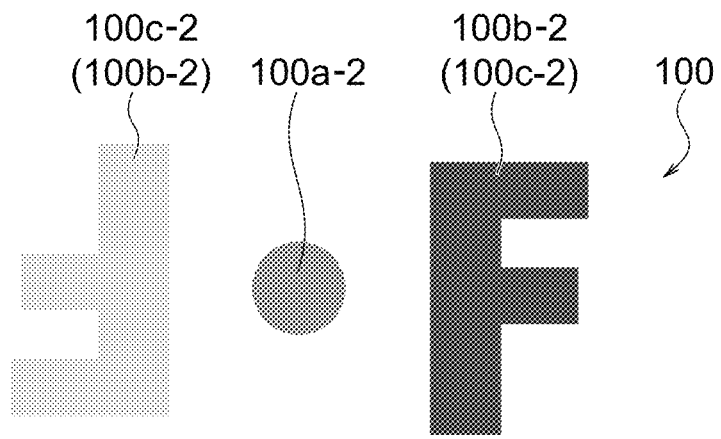
FIG. 32B illustrates a light image reproduced by the second factor element of the hologram structure of FIG. 32A.
Figure 32C:
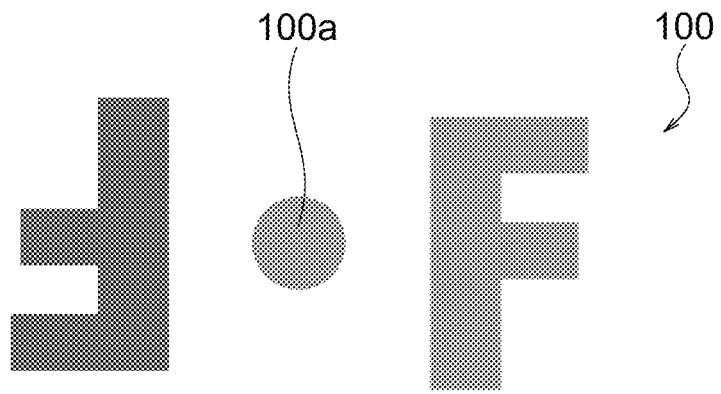
FIG. 32C illustrates a light image reproduced by superimposing the light image illustrated in FIG. 32A and the light image illustrates in FIG. 32B.

In this case, light images 100*a*-1, 100*b*-1, and 100*c*-1 reproduced by the first factor elements 21*a* as illustrated in FIG. 32A and light images 100*a*-2, 100*b*-2, and 100*c*-2 reproduced by the second factor elements 21*b* as illustrated in FIG. 32B are superimposed to reproduce a light image 100 as illustrated in FIG. 32C. That is, it is possible to reproduce light images having the same shape and different colors at point symmetrical positions with respect to the 0th-order diffracted light image 100*a*.

For example, in the reflection type hologram structure 11 according to the present modified example, the number of steps and a depth per step of an uneven surface 1*a* of the first factor element 21*a* can be set to eight and 200 nm (a maximum depth is 1400 nm), respectively, and the number of steps and a depth per step of an uneven surface 1*a* of the second factor element 21*b* can be set to four and 190 nm (a maximum depth is 570 nm), respectively. In this case, the first-order diffracted light image 100*b*-2 of the second factor elements 21*b* is reproduced in blue, and the negative first-order diffracted light image 100*c*-2 is reproduced in red, while reproducing the first-order diffracted light image 100*b*-1 of the first factor elements 21*a* in green and reproducing the negative first-order diffracted light image 100*c*-1 in red. Then, these light images are combined, and finally, a red-purple light image and a yellow light image are reproduced at point-symmetric positions with respect to the 0th-order diffracted light image 100*a*. Note that in the example illustrated in FIGS. 32A to 32C, the negative first-order diffracted light image 100*c*-1 reproduced by the first factor elements 21*a* and the negative first-order diffracted light image 100*c*-2 reproduced by the second factor elements 21*b* have colors (that is, red colors) in the same color system, respectively, but may have colors in different color systems, respectively.

Further, as another example, in the wavelength band of not less than 380 nm and not more than 780 nm, the wavelength distribution of the first-order diffracted light with respect to diffraction efficiency for the first factor elements 21*a* may be different from the wavelength distribution of the negative first-order diffracted light with respect to diffraction efficiency for the second factor elements 21*b*, and the wavelength distribution of the negative first-order diffracted light with respect to diffraction efficiency for the first factor elements 21*a* may be different from the wavelength distribution of the first-order diffracted light with respect to diffraction efficiency for the second factor elements 21*b*. In this case, the light image of the first-order diffracted light reproduced by the first factor elements 21*a* may have the same shape as that of the light image of the first-order diffracted light reproduced by the second factor elements 21*b*, the light image of the negative first-order diffracted light reproduced by the first factor elements 21*a* may have the same shape as that of the light image of the negative first-order diffracted light reproduced by the second factor elements 21*b*, the light image of the first-order diffracted light reproduced by the first factor elements 21*a* and the light image of the first-order diffracted light reproduced by the second factor elements 21*b* may be superimposed, and the light image of the negative first-order diffracted light reproduced by the first factor elements 21*a* and the light image of the negative first-order diffracted light reproduced by the second factor elements 21*b* may be superimposed. In particular, it is preferable that the light image 100*b*-1 of the first-order diffracted light reproduced by the first factor elements 21*a* and the light image 100*b*-2 of the first-order diffracted light reproduced by the second factor elements 21*b* have substantially the same size and are superimposed to a significant extent (for example, 50% or more of each of the light image 100*b*-1 of the first-order diffracted light and the light image 100*b*-2 of the first-order diffracted light). Similarly, it is preferable that the light image 100*c*-1 of the negative first-order diffracted light reproduced by the first factor elements 21*a* and the light image 100*c*-2 of the negative first-order diffracted light reproduced by the second factor elements 21*b* have substantially the same size and are superimposed to a significant extent (for example, 50% or more of each of the light image 100*c*-1 of the negative first-order diffracted light and the light image 100*c*-2 of the negative first-order diffracted light).

In this case, the light images 100*a*-1, 100*b*-1, and 100*c*-1 reproduced by the first factor elements 21*a* as illustrated in FIG. 32A and the light images 100*a*-2, 100*b*-2, and 100*c*-2 which are reproduced by the second factor elements 21*b* and of which reference signs are indicated with parentheses in FIG. 32B are superimposed to reproduce the light image 100 as illustrated in FIG. 32C. That is, it is possible to reproduce light images having the same shape and different colors at point symmetrical positions with respect to the 0th-order diffracted light image 100*a*.

Note that, in the hologram structure 11 of the present modified example, an arrangement mode of the first factor elements 21*a* and the second factor elements 21*b* is not limited to the above-described checkerboard pattern. For example, the first factor elements 21*a* and the second factor elements 21*b* may be arranged in a stripe shape, or in an arrangement mode in which the arrangement in the checkerboard pattern and the arrangement in the stripe shape are combined.

Modified Example 2-3

Similarly to the above-described hologram structure 11, a hologram structure 11 of the present modified example includes a plurality of factor elements 21 configured as Fourier transform holograms that reproduce a light image by modulating a phase of incident reproduction light. Each factor element 21 has an uneven surface 1*a* with a different height of three or more steps, a first light image is reproduced with light (that is, first-order diffracted light including light having a first wavelength (a wavelength showing the maximum diffraction efficiency)) in a first wavelength band, and a second light image that is point symmetric to the first light image is reproduced with light (that is, negative first-order diffracted light including light having a second wavelength (a wavelength showing the maximum diffraction efficiency) different from the first wavelength) in a second wavelength band different from the first wavelength band. In particular, one of the first light image and the second light image is reproduced in red.

That is, a maximum diffraction efficiency in the wavelength band of not less than 380 nm and not more than 780 nm in one of wavelength distribution of the first-order diffracted light with respect to diffraction efficiency and wavelength distribution of the negative first-order diffracted light with respect to diffraction efficiency for each factor element 21 has a local maximum value in a wavelength band of not less than 680 nm and not more than 780 nm in the one wavelength distribution with respect to diffraction efficiency. Further, in accordance with a change in an incident angle of reproduction light with respect to each factor element 21, a maximum diffraction efficiency in the wavelength band of not less than 380 nm and not more than 780 nm in the other one of the wavelength distribution of the first-order diffracted light with respect to diffraction efficiency and the wavelength distribution of the negative first-order diffracted light with respect to diffraction efficiency for each factor element 21 can have a local maximum value in a wavelength band of less than 680 nm in the other one wavelength distribution with respect to diffraction efficiency.

Figure 33:
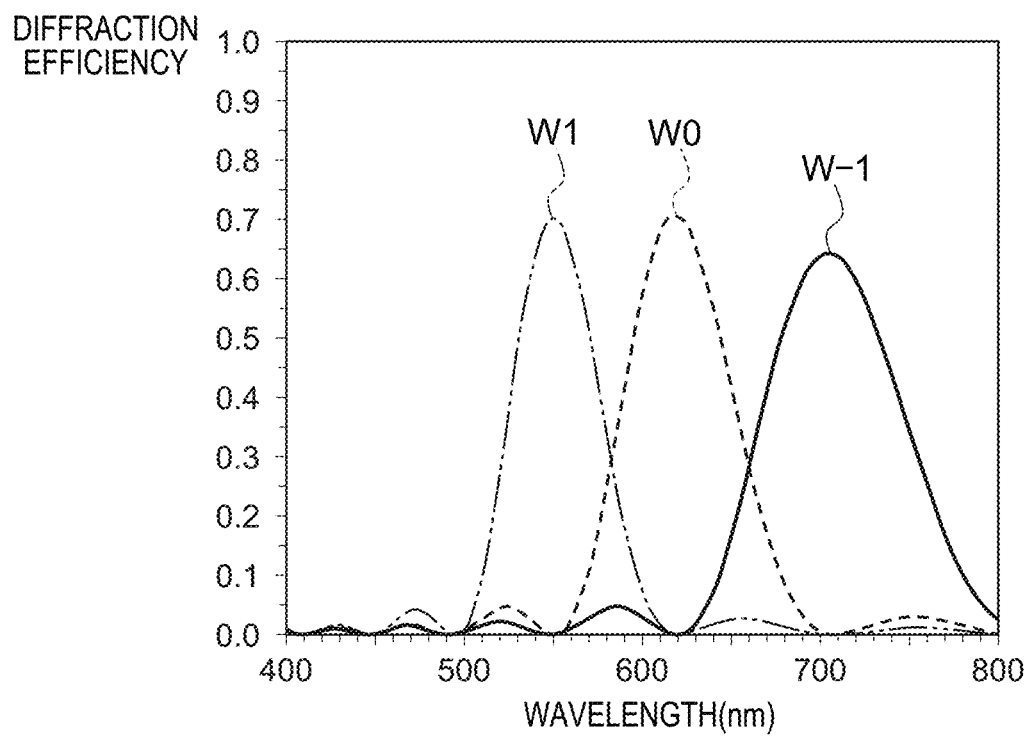
FIG. 33 is a graph illustrating wavelength distribution of each of 0th-order diffracted light (W0), first-order diffracted light (W1), and negative first-order diffracted light (W-1) in a case of an example of a reflection type hologram structure according to Modified Example 2-3 of the first exemplary embodiment, and particularly, illustrates a case where the incident angle of reproduction light is 0°.
Figure 34:
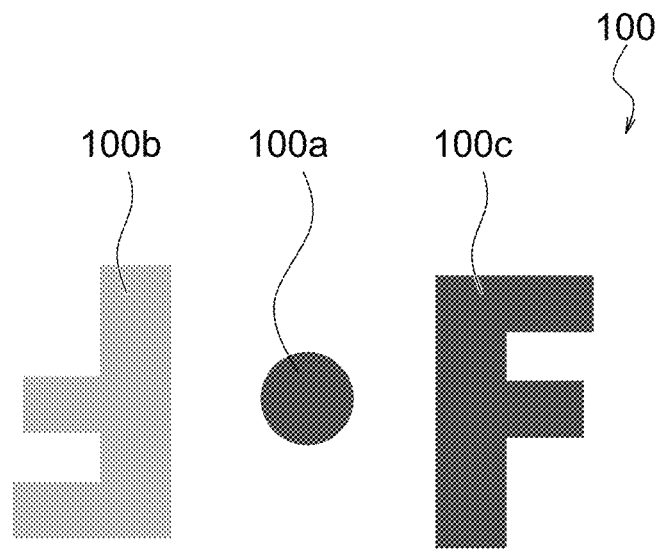
FIG. 34 illustrates an example of a light image reproduced by a hologram structure having the characteristics illustrated in FIG. 33 in a case where the incident angle of reproduction light is 0°.
Figure 35:
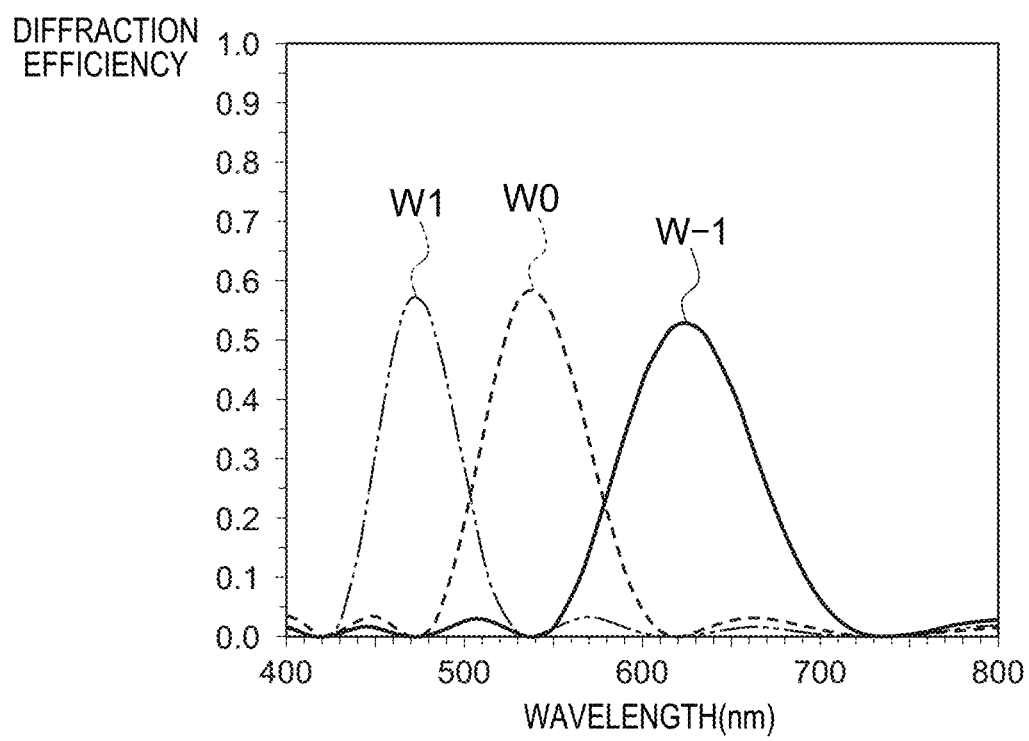
FIG. 35 is a graph illustrating wavelength distribution of each of 0th-order diffracted light (W0), first-order diffracted light (W1), and negative first-order diffracted light (W-1) in a case of the hologram structure of FIG. 33, and particularly, illustrates a case where the incident angle of reproduction light is 30°.
Figure 36:
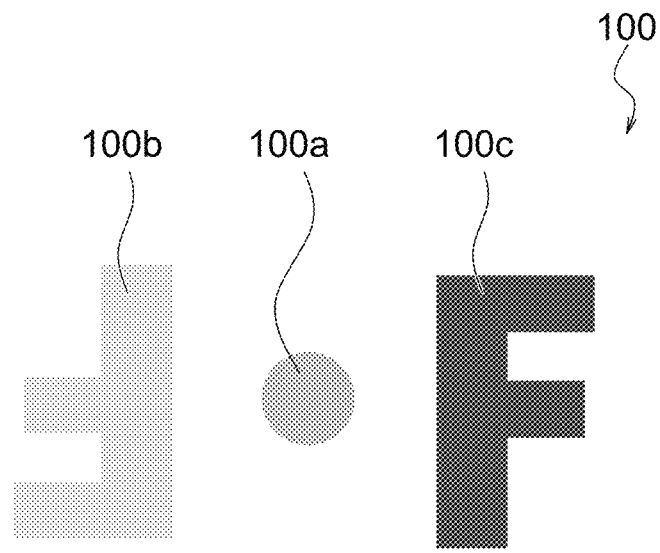
FIG. 36 illustrates an example of a light image reproduced by a hologram structure having the characteristics illustrated in FIG. 35 in a case where the incident angle of reproduction light is 30°.

FIG. 33 is a graph illustrating wavelength distribution of each of the 0th-order diffracted light (W0), the first-order diffracted light (W1), and the negative first-order diffracted light (W-1) in a case of an example of the reflection type hologram structure 11 according to Modified Example 2-3, and particularly, illustrates a case where the incident angle of the reproduction light is 0°. FIG. 34 illustrates an example of a light image 100 reproduced by a hologram structure 11 having the characteristics illustrated in FIG. 33 in a case where the incident angle of the reproduction light is 0°. FIG. 35 is a graph illustrating wavelength distribution of each of the 0th-order diffracted light (W0), the first-order diffracted light (W1), and the negative first-order diffracted light (W-1) in a case of the hologram structure 11 of FIG. 33, and particularly, illustrates a case where the incident angle of the reproduction light is 30°. FIG. 36 illustrates an example of a light image 100 reproduced by a hologram structure 11 having the characteristics illustrated in FIG. 35 in a case where the incident angle of the reproduction light is 30°. Note that, in FIGS. 33 and 35, a horizontal axis represents a wavelength, and a vertical axis represents diffraction efficiency.

For example, in a case where the number of steps and a depth per step of the uneven surface 1a of each factor element 21 of the reflection type hologram structure 11 is set to eight and 207 nm (a maximum depth is 1449 nm), respectively, the hologram structure 11 can implement a hologram structure 11 having the diffraction characteristics illustrated in FIGS. 33 and 35. That is, in a case where the incident angle of the reproduction light with respect to the hologram structure 11 is 0°, the 0th-order diffracted light can have a peak wavelength of 621 nm, the first-order diffracted light can have a peak wavelength of 552 nm, and the negative first-order diffracted light can have a peak wavelength of 709 nm. Meanwhile, in a case where the incident angle of the reproduction light with respect to the hologram structure 11 is 30°, the 0th-order diffracted light can have a peak wavelength of around 540 nm, the first-order diffracted light can have a peak wavelength of 473 nm, and the negative first-order diffracted light can have a peak wavelength of 624 nm.

As is apparent from FIGS. 33 and 35, generally, as the incident angle of the reproduction light with respect to the hologram structure 11 increases from 0°, the peak wavelength of each diffracted light shifts to a shorter wavelength side. Meanwhile, a width of a wavelength band of each color system in the visible light wavelength band is not uniform among the color systems, and in particular, a wavelength band corresponding to red colors is wider than wavelength bands corresponding to other color systems. Therefore, a light image of diffracted light having a peak wavelength in the wavelength band corresponding to red colors has a tendency that a red color tone of a reproduced image hardly changes even when the incident angle of the reproduction light changes. On the other hand, a light image of diffracted light having a peak wavelength in a wavelength band corresponding to a color system other than the red colors has a tendency that a color of a reproduced image easily changes to a color corresponding to a shorter wavelength when the incident angle of the reproduction light changes.

Therefore, the at least one light image can be reproduced in red even when the incident angle of the reproduction light is changed, by adjusting the diffraction characteristic (particularly, the maximum diffraction efficiency) of the hologram structure 11, and reproducing at least one of the light image of the first-order diffracted light (that is, the first light image) or the light image of the negative first-order diffracted light (that is, the second light image) mainly with red light (particularly, light corresponding to a wavelength of 680 nm to 780 nm).

In particular, one of the reproduced image of the first-order diffracted light and the reproduced image of the negative first-order diffracted light may be set to red (particularly, a color corresponding to the wavelength of 680 nm to 780 nm), and the other one may be set to a color other than red. For example, in the hologram structure 11 having the diffraction characteristics illustrated in FIGS. 33 and 35, in a case where the incident angle of the reproduction light is 0°, a negative first-order diffracted light image 100c has a red color and a first-order diffracted light image 100b has a green color as illustrated in FIGS. 33 and 34, but in a case where the incident angle of the reproduction light is 30°, the negative first-order diffracted light image 100c remains red, but the first-order diffracted light image 100b turns into blue as illustrated in FIGS. 35 and 36.

As described above, with the hologram structure 11 of the present modified example, even when the incident angle of the reproduction light changes, at least one of the light image of the first-order diffracted light or the light image of the negative first-order diffracted light can be reproduced in red. Such a hologram structure 11 can be used for design use, and is particularly suitable for security use such as authenticity determination. The observer 50 can observe the first-order diffracted light image 100b and the negative first-order diffracted light image 100c while changing the incident angle of the white light with respect to the hologram structure 11, thereby easily and accurately determining authenticity of the hologram holder 10 based on whether or not one or both of the first-order diffracted light image 100b and the negative first-order diffracted light image 100c remains red.

Note that it is preferable that there is no local maximum value of the diffraction efficiency that is half or more of the maximum diffraction efficiency in the wavelength band of not less than 380 nm and not more than 780 nm in the one wavelength distribution with respect to diffraction efficiency. That is, it is preferable that a local maximum value of the second highest diffraction efficiency in the wavelength band of not less than 380 nm and not more than 780 nm in the one wavelength distribution with respect to diffraction efficiency is less than half of the maximum diffraction efficiency. In this case, color bleeding and thickening at the periphery of the line can be effectively prevented, and thus a high-definition light image can be reproduced.

1-3-th Embodiment

In the present embodiment, the same or similar elements as those in the 1-1-th embodiment, the 1-2-th embodiment, and the modified examples thereof are denoted by the same reference signs, and a detailed description thereof will be omitted. In addition, among the description items related to the 1-1-th embodiment, the 1-2-th embodiment, and the modified examples thereof, a detailed description of items that can be similarly applied to a hologram structure 11 of the present embodiment will be omitted.

A hologram holder 10 and the hologram structure 11 according to the present embodiment have the same configurations as those of the 1-1-th embodiment, and it is sufficient that the hologram structure 11 includes factor elements 21 and an uneven surface 1a as illustrated in FIGS. 1, 2, and 5 to 7, and may be a reflection type (see FIG. 3) or a transmission type (see FIG. 4).

The hologram structure 11 of the present embodiment can provide a reproduced image with high visibility by substantially reducing an effect of 0th-order diffracted light in the reproduced light image as compared with the light modulation element according to the related art.

Figure 37:
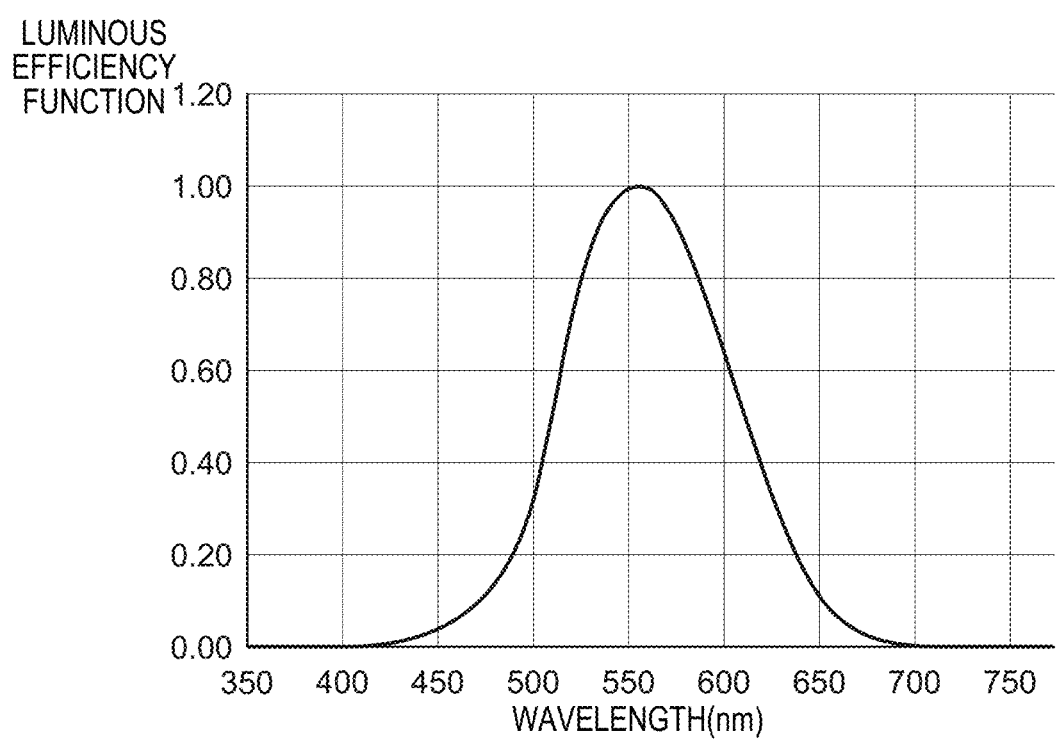
FIG. 37 is a graph illustrating a relationship between a wavelength of light (horizontal axis) and a luminous efficiency function (vertical axis).

FIG. 37 is a graph illustrating a relationship between a wavelength of light (horizontal axis) and a luminous efficiency function (vertical axis). The luminous efficiency function represents a degree of brightness perceived by human eyes, and is a dimensionless number which is a relative ratio (1 or less) of a degree of brightness at another wavelength with respect to the degree ("1") of brightness perceived by human eyes at a wavelength where the highest sensitivity of human eyes is achieved.

A brightness of the reproduced image actually observed by human eyes is equivalent to a value obtained by further multiplying the product of wavelength intensity distribution of the reproduction light to be incident on the hologram structure 11 and the diffraction efficiency by the luminous efficiency function. Therefore, by setting the peak wavelength of the 0th-order diffracted light to be in a wavelength band (specifically, 421 nm or less or 697 nm or more) in which the luminous efficiency function is 0.005 or less, the 0th-order diffracted light can be made significantly visually more inconspicuous as compared with the light modulation element according to the related art.

Therefore, in the hologram structure 11 of the present embodiment, the maximum diffraction efficiency of the 0th-order diffracted light for each factor element 21 is obtained at a wavelength of 421 nm or less or a wavelength of 697 nm or more. In this case, since the light image reproduced with the 0th-order diffracted light can be made inconspicuous, visibility of a light image reproduced by another diffracted light can be improved. Further, in the hologram structure 11, the maximum diffraction efficiency in the wavelength band of not less than 380 nm and not more than 780 nm in the wavelength distribution of the 0th-order diffracted light with respect to diffraction efficiency for each factor element 21 may be obtained at a wavelength of 421 nm or less or a wavelength of 697 nm or more. Note that, similarly to the hologram structures 11 of the 1-1-th embodiment and the 1-2-th embodiment, in the hologram structure 11 of the present embodiment, each factor element 21 has an uneven surface 1a, and a maximum diffraction efficiency in the wavelength band of not less than 380 nm and not more than 780 nm in wavelength distribution of first-order diffracted light with respect to diffraction efficiency and wavelength distribution of negative first-order diffracted light with respect to diffraction efficiency for each factor element 21 has a local maximum value with a full width at half maximum of 200 nm or less in wavelength distribution with respect to diffraction efficiency having the maximum diffraction efficiency.

Note that it is preferable that the maximum diffraction efficiency of the 0th-order diffracted light for each factor element 21 has a local maximum value with a full width at half maximum of 200 nm or less. In this case, most of the 0th-order diffracted light (that is, 0th-order diffracted light in a wavelength band in which diffraction efficiency equal to or more than half of the peak diffraction efficiency is ensured) is included in a wavelength of 421 nm or less or 697 nm or more with a low visibility. Therefore, a light image reproduced with the 0th-order diffracted light can be made significantly inconspicuous. Further, the maximum diffraction efficiency in the wavelength band of not less than 380 nm and not more than 780 nm in the wavelength distribution of the 0th-order diffracted light with respect to diffraction efficiency for each factor element 21 may have a local maximum value having a full width at half maximum of 200 nm or less.

Further, it is preferable that at least one of the wavelength distribution of the first-order diffracted light with respect to diffraction efficiency or the wavelength distribution of the negative first-order diffracted light with respect to diffraction efficiency for each factor element 21 has a local maximum value of diffraction efficiency in a wavelength band of 456 nm to 663 nm. In this case, a light image is reproduced with at least one of the first-order diffracted light or the negative first-order diffracted light in a wavelength band with a high luminous efficiency function, and the clearness of the light image can be improved.

Further, in particular, it is preferable that the maximum diffraction efficiency in the wavelength band of 456 nm to 663 nm in the wavelength distribution of the 0th-order diffracted light with respect to diffraction efficiency for each factor element 21 is less than 25% of the local maximum value shown in the wavelength band of 456 nm to 663 nm in at least one of the wavelength distribution of the first-order diffracted light with respect to diffraction efficiency or the wavelength distribution of the negative first-order diffracted light with respect to diffraction efficiency for each factor element 21. In this case, the diffraction efficiency of at least one of the first-order diffracted light or the negative first-order diffracted light can be sufficiently increased as compared with the diffraction efficiency of the 0th-order diffracted light in the wavelength band with a high luminous efficiency function. Thereby, the visibility of the light image reproduced with at least one of the first-order diffracted light or the negative first-order diffracted light can be more effectively improved.

The hologram structure 11 of the present embodiment described below includes a plurality of factor elements 21 configured as Fourier transform holograms that reproduce a light image by modulating a phase of reproduction light, and each factor element 21 has an uneven surface 1a with a different height of three or more steps. Then, as described above, the maximum diffraction efficiency of the 0th-order diffracted light for each factor element 21 is obtained at a wavelength of 421 nm or less or a wavelength of 697 nm or more. Further, the maximum diffraction efficiency in the wavelength band of not less than 380 nm and not more than 780 nm in the wavelength distribution of the 0th-order diffracted light with respect to diffraction efficiency for each factor element 21 may be obtained at a wavelength of 421 nm or less or a wavelength of 697 nm or more.

Figure 38:
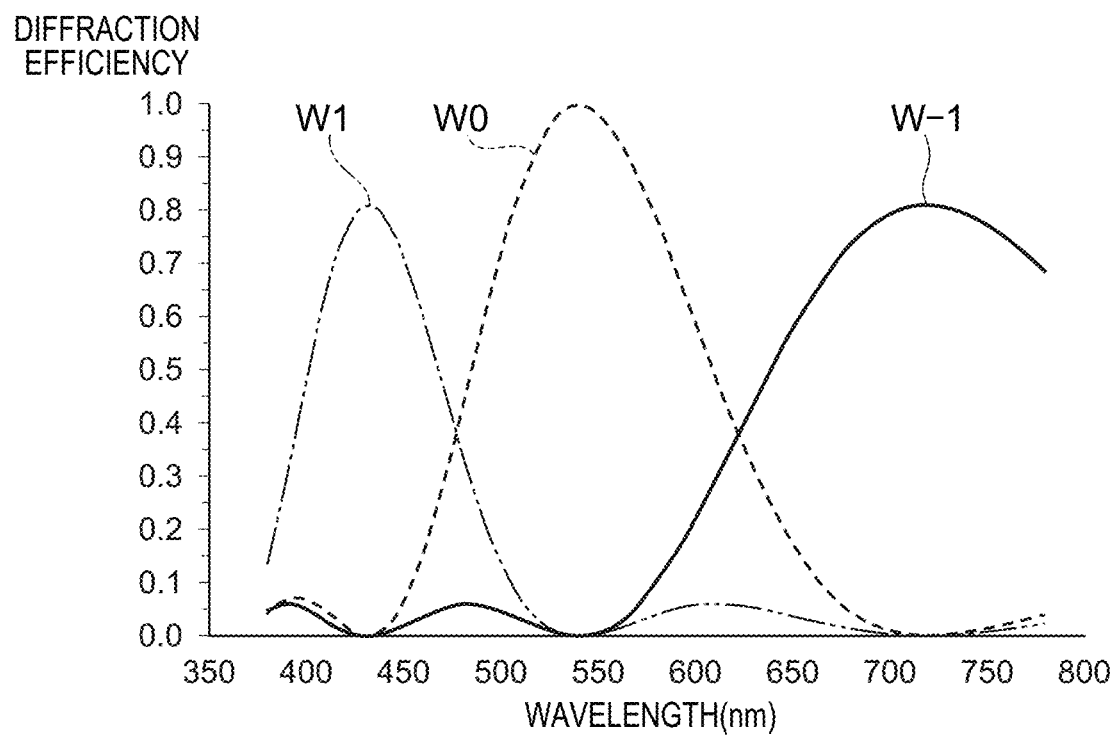
FIG. 38 is a diagram illustrating an example of a relationship between a wavelength (horizontal axis) and diffraction efficiency (vertical axis) of a general hologram structure.
Figure 39:
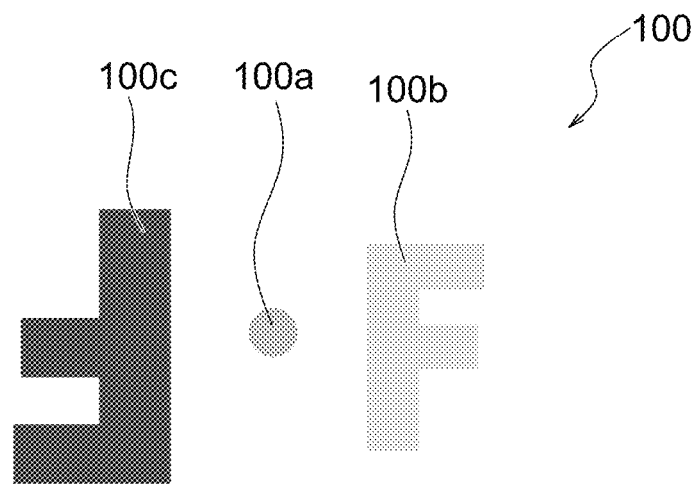
FIG. 39 is a diagram illustrating an example of a light image reproduced by the hologram structure having the diffraction characteristics of FIG. 38.
Figure 40:
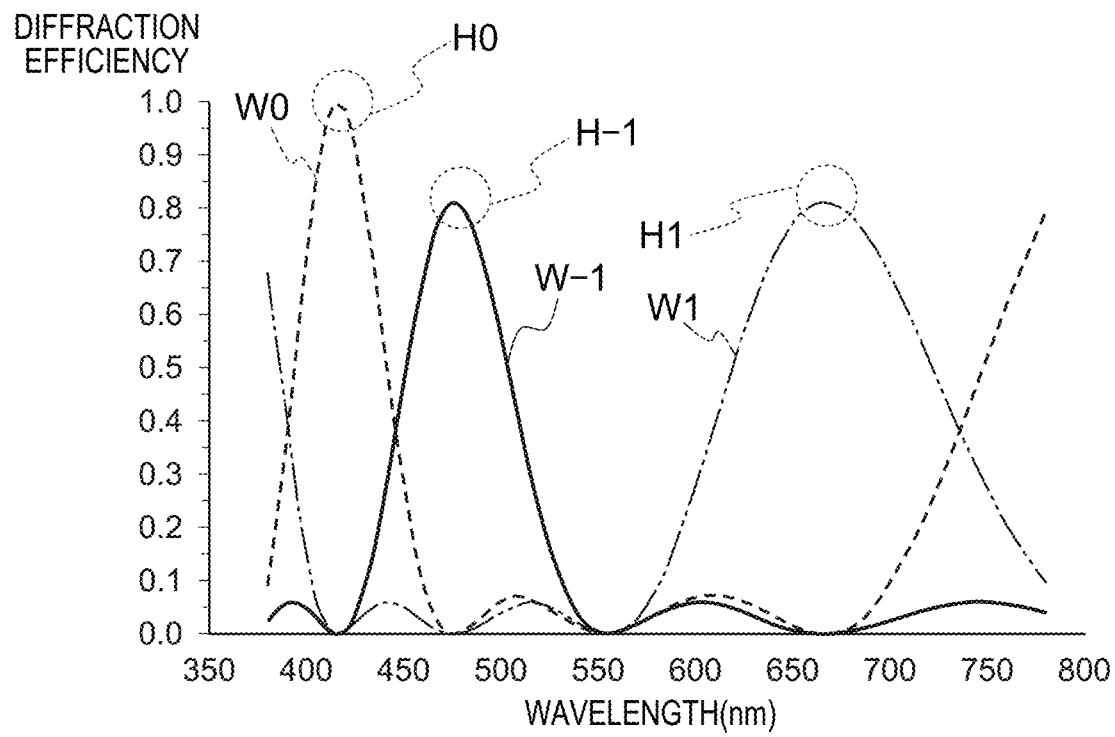
FIG. 40 is a diagram illustrating an example of a relationship between a wavelength (horizontal axis) and diffraction efficiency (vertical axis) of a hologram structure according to a 1-3-th embodiment of the first exemplary embodiment.
Figure 41:
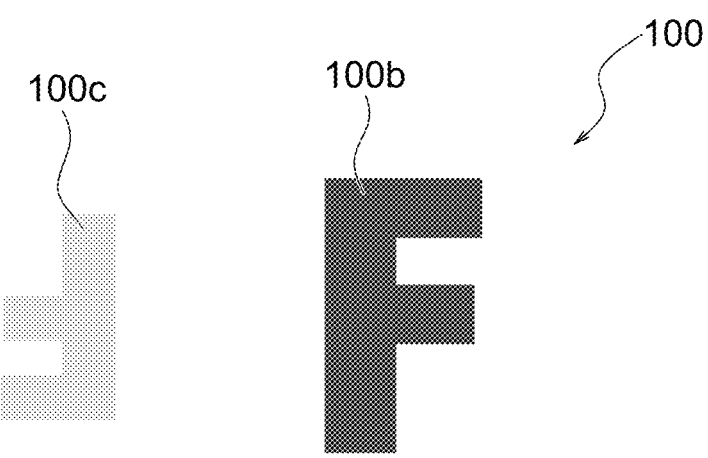
FIG. 41 is a diagram illustrating an example of a light image reproduced by the hologram structure having the diffraction characteristics of FIG. 40.

FIG. 38 is a diagram illustrating an example of a relationship between a wavelength (horizontal axis) and diffraction efficiency (vertical axis) of a general hologram structure 11. FIG. 39 is a diagram illustrating an example of a light image 100 reproduced by the hologram structure 11 having the diffraction characteristic of FIG. 38. FIG. 40 is a diagram illustrating an example of a relationship between a wavelength (horizontal axis) and diffraction efficiency (vertical axis) of the hologram structure 11 according to the 1-3-th embodiment. FIG. 41 is a diagram illustrating an example of a light image 100 reproduced by the hologram structure 11 having the diffraction characteristic of FIG. 40. Note that in FIGS. 38 and 40, wavelength distribution of the 0th-order diffracted light is indicated by "W0", wavelength distribution of the first-order diffracted light is indicated by "W1", and wavelength distribution of the negative first-order diffracted light is indicated by "W-1".

The hologram structure 11 having the diffraction characteristic of FIG. 38 is a reflection type and has the same configuration as that of FIG. 5, in which an uneven surface 1a of each factor element 21 has a four-step uneven structure, has a depth per step set to 180 nm, and is formed in a hologram layer 1 of which a refractive index is 1.5. In this case, as illustrated in FIG. 38, in the wavelength distribution of the 0th-order diffracted light with respect to diffraction efficiency, the diffraction efficiency has a peak in the visible light wavelength band (specifically, around 540 nm). Therefore, as illustrated in FIG. 39, a light image 100a reproduced with the 0th-order diffracted light visibly appears in green between a first-order diffracted light image 100b and a negative first-order diffracted light image 100c.

On the other hand, the hologram structure 11 having the diffraction characteristic of FIG. 40 is a reflection type and has the same configuration as that of FIG. 5, in which the uneven surface 1a of each factor element 21 has a four-step uneven structure, has a depth per step set to 277.5 nm, and is formed by a hologram layer 1 of which a refractive index is 1.5. In this case, as illustrated in FIG. 40, a maximum diffraction efficiency (see Reference Sign "H0" in FIG. 40) of the 0th-order diffracted light for each factor element 21 is obtained at a wavelength of 421 nm or less. Further, the maximum diffraction efficiency of the 0th-order diffracted light for each factor element 21 has a local maximum value with a full width at half maximum of 200 nm or less. Further, the maximum diffraction efficiency in the wavelength band of not less than 380 nm and not more than 780 nm in the wavelength distribution of the 0th-order diffracted light with respect to diffraction efficiency for each factor element 21 may be obtained at a wavelength of 421 nm or less, or the maximum diffraction efficiency in the wavelength band of not less than 380 nm and not more than 780 nm in the wavelength distribution of the 0th-order diffracted light with respect to diffraction efficiency for each factor element 21 may have a local maximum value with a full width at half maximum of 200 nm or less. Further, at least one of the wavelength distribution of the first-order diffracted light with respect to diffraction efficiency or the wavelength distribution of the negative first-order diffracted light with respect to diffraction efficiency for each factor element 21 has a local maximum value (see Reference Sign "H1" and "H-1" in FIG. 40) of diffraction efficiency in the wavelength band of 456 nm to 663 nm. Further, a maximum diffraction efficiency in the wavelength band of 456 nm to 663 nm in the wavelength distribution of the 0th-order diffracted light with respect to diffraction efficiency for each factor element 21 is less than 25% of the local maximum value (see Reference Signs "H1" and "H-1" in FIG. 40) shown in the wavelength band of 456 nm to 663 nm in at least one of the wavelength distribution of the first-order diffracted light with respect to diffraction efficiency or the wavelength distribution of the negative first-order diffracted light with respect to diffraction efficiency for each factor element 21.

With the hologram structure 11 having the diffraction characteristic illustrated in FIG. 40, a light image of the 0th-order diffracted light does not visibly appear between a first-order diffracted light image 100b and a negative first-order diffracted light image 100c as illustrated in FIG. 41.

As described above, with the hologram structure 11 of the present embodiment, since the light image reproduced with the 0th-order diffracted light is not visible or appears so as to be visible but inconspicuous, the light images 100 of the first-order diffracted light and the negative first-order diffracted light can be reproduced with excellent visibility without devising the original image. Therefore, for example, even in a case of reproducing a light image (that is, the original image) having no bright portion at the center, it is possible to clearly and conspicuously reproduce light images with other diffracted light so that the light image reproduced with the 0th-order diffracted light becomes inconspicuous.

Note that the hologram structure 11 of the present embodiment can reproduce a light image with better visibility as compared with the light modulation element according to the related art which conspicuously reproduces an image of the 0th-order diffracted light, and thus, the hologram structure 11 of the present embodiment is suitable for both of design use and security use such as authenticity determination. In particular, a filter that cuts a peak wavelength of the 0th-order diffracted light by adjusting the diffraction characteristic of the hologram structure 11 to make the peak wavelength of the 0th-order diffracted light different from the peak wavelengths of the first-order diffracted light and the negative first-order diffracted light in the visible light wavelength band (for example, the wavelength band of not less than 380 nm and not more than 780 nm) can be used in combination with the hologram structure 11. As an example, in a case where, in the wavelength band of not less than 380 nm and not more than 780 nm, a wavelength band showing diffraction efficiency that is half or more of the maximum diffraction efficiency in the wavelength distribution of the 0th-order diffracted light with respect to diffraction efficiency does not overlap with wavelength bands showing diffraction efficiency that is half or more of the maximum diffraction efficiency in the wavelength distributions of the first-order diffracted light and the negative first-order diffracted light with respect to the diffracted efficiency, the filter that cuts a peak wavelength of such a 0th-order diffracted light can be used. In a case where such a filter is used, it is possible to more reliably prevent a light image from being reproduced with the 0th-order diffracted light. Therefore, for example, in a case of determining suitability of the reproduced image of the hologram structure 11 by using a device for security use, determination can be performed with a high accuracy, and the reliability of authentication can be improved.

[Depth of Uneven Surface]

The hologram structure 11 of the present embodiment can be manufactured by the same method as the method of manufacturing the hologram structure 11 of the 1-1-th embodiment, and the uneven surface 1a having a unique uneven depth for making a light image of the 0th-order diffracted light inconspicuous can be formed in the hologram layer 1.

For example, the reflection type hologram structure 11 having the diffraction characteristic of the present embodiment has the same configuration as that of FIG. 5, in which the uneven surface 1a of each factor element 21 has a four-step uneven structure, has a depth per step set to 277.5 nm, and is formed in a case where a refractive index of the hologram layer 1 is 1.5. In this case, a light path length per step of the uneven surface 1a is 832.5 nm, a blue light image is reproduced with the negative first-order diffracted light, a red light image is reproduced with the first-order diffracted light, and a light image reproduced with the 0th-order diffracted light is very dark and is thus significantly inconspicuous.

Further, as another example, in the reflection type hologram structure 11, in a case where the refractive index of the hologram layer 1 is 1.5, and the uneven surface 1a of each factor element 21 has an eight-step uneven structure and has a depth per step set to 277.5 nm, a blue light image is reproduced with the negative first-order diffracted light, a red light image is reproduced with the first-order diffracted light, and a light image reproduced with the 0th-order diffracted light is very dark and is thus significantly inconspicuous. Further, as for the transmission type hologram structure 11, in a case where the refractive index of the hologram layer 1 is 1.5, the uneven surface 1a of each factor element 21 has a four-step uneven structure and has a depth per step set to 1665 nm, and the transmission type hologram structure 11 is used in an air environment having a refractive index of 1.0, a blue light image is reproduced with the negative first-order diffracted light, a red light image is reproduced with the first-order diffracted light, and a light image reproduced with the 0th-order diffracted light is very dark and is thus significantly inconspicuous.

Meanwhile, in the reflection type hologram structure 11, in a case where the refractive index of the hologram layer 1 is 1.5, and the uneven surface 1a of each factor element 21 has a four-step uneven structure and has a depth per step set to 180 nm, a red light image is reproduced with the negative first-order diffracted light, a blue light image is reproduced with the first-order diffracted light, and a light image reproduced with the 0th-order diffracted light is reproduced in green and thus is conspicuous (see FIG. 39).

[Relationship between Depth of Uneven Surface and Peak Wavelength of Reproduced Image]

When a light path length modulated per step of the uneven surface 1a is represented by l, and a natural number is represented by m, a peak wavelength $\lambda 0$ of the 0th-order diffracted light reproduced by the hologram structure 11 is represented by the following equation, and does not depend on the number N of steps of the uneven surface 1a.

$$\lambda 0 = l/m$$

As described above, one of features of the hologram structure 11 of the present embodiment is that the light image reproduced with the 0th-order diffracted light is visually inconspicuous. This can be realized when the peak wavelength $\lambda 0$ of the 0th-order diffracted light is not present in the wavelength band (that is, 421 nm to 697 nm) in which the luminous efficiency function is 0.005 or more. For example, in a case where the light path length l is 832.5 nm in the reflection type hologram structure 11, the peak wavelength $\lambda 0$ of the 0th-order diffracted light can be 832.5/m. In this case, $\lambda 0=832.5$ nm when m=1, $\lambda 0=416.25$ nm when m=2, and $\lambda 0=277.5$ nm when m=3. In a case where m=4 or more, $\lambda 0$ has a smaller value. Since the peak wavelengths $\lambda 0$ of the 0th-order diffracted light are not included in the wavelength band (a wavelength band of more than 421 nm and less than 697 nm) in which the luminous efficiency function is 0.005 or more, it is possible to observe the light image 100 of the 0th-order diffracted light that is inconspicuous by setting the light path length l to 832.5 nm.

Modified Example 3-1

The hologram structure 11 may include a plurality of regions, and a region where the plurality of factor elements 21 according to the above-described embodiment are arranged, and a region where the plurality of factor elements 21 having other diffraction characteristics are arranged may be arranged side by side.

Figure 42A:
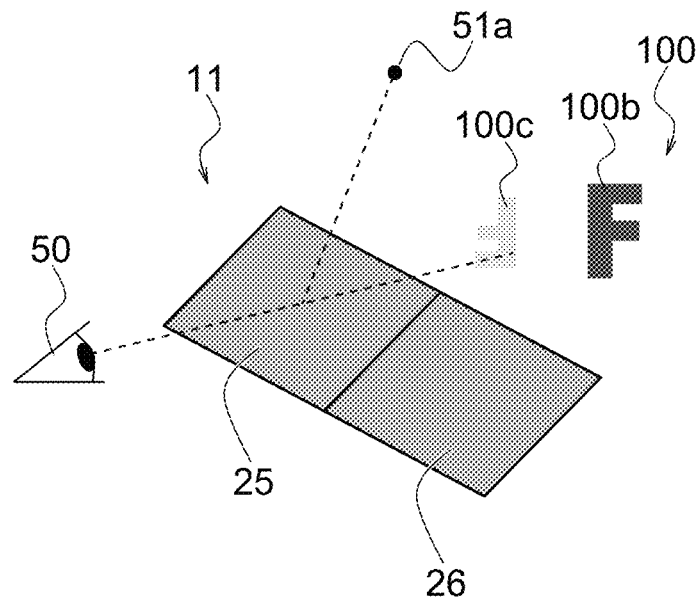
FIG. 42A is a schematic diagram for describing a light image reproduced by an example of a reflection type hologram structure according to Modified Example 3-1 of the first exemplary embodiment, and illustrates a light image reproduced through a first region.
Figure 42B:
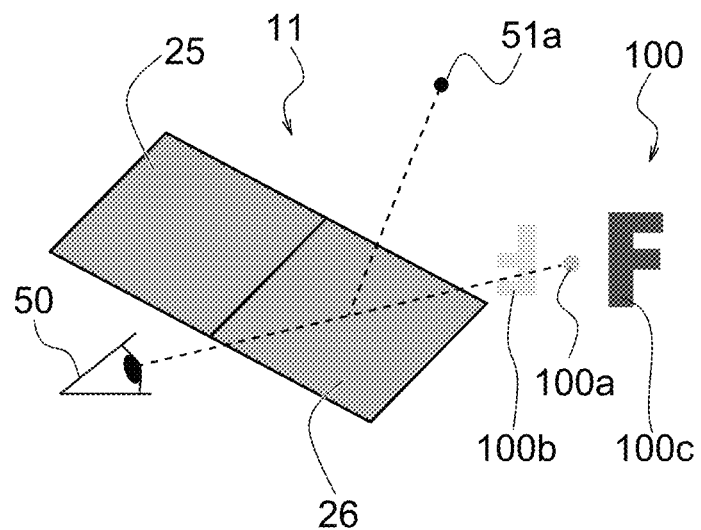
FIG. 42B illustrates a light image reproduced through a second region of the hologram structure of FIG. 42A.

FIG. 42A is a schematic diagram for describing a light image 100 reproduced by an example of the reflection type hologram structure 11 according to Modified Example 3-1, and illustrates a light image 100 reproduced through a first region 25. FIG. 42B illustrates a light image 100 reproduced through a second region 26 of the hologram structure 11 of FIG. 42A.

The hologram structure 11 of FIGS. 42A and 42B includes the first region 25 and the second region 26. In the first region 25, a plurality of first type factor elements 21 are arranged, and in the second region 26, a plurality of second type factor elements 21 are arranged. Further, a light image of first-order diffracted light and a light image of negative first-order diffracted light reproduced by the first type factor elements 21, and a light image of the first-order diffracted light and a light image of the negative first-order diffracted light reproduced by the second type factor elements 21 have shape similarity. Examples of the light images having shape similarity here include pairs of light images having the same or almost the same shape visually, and the sizes of these light images may be the same as each other or may be different from each other. In addition, examples of the light images having the shape similarity also include a pair of light images that form a picture, a letter, or the like with a specific intention by being combined with each other. Further, a maximum diffraction efficiency of 0th-order diffracted light for the first type factor elements 21 can be obtained at a wavelength of 421 nm or less or a wavelength of 697 nm or more. Meanwhile, a maximum diffraction efficiency of the 0th-order diffracted light for the second type factor elements 21 can be obtained at a wavelength of more than 421 nm and less than 697 nm. Further, a maximum diffraction efficiency in the wavelength band of not less than 380 nm and not more than 780 nm in wavelength distribution of the 0th-order diffracted light with respect to diffraction efficiency for the first type factor elements 21 may be obtained at a wavelength of 421 nm or less or a wavelength of 697 nm or more, and a maximum diffraction efficiency in the wavelength band of not less than 380 nm and not more than 780 nm in wavelength distribution of the 0th-order diffracted light with respect to diffraction efficiency for the second type factor elements 21 may be obtained at a wavelength of more than 421 nm and less than 697 nm.

In addition, in a case where white light is incident on the first type factor elements 21 and the second type factor elements 21, a first-order diffracted light image 100b of the first type factor elements 21 and a negative first-order diffracted light image 100c of the second type factor elements 21 have colors (for example, red colors) in the same color system, and a negative first-order diffracted light image 100c of the first type factor elements 21 and a first-order diffracted light image 100*b* of the second type factor elements 21 have colors (for example, blue colors) in the same color system.

When the white light is incident on the above-described first region 25, as illustrated in FIG. 42A, the first-order diffracted light image 100*b* and the negative first-order diffracted light image 100*c* reproduced by the first type factor element 21 are visibly reproduced, but a light image of the 0th-order diffracted light is reproduced so as to be invisible or inconspicuous. On the other hand, when the white light is incident on the second region 26 where the second type factor elements 21 are arranged, as illustrated in FIG. 42B, a 0th-order diffracted light image 100*a* is visibly reproduced together with the first-order diffracted light image 100*b* and the negative first-order diffracted light image 100*c*.

In the hologram structure 11 illustrated in FIGS. 42A and 42B, the first region 25 and the second region 26 are provided adjacent to each other. The observer 50 can recognize a change in presence or absence of the 0th-order diffracted light image 100*a* while recognizing the sameness of shape and color of the first-order diffracted light image 100*b* and the negative first-order diffracted light image 100*c* by continuously and repeatedly performing observation of the light image 100 reproduced through the first region 25 and observation of the light image 100 reproduced through the second region 26 while moving the hologram structure 11. Such a hologram structure 11 can be used for design use, and is particularly suitable for security use such as authenticity determination. The observer 50 can easily and reliably determine the authenticity of the hologram holder 10 based on the presence or absence of a change of the 0th-order diffracted light image 100*a* by using white light.

[Use]

The use form or application of the hologram structure 11 (light modulation element) and the hologram holder 10 is not particularly limited, and the hologram structure 11 and the hologram holder 10 can be used for entertainment use such as reproducing a character image, and design use. Further, in security use, the hologram structure 11 (light modulation element) can be applied to, for example, the following objects. In a case of using the hologram holder 10 as an information recording medium, the light modulation element and the information recording medium according to the present invention can be applied to, for example, a passport, an ID card, a banknote, a credit card, a cash voucher, a gift certificate, other tickets, public documents, other media in which various information such as personal information and confidential information are recorded, and other media having a monetary value, and thus can prevent forgery of these objects. Examples of the ID card mentioned here include a national ID card, a license, a membership card, an employee card, and a student card. In the hologram holder 10, the substrate (see Reference Sign "4" in FIG. 2) that holds the hologram structure 11 can be formed of, for example, paper, resin, metal, synthetic fiber, or a combination thereof. Further, in a case where an opening portion (see Reference Sign "4*a*" in FIG. 2) is formed in the substrate, an entire area of the opening portion may be covered with the hologram structure 11, or the hologram structure 11 may be arranged only in a part of the opening portion. The hologram structure 11 can be configured as a transparent member in appearance. For example, a point light source is arranged on a back side of the hologram holder 10 that holds the transmission type hologram structure 11, the point light source is observed by the observer through the hologram structure 11 from a front side of the hologram holder 10, such that the observer can see security information recorded in the hologram structure 11. The security information can be used, for example, for authenticity determination of the hologram holder 10.

Further, it is possible to apply the light modulation element according to the present invention to the hologram holder 10 in any method, for example, the light modulation element according to the present invention can be held by an arbitrary object (that is, the hologram holder 10) by using a technique such as unevenness formation on the surface of the hologram holder 10, transferring, adhering, sandwiching, or embedding. Therefore, the hologram structure 11 may be formed by using a part of the member constituting the hologram holder 10, or the hologram structure 11 may be additionally provided in the hologram holder 10.

Further, the hologram structure 11 may be used alone for various uses, or may be used for various uses by being used together with another functional layer such as a print layer.

[Material for Forming Hologram Layer]

A material for forming the hologram layer 1 is not particularly limited, but as described above, the hologram layer 1 can be formed of various resins. Hereinafter, specific examples of the various resins will be listed.

Examples of a thermosetting resin for forming the hologram layer 1 include an unsaturated polyester resin, an acrylic-modified urethane resin, an epoxy-modified acrylic resin, an epoxy-modified unsaturated polyester resin, an alkyd resin, and a phenol resin. Further, Examples of a thermoplastic resin for forming the hologram layer 1 include polycarbonate (PC), polyethylene terephthalate (PET), glycol-modified polyethylene terephthalate (PET-G), polyvinyl chloride (PVC), an acrylic acid ester resin, an acrylamide resin, a nitrocellulose resin, and a polystyrene resin. These resins may be homopolymers or copolymers including two or more types of components. Further, these resins may be used alone or in combination of two or more.

The thermosetting resin or thermoplastic resin may contain a heat curing agent or ultraviolet curing agent such as various isocyanate compounds, cobalt naphthenate, metal soaps such as zinc naphthenate, benzoyl peroxide, organic peroxides such as methyl ethyl ketone peroxide, benzophenone, acetophenone, anthraquinone, naphthoquinone, azobisisobutyronitrile, and diphenyl sulfide.

Examples of the ionizing radiation curable resin for forming the hologram layer 1 include an epoxy-modified acrylate resin, a urethane-modified acrylate resin, and an acrylic-modified polyester resin, and among these, the urethane-modified acrylate resin is preferable, and a urethane-modified acrylic resin represented by Chemical Formula in Japanese patent application publication No. 2007-017643 is particularly preferable.

When curing the ionizing radiation curable resin, a monofunctional or polyfunctional monomer, oligomer, or the like can be used in combination for the purpose of adjusting a crosslink structure, viscosity, and the like. Examples of the monofunctional monomer include mono(meth)acrylates such as tetrahydrofurfuryl (meth)acrylate, hydroxyethyl (meth)acrylate, vinylpyrrolidone, (meth)acryloyloxyethyl succinate, and (meth)acryloyloxyethyl phthalate. Further, examples of a monomer having two or more functional groups include, when classified according to a skeleton structure, polyol (meth)acrylate (for example, epoxy-modified polyol (meth)acrylate, and lactone-modified polyol (meth)acrylate), polyester (meth)acrylate, epoxy (meth) acrylate, urethane (meth)acrylate, and other poly(meth)acrylates having a skeleton such as polybutadienes, isocyanuric acids, hydantoins, melamines, phosphoric acids, imides, or phosphazenes. Furthermore, various monomers, oligomers, and polymers that are curable with ultraviolet rays and electron beams can be used.

More specifically, examples of a bifunctional monomer or oligomer include polyethylene glycol di(meth)acrylate, polypropylene glycol di(meth)acrylate, neopentyl glycol di(meth)acrylate, and 1,6-hexanediol di(meth)acrylate. Examples of a trifunctional monomer, oligomer, and polymer include trimethylolpropane tri(meth)acrylate, pentaerythritol tri(meth)acrylate, and aliphatic tri(meth)acrylate. Examples of a tetrafunctional monomer or oligomer include pentaerythritol tetra(meth)acrylate, ditrimethylolpropane tetra(meth)acrylate, and aliphatic tetra(meth)acrylate. Examples of a monomer or oligomer having five or more functional groups include dipentaerythritol penta(meth)acrylate and dipentaerythritol hexa(meth)acrylate. In addition, (meth)acrylates having a polyester skeleton, a urethane skeleton, and a phosphazene skeleton are included. The number of functional groups is not particularly limited, but when the number of functional groups is less than three, a heat resistance tends to decrease, and when the number of functional groups exceeds 20, flexibility tends to decrease, and thus it is preferable that the number of functional groups is in a range of 3 to 20.

Although a content of the monofunctional or polyfunctional monomer or oligomer as described above can be appropriately adjusted, in general, the content of the monofunctional or polyfunctional monomer or oligomer is preferably 50 parts by weight or less based on 100 parts by weight of the ionizing radiation curable resin, and is particularly preferably within a range of 0.5 to 20 parts by weight.

In addition, if necessary, a photopolymerization initiator, a polymerization inhibitor, a deterioration inhibitor, a plasticizer, a lubricant, a coloring agent such as a dye or a pigment, a surfactant, an antifoaming agent, a leveling agent, and an additive such as a thixotropic agent may be appropriately added to the hologram layer 1.

In a case where the hologram layer 1 has a self-supporting property, the thickness of the hologram layer 1 is preferably in a range of 0.05 mm to 5 mm, and more preferably, in a range of 0.1 mm to 3 mm. On the other hand, in a case where the hologram layer 1 is formed on a (transparent) substrate without having the self-supporting property, the thickness of the hologram layer 1 is preferably in a range of 0.1 μm to 50 μm, and more preferably, in a range of 2 μm to 20 μm. Further, the size of the hologram layer 1 (for example, the size in plan view) can be appropriately set according to the use of the hologram structure 11.

Other Modified Examples

The hologram structure 11 used in each of the above-described embodiments and modified examples includes a plurality of factor elements 21 as illustrated in FIG. 5, but the hologram structure 11 may also include a single factor element 21.

Further, the size and the shape of each factor element 21 in plan view are not particularly limited, and each factor element 21 can have an arbitrary size and shape. For example, the shape of each factor element 21 in plan view may be a quadrangular shape such as a square shape, a rectangular shape, or a trapezoid shape, another polygonal shape (for example, a triangle shape, a pentagon shape, or a hexagon shape), a perfect circle shape, an ellipse shape, another circle shape, a star shape, a heart shape, or the like, or the hologram structure 11 may include a factor element 21 having two or more shapes in plan view.

Further, an arbitrary functional layer may be added to the hologram structure 11, for example, the hologram structure 11 may be covered with a transparent vapor deposition layer. In particular, it is possible to prevent the hologram structure 11 from being glossy to hide the hologram structure 11 by providing a transparent vapor deposition layer with no gloss. From the viewpoint of hiding the hologram structure 11, a total light transmittance of such a transparent vapor deposition layer is preferably 80% or more, and more preferably, 90% or more. Further, in a case of the reflection type hologram structure 11, the hologram structure 11 can be covered with a reflective vapor deposition layer (see the reflection layer 2 in FIG. 2). Examples of a material for forming the reflective vapor deposition layer include metal such as Mg, Al, Ti, Cr, Fe, Co, Ni, Cu, Zn, Ga, Ge, Se, Rb, Pd, Ag, Cd, In, Sn, Sb, Te, Au, Pb, or Bi. Further, examples of a material for forming the transparent vapor deposition layer include oxides and sulfides of the above-mentioned metal, such as ZnS and $TiO_2$. These materials may be used alone to form the vapor deposition layer, or two or more materials may be combined to form the vapor deposition layer.

The thickness of the vapor deposition layer provided on the hologram layer 1 (particularly, on the uneven surface 1a) can be appropriately set in consideration of desired reflectivity, color tone, design, use, and the like, and, for example, the thickness of the vapor deposition layer is preferably in a range of 50 Å to 1 μm, and particularly preferably, in a range of 100 Å to 1000 Å. In particular, it is preferable that the thickness of the vapor deposition layer is 200 Å or less when priority is given to transparency of the vapor deposition layer, and it is preferable that the thickness of the vapor deposition layer is more than 200 Å when priority is given to a hiding property of the vapor deposition layer. Further, as a method of forming the vapor deposition layer, a general method of forming a vapor deposition layer can be employed, and examples thereof include a vacuum vapor deposition method, a sputtering method, and an ion plating method.

Second Exemplary Embodiment

In the present exemplary embodiment, the same or similar elements as those in the first exemplary embodiment are denoted by the same reference signs, and a detailed description thereof will be omitted.

2-1-th Embodiment

FIG. 8 illustrates an example of a relationship between wavelength distribution and diffraction efficiency of first-order diffracted light for each factor element 21 according to the second exemplary embodiment. In FIG. 8, a horizontal axis represents a wavelength, and a vertical axis represents diffraction efficiency. When the diffraction efficiency is represented by an amount obtained by dividing a radiant flux of light diffracted in a certain direction by a radiant flux of light incident on each factor element 21, the radiant flux of the diffracted light in a certain direction is represented by P, and the radiant flux of the incident light is represented by P0, the diffraction efficiency η is a dimensionless number represented by "η=P/P0". Each factor element 21 exhibits a specific diffraction efficiency according to a wavelength, and in the example illustrated in FIG. 8, in a case of the first-order diffracted light, light having a wavelength (see Reference Sign "H1" in FIG. 8) near 580 nm has a local maximum value Dmax. Note that although FIG. 8 illustrates an example of wavelength distribution of the first-order diffracted light, wavelength distribution of negative first-order diffracted light also shows a specific diffraction efficiency according to the wavelength and shows a local maximum value of diffraction efficiency at a specific wavelength.

FIGS. 9 to 12 are each a schematic diagram for describing a light image 100 reproduced by the hologram structure 11. Note that, in each of FIGS. 9 to 12, a light source used in the reflection type hologram structure 11 is denoted by Reference Sign "51a", and a light source used in the transmission type hologram structure 11 is denoted by Reference Sign "51b". Further, in the following description, these light sources 51a and 51b are collectively denoted by Reference Sign "51".

In general, in the diffraction phenomenon, as the wavelength of the incident light increases, a diffraction angle of the diffracted light other than the 0th-order diffracted light increases. Therefore, when white light is incident, from the light source 51, on the general hologram structure 11 that exhibits substantially the same diffraction efficiency over the entire visible light wavelength band, the hologram structure 11 reproduces an iridescent light image 100 as illustrated in FIG. 9. Meanwhile, in a case where white light is incident, from the light source 51, on the hologram structure 11 in which one of the first-order diffracted light and the negative first-order diffracted light has only one local maximum value of the diffraction efficiency (for example, a local maximum value of the diffraction efficiency of 0.15 or more in a case where the number of steps of the uneven structure of the hologram structure 11 is two, or a local maximum value of the diffraction efficiency of 0.3 or more in a case where the number of steps of the uneven structure is three or more) in the wavelength band of 380 nm or more and less than 780 nm included in the visible light wavelength band, the hologram structure 11 reproduces a light image 100 in a single color as illustrated in FIGS. 10 to 12.

That is, the hologram structure 11 (especially, the uneven surface 1a) of FIGS. 10 to 12 has a diffraction structure optimized for light having a specific wavelength and light in a wavelength band in the vicinity of the specific wavelength, and a light image 100 with a specific color is reproduced by selectively using the light having the specific wavelength and the light in the wavelength band in the vicinity of the specific wavelength among light having various wavelengths. For example, in the hologram structure 11 of FIG. 10, diffraction efficiency of the first-order diffracted light or the negative first-order diffracted light has a local maximum value in a blue wavelength band, and a blue light image 100 is reproduced. In the hologram structure 11 of FIG. 11, diffraction efficiency of the first-order diffracted light or the negative first-order diffracted light has a local maximum value in a wavelength band corresponding to green colors, and a green light image 100 is reproduced. In the hologram structure 11 of FIG. 12, diffraction efficiency of the first-order diffracted light or the negative first-order diffracted light has a local maximum value in a wavelength band corresponding to red colors, and a red light image 100 is reproduced. Note that the light images 100 in FIGS. 10 to 12 are different in size from each other, but this difference is based on a difference in diffraction angle caused by a difference in wavelength of the light (that is, the first-order diffracted light and/or the negative first-order diffracted light) forming the light image 100.

As described above, the hologram structure 11 in which the diffraction efficiency has a local maximum value (particularly, a single local maximum value) in the wavelength band of 380 nm or more and less than 780 nm can reproduce the light image 100 in a single color even in a case where white light is incident. The light image 100 reproduced in this way is a clear image with almost no blur resulting from chromatic dispersion. In addition, since the light image 100 can be reproduced in a specific color, it is possible to give the observer 50 a specific impression based on the color, for example, it is possible to reproduce the light image 100 with a color that matches a specific concept expressed by the light image 100 in terms of common belief to clearly express the concept represented by the light image 100 to the observer 50. Furthermore, since the hologram structure 11 is configured to reproduce the light image 100 in a single specific color, for example, in authenticity determination, not only a "picture" of the reproduced light image 100 but also a "color" of the light image 100 can be used, which enables highly reliable authenticity determination. In addition, the hologram structure 11 of the present embodiment as described below does not require addition of a layer that selectively transmits or reflects light in a specific wavelength band, and thus manufacturing costs can be reduced and even when the observer 50 observes a surrounding area through the hologram structure 11, an observed image does not cause any discomfort.

Based on the above-described characteristics, in the hologram structure 11 of the present embodiment, at least one of the wavelength distribution of the first-order diffracted light with respect to diffraction efficiency or the wavelength distribution of the negative first-order diffracted light with respect to diffraction efficiency for each factor element 21 has a local maximum value of the diffraction efficiency in at least one of a wavelength band of not less than 380 nm and not more than 600 nm or a wavelength band of not less than 780 nm to not more than 1200 nm. That is, both of the first-order diffracted light and the negative first-order diffracted light for each factor element 21 of the present embodiment, or only one of the first-order diffracted light and the negative first-order diffracted light has a local maximum value of the diffraction efficiency (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) in at least one of the wavelength band of not less than 380 nm and not more than 600 nm or the wavelength band of not less than 780 nm to not more than 1200 nm. Specifically, as described later, each factor element 21 can have a desired diffraction characteristic by adjusting the number of steps and the depth of the uneven surface 1a, a refractive index of the material for forming the hologram structure 11 (in particular, the hologram layer 1), and other related parameters. With the hologram structure 11 having such a wavelength distribution with respect to diffraction efficiency, the colors of the light images reproduced with the first-order diffracted light and the negative first-order diffracted light can be changed, and it is possible to make at least a part of the light image visually disappear, or make at least a part of the light image visually appear, by changing the incident angle of the reproduction light with respect to each factor element 21.

As the incident angle of the reproduction light with respect to each factor element 21 is increased from 0°, a wavelength showing the local maximum value of the diffraction efficiency of each diffracted light shifts to a shorter wavelength side. Therefore, in the hologram structure 11 in which at least one of the first-order diffracted light or the negative first-order diffracted light has a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of the diffraction efficiency in the wavelength band of not less than 380 nm and not more than 600 nm, when the incident angle of the reproduction light with respect to each factor element 21 is increased, the wavelength showing the local maximum value of the diffraction efficiency of at least one of the first-order diffracted light or the negative first-order diffracted light can be a wavelength less (that is, shorter) than 380 nm. In this case, the local maximum value of the diffraction efficiency shown in the visible light wavelength band (that is, the wavelength band of not less than 380 nm and not more than 600 nm) before increasing the incident angle of the reproduction light is shown outside the visible light wavelength band (that is, in the ultraviolet wavelength band) after increasing the incident angle of the reproduction light. Therefore, with an increase in the incident angle of the reproduction light, a light image formed with light having a wavelength showing the local maximum value and light in a wavelength band in the vicinity thereof shifts from a visible state to an invisible state (or a hardly recognizable state).

On the other hand, in the hologram structure 11 in which at least one of the first-order diffracted light or the negative first-order diffracted light has a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of the diffraction efficiency in the wavelength band of not less than 780 nm to not more than 1200 nm, when the incident angle of the reproduction light with respect to each factor element 21 is increased, the wavelength showing the local maximum value of the diffraction efficiency of at least one of the first-order diffracted light or the negative first-order diffracted light can be a wavelength less than 780 nm. In this case, the local maximum value of the diffraction efficiency shown outside the visible light wavelength band (that is, in the ultraviolet wavelength band) before increasing the incident angle of the reproduction light is shown in the visible light wavelength band (that is, the wavelength band of less than 780 nm) after increasing the incident angle of the reproduction light. Therefore, with an increase in the incident angle of the reproduction light, a light image formed with light having a wavelength showing the local maximum value and light in a wavelength band in the vicinity thereof shifts from an invisible state (or a hardly recognizable state) to a visible state.

As described above, the hologram structure 11 of the present embodiment is configured so that the wavelength band of the light for reproducing the light image is a wavelength band of less than 380 nm or the wavelength band of less than 780 nm in accordance with a change in the incident angle of the reproduction light with respect to each factor element 21. In general, light in the wavelength band of less than 380 nm corresponds to ultraviolet light, and light in a wavelength band of 780 nm or more corresponds to infrared light, and neither ultraviolet light nor infrared light is usually invisible or hardly visible. Therefore, the diffraction characteristic of each factor element 21 may be set so that a wavelength band of main light for forming the light image is 380 nm or more and less than 780 nm (particularly, 380 nm to 600 nm) before changing the incident angle of the reproduction light with respect to each factor element 21, and the wavelength band of the main light for forming the light image is less than 380 nm after changing the incident angle of the reproduction light with respect to each factor element 21. In this case, according to the change in the incident angle of the reproduction light, the reproduced light image can switch from a visible state to a hardly visible state (or a completely invisible state). As such, with the hologram structure 11 of the present embodiment, the light image can become invisible in accordance with the change in the incident angle of the reproduction light with respect to each factor element 21. Alternatively, the diffraction characteristic of each factor element 21 may be set so that the wavelength band of the main light for forming the light image is 780 nm or more (particularly, 780 nm to 1200 nm) before changing the incident angle of the reproduction light with respect to each factor element 21, and the wavelength band of the main light for forming the light image is 380 nm or more and less than 780 nm after changing the incident angle of the reproduction light with respect to each factor element 21. In this case, according to the change in the incident angle of the reproduction light, the reproduced light image can switch from a hardly visible state (or a completely invisible state) to a visible state.

Such a change in the visual appearance and disappearance of the light image can be recognized very easily and reliably by the observer. Therefore, the hologram structure 11 of the present embodiment is very useful not only for design use but also for security use such as authenticity determination. For example, in a case where the hologram structure 11 is used for design use and a light image with a drawing pattern such as a specific character is reproduced by the hologram structure 11, it is possible to reproduce a drawing pattern with movement (that is, a visual change) as a light image by making a part of a light image with the drawing pattern disappear or appear before and after changing the incident angle of the reproduction light with respect to each factor element 21. Further, in a case where the hologram structure 11 is used for authenticity determination and a light image with a predetermined drawing pattern for authenticity determination is reproduced by the hologram structure 11, disappearance or appearance of a part of the light image with the drawing pattern is caused according to the change in the incident angle of the reproduction light with respect to each factor element 21, thereby making it possible to easily and surely perform the authenticity determination based on such disappearance or appearance of the drawing pattern.

For example, one of the wavelength distribution of the first-order diffracted light with respect to diffraction efficiency and the wavelength distribution of the negative first-order diffracted light with respect to diffraction efficiency for each factor element 21 may have a local maximum value of the diffraction efficiency in at least one of the wavelength band of not less than 380 nm and not more than 600 nm or the wavelength band of not less than 780 nm to not more than 1200 nm, and the other one of the wavelength distribution of the first-order diffracted light with respect to diffraction efficiency and the wavelength distribution of the negative first-order diffracted light with respect to diffraction efficiency for each factor element 21 may have a local maximum value of the diffraction efficiency in a wavelength band of more than 600 nm and less than 780 nm.

That is, one of the wavelength distribution of the first-order diffracted light with respect to diffraction efficiency and the wavelength distribution of the negative first-order diffracted light with respect to diffraction efficiency for each factor element 21 may have a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of the diffraction efficiency in the wavelength band of not less than 380 nm and not more than 600 nm, and the other one of the wavelength distribution of the first-order diffracted light with respect to diffraction efficiency and the wavelength distribution of the negative first-order diffracted light with respect to diffraction efficiency for each factor element 21 may have a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of diffraction efficiency in the wavelength band of more than 600 nm and less than 780 nm. In this case, before changing the incident angle of the reproduction light with respect to each factor element 21, both of the light image of the first-order diffracted light and the light image of the negative first-order diffracted light can be reproduced in a visible state, and after changing the incident angle of the reproduction light with respect to each factor element 21, one of the light image of the first-order diffracted light and the light image of the negative first-order diffracted light can visually disappear, and the other one thereof can be maintained in a visible state.

Further, one of the wavelength distribution of the first-order diffracted light with respect to diffraction efficiency and the wavelength distribution of the negative first-order diffracted light with respect to diffraction efficiency for each factor element 21 may have a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of the diffraction efficiency in the wavelength band of not less than 780 nm to not more than 1200 nm, and the other one of the wavelength distribution of the first-order diffracted light with respect to diffraction efficiency and the wavelength distribution of the negative first-order diffracted light with respect to diffraction efficiency for each factor element 21 may have a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of diffraction efficiency in the wavelength band of more than 600 nm and less than 780 nm. In this case, before changing the incident angle of the reproduction light with respect to each factor element 21, only one of the light image of the first-order diffracted light and the light image of the negative first-order diffracted light can be reproduced in a visible state, and after changing the incident angle of the reproduction light with respect to each factor element 21, the other one of the light image of the first-order diffracted light and the light image of the negative first-order diffracted light can visually appear, and both of the light image of the first-order diffracted light and the light image of the negative first-order diffracted light can be reproduced in a visible state.

Note that, in each factor element 21 of the hologram structure 11 of the present embodiment, it is preferable that a full width at half maximum FWHM of the local maximum value of the diffraction efficiency shown in at least one of the wavelength distribution of the first-order diffracted light with respect to diffraction efficiency or the wavelength distribution of the negative first-order diffracted light with respect to diffraction efficiency is 200 nm or less. In this case, the first-order diffracted light and/or the negative first-order diffracted light can be constituted by light in a limited wavelength band to prevent color mixing in a reproduced light image, such it is possible to visually and clearly recognize disappearance or appearance of the light image according to the change in the incident angle of the reproduction light with respect to each factor element 21. Note that the full width at half maximum FWHM here indicates a wavelength band (wavelength width) between positions each having a value (Dmax/2) that is half of the local maximum value Dmax in the wavelength distribution with respect to diffraction efficiency (see FIG. 8).

Note that, in the hologram structure 11 of the present embodiment, a specific incident angle of the reproduction light with respect to each factor element 21 is not particularly limited, but, for example, the incident angle is generally set to be in a range from 0° to 80°, and it is possible to improve the usability by setting the incident angle to be in, for example, a range of 0° to 70°, 60° or less, 50° or less, or 40° or less. Note that, in ordinary use, it is often assumed that the incident angle of the reproduction light with respect to the hologram structure 11 is 0° or an angle near 0° (for example, an angle in a range of 0° to 45°, an angle in a range of 0° to 30°, or an angle in a range of 0° to 20°). Therefore, these assumed angles may be set to "angles before the change in the incident angle of the reproduction light with respect to each factor element 21 that is necessary for the disappearance or appearance of at least a part of the light image". Here, the "angles before the change in the incident angle of the reproduction light with respect to each factor element 21 that is necessary for the disappearance or appearance of at least a part of the light image" means a smaller one (that is, an incident angle closer to 0°) of incident angles (that is, a first incident angle and a second incident angle) of the reproduction light before and after the change (disappearance or appearance) of the light image. Further, an "amount (=|incident angle after change−incident angle before change|) of change in the incident angle of the reproduction light with respect to each factor element 21" that is necessary for the disappearance or appearance of at least a part of the light image as described above is not particularly limited. However, the "amount of change in the incident angle of the reproduction light with respect to each factor element 21" that is necessary for the disappearance or appearance of at least a part of the light image is usually preferably an angle in a range of 10° to 50°, more preferably, an angle in a range of 20° to 40°, and still more preferably, an angle (for example, 25° to 35°) near 30°. Note that the setting of these angles can be implemented by appropriately adjusting the diffraction characteristic of the hologram structure 11.

Therefore, as an example, the hologram structure 11 of the present embodiment may be configured so that, in a case where the incident angle of the reproduction light with respect to each factor element 21 is 0° or an angle near 0° (for example, an angle in a range of 0° to 45°, an angle in a range of 0° to 30°, or an angle in a range of 0° to 20°), at least one of the wavelength distribution of the first-order diffracted light with respect to diffraction efficiency or the wavelength distribution of the negative first-order diffracted light with respect to diffraction efficiency for each factor element 21 has a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of the diffraction efficiency in at least one of the wavelength band of not less than 380 nm and not more than 600 nm or the wavelength band of not less than 780 nm to not more than 1200 nm. In this case, the amount of change in the incident angle of the reproduction light with respect to each factor element 21 that is necessary for the disappearance or appearance of at least a part of the light image may be set to, for example, 40° or less, 30° or less, 20° or less, 10° or less, or 5° or less.

Note that the disappearance or appearance of at least a part of the light image as described above may be caused in accordance with an increase in the incident angle of the reproduction light with respect to each factor element 21 or may be caused in accordance with a decrease in the incident angle of the reproduction light with respect to each factor element 21. As described above, as the incident angle of the reproduction light with respect to each factor element 21 is increased, a wavelength showing the local maximum value of the diffraction efficiency of each diffracted light can shift to a shorter wavelength side. This also means that, as the incident angle of the reproduction light with respect to each factor element 21 is decreased, a wavelength showing the local maximum value of the diffraction efficiency of each diffracted light can shift to a longer wavelength side.

Therefore, for example, at least one of the wavelength distribution of the first-order diffracted light with respect to diffraction efficiency or the wavelength distribution of the negative first-order diffracted light with respect to diffraction efficiency for each factor element 21 may have a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of the diffraction efficiency in the wavelength band of less than 380 nm before changing the incident angle of the reproduction light with respect to each factor element 21, and may have the local maximum value of the diffraction efficiency in the wavelength band of not less than 380 nm and not more than 600 nm after changing the incident angle of the reproduction light with respect to each factor element 21. In this case, it is possible to make at least a part of the light image that is invisible before the change in the incident angle of the reproduction light with respect to each factor element 21 visually appear after the change in the incident angle of the reproduction light with respect to each factor element 21. Further, at least one of the wavelength distribution of the first-order diffracted light with respect to diffraction efficiency or the wavelength distribution of the negative first-order diffracted light with respect to diffraction efficiency for each factor element 21 may have a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of the diffraction efficiency in the wavelength band of less than 780 nm before changing the incident angle of the reproduction light with respect to each factor element 21, and may have the local maximum value of the diffraction efficiency in the wavelength band of not less than 780 nm to not more than 1200 nm after changing the incident angle of the reproduction light with respect to each factor element 21. In this case, at least a part of the light image that is visible before the change in the incident angle of the reproduction light with respect to each factor element 21 can visually disappear after the change in the incident angle of the reproduction light with respect to each factor element 21.

Hereinafter, representative examples (implementation modes) of the hologram structure 11 having various distinctive diffraction characteristics will be described.

[First Implementation Mode]

Figure 43:
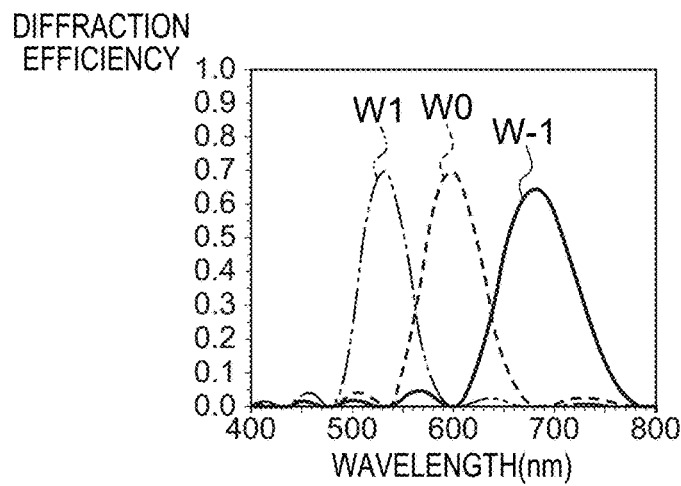
FIG. 43 is a graph illustrating a diffraction characteristic of each factor element according to a first implementation mode of a second exemplary embodiment, and illustrates a case where the incident angle of reproduction light with respect to each factor element is 0°.
Figure 44:
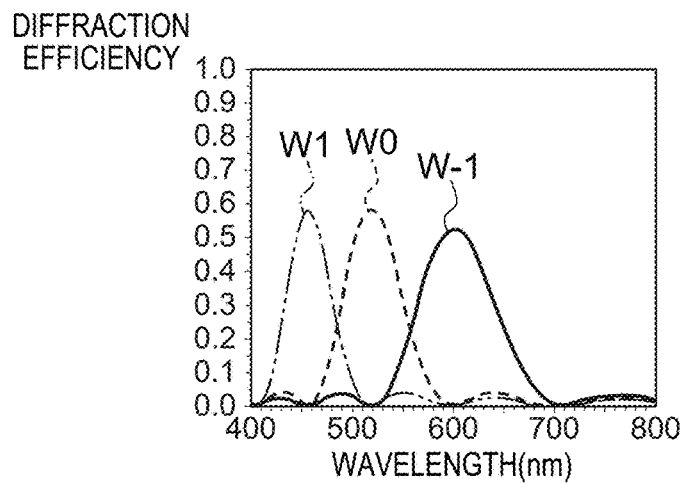
FIG. 44 is a graph illustrating a diffraction characteristic of each factor element according to the first implementation mode of the second exemplary embodiment, and illustrates a case where the incident angle of reproduction light with respect to each factor element is 30°.
Figure 45:
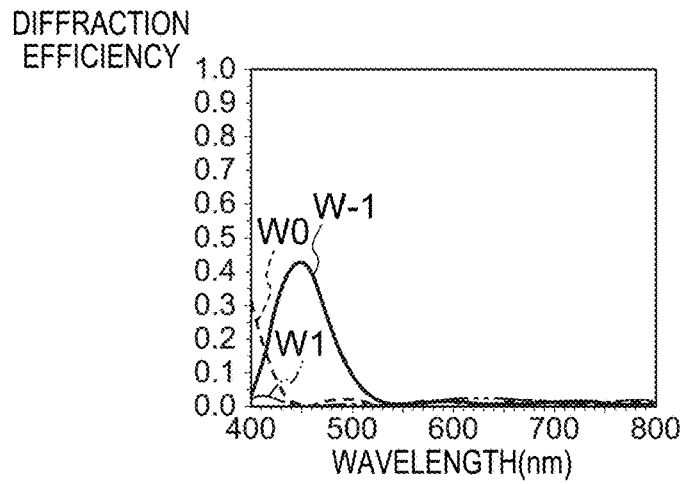
FIG. 45 is a graph illustrating a diffraction characteristic of each factor element according to the first implementation mode of the second exemplary embodiment, and illustrates a case where the incident angle of reproduction light with respect to each factor element is 50°.

FIGS. 43 to 45 are each a graph illustrating a diffraction characteristic of each factor element 21 according to a first implementation mode, FIG. 43 illustrates a case where the incident angle of the reproduction light with respect to each factor element 21 is 0°, FIG. 44 illustrates a case where the incident angle of the reproduction light with respect to each factor element 21 is 30°, and FIG. 45 illustrates a case where the incident angle of the reproduction light with respect to each factor element 21 is 50°. In FIGS. 43 to 45, a horizontal axis represents a wavelength (nm), a vertical axis represents diffraction efficiency, wavelength distribution of the 0th-order diffracted light is indicated by "W0", wavelength distribution of the first-order diffracted light is indicated by "W1", and wavelength distribution of the negative first-order diffracted light is indicated by "W-1".

Figure 46:
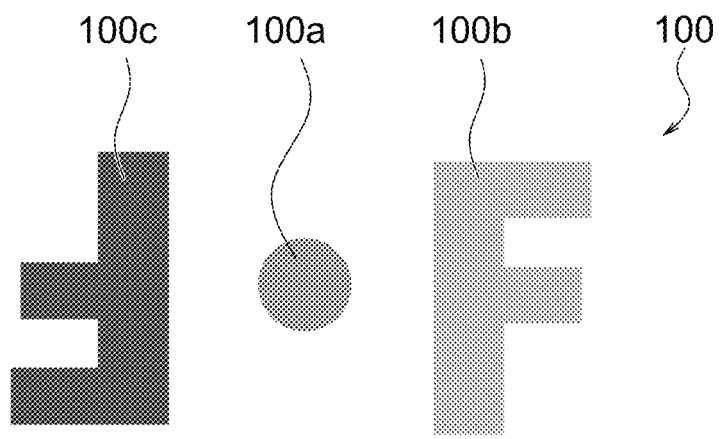
FIG. 46 illustrates an example of a light image reproduced by a hologram structure including each factor element according to the first implementation mode of the second exemplary embodiment, and illustrates a light image in a case where the incident angle of reproduction light with respect to each factor element is 0°.
Figure 47:
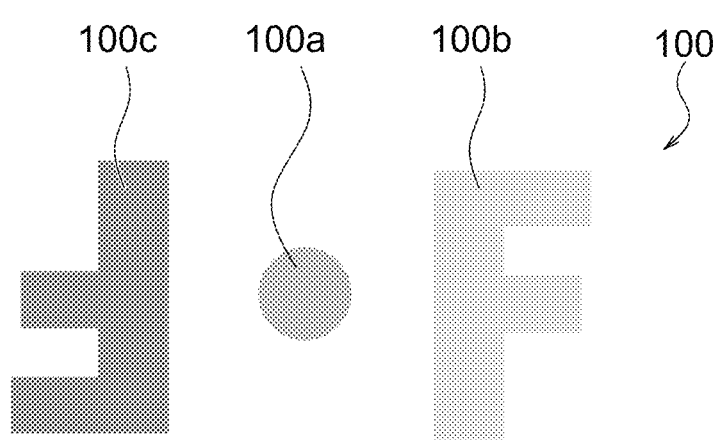
FIG. 47 illustrates an example of a light image reproduced by a hologram structure including each factor element according to the first implementation mode of the second exemplary embodiment, and illustrates a light image in a case where the incident angle of reproduction light with respect to each factor element is 30°.
Figure 48:
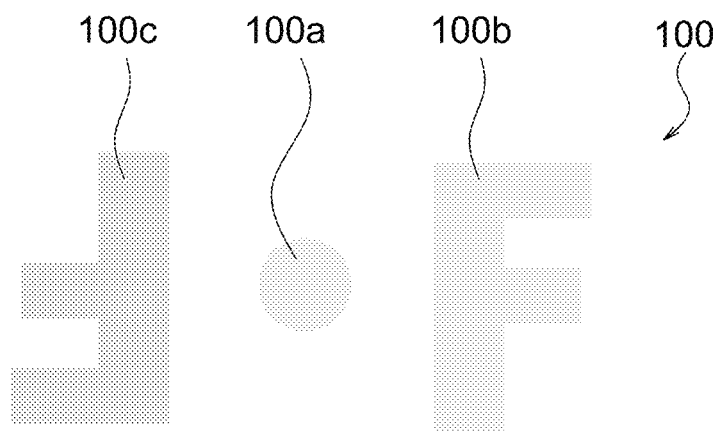
FIG. 48 illustrates an example of a light image reproduced by a hologram structure including each factor element according to the first implementation mode of the second exemplary embodiment, and illustrates a light image in a case where the incident angle of reproduction light with respect to each factor element is 50°.

FIGS. 46 to 48 each illustrate an example of a light image 100 reproduced by the hologram structure 11 including each factor element 21 according to the first implementation mode, FIG. 46 illustrates a light image 100 in a case where the incident angle of the reproduction light with respect to each factor element 21 is 0°, FIG. 47 illustrates a light image 100 in a case where the incident angle of the reproduction light with respect to each factor element 21 is 30°, and FIG. 48 illustrates a light image 100 in a case where the incident angle of the reproduction light with respect to each factor element 21 is 50°. That is, the light image 100 illustrated in FIG. 46 is a light image reproduced by the factor elements 21 having the diffraction characteristic of FIG. 43, the light image 100 illustrated in FIG. 47 is a light image reproduced by the factor elements 21 having the diffraction characteristic of FIG. 44, and the light image 100 illustrated in FIG. 48 is a light image reproduced by the factor elements 21 having the diffraction characteristic illustrated in FIG. 45. Note that, in each of the light images 100 illustrated in FIGS. 46 to 48, a first-order diffracted light image 100*b* and a negative first-order diffracted light image 100*c* have the same shape (an "F" shape in the illustrated example) and are reproduced point-symmetrically.

In each factor element 21 according to the present mode, as illustrated in FIG. 43, in the wavelength band of 380 nm or more and less than 780 nm, a wavelength showing a local maximum value of the 0th-order diffracted light is set to 600 nm, a wavelength showing a local maximum value of the first-order diffracted light is set to 533 nm, and a wavelength showing a local maximum value of the negative first-order diffracted light is set to 685 nm, in a case where the incident angle of the reproduction light is 0°. Further, in each factor element 21 according to the present mode, as illustrated in FIG. 44, the wavelength showing the local maximum value of the 0th-order diffracted light is set to a wavelength near 519 nm, the wavelength showing the local maximum value of the first-order diffracted light is set to 457 nm, and the wavelength showing the local maximum value of the negative first-order diffracted light is set to 601 nm, in a case where the incident angle of the reproduction light is 30°. Further, in each factor element 21 according to the present mode, as illustrated in FIG. 45, the wavelength showing the local maximum value of the 0th-order diffracted light and the wavelength showing the local maximum value of the first-order diffracted light are set to wavelengths outside the visible light wavelength band (that is, the wavelength band of less than 380 nm), respectively, and the wavelength showing the local maximum value of the negative first-order diffracted light is set to 449 nm, in a case where the incident angle of the reproduction light is 50°.

As described above, in a case where the incident angle of the reproduction light is 0° and in a case where the incident angle of the reproduction light is 30°, all of the 0th-order diffracted light, the first-order diffracted light, and the negative first-order diffracted light are mainly constituted by light within the visible light wavelength band. However, in a case where the incident angle of the reproduction light is 30°, the light mainly constituting each of the 0th-order diffracted light, the first-order diffracted light, and the negative first-order diffracted light entirely shifts to a shorter wavelength side, as compared with a case where the incident angle of the reproduction light is 0°. Further, in a case where the incident angle of the reproduction light is 50°, the light mainly constituting each of the 0th-order diffracted light, the first-order diffracted light, and the negative first-order diffracted light entirely further shifts to a shorter wavelength side, and the light mainly constituting the negative first-order diffracted light remains in the visible light wavelength band, but the light mainly constituting the 0th-order diffracted light and the first-order diffracted light shifts from the visible light wavelength band to the invisible ultraviolet wavelength band.

Therefore, the light images 100 reproduced with the white reproduction light by the hologram structure 11 according to the present implementation mode is as illustrated in FIGS. 46 to 48. That is, in a case where the incident angle of the reproduction light is 0°, as illustrated in FIG. 46, a green first-order diffracted light image 100b and a red negative first-order diffracted light image 100c that are arranged to be point symmetric with respect to a yellow-orange 0th-order diffracted light image 100a are reproduced. Further, in a case where the incident angle of the reproduction light is 30°, as illustrated in FIG. 47, a blue first-order diffracted light image 100b and a yellow negative first-order diffracted light image 100c that are arranged to be point symmetric with respect to a green 0th-order diffracted light image 100a are reproduced. Further, in a case where the incident angle of the reproduction light is 50°, as illustrated in FIG. 48, a blue negative first-order diffracted light image 100c is visibly reproduced, but a 0th-order diffracted light image 100a and a first-order diffracted light image 100b are not reproduced as visible light images (that is, the 0th-order diffracted light image 100a and the first-order diffracted light image 100b are reproduced as invisible ultraviolet light images). Note that, in an actual implementation, since these light images formed mainly with light outside the visible light wavelength band include some amount of light within the visible light wavelength band, these light images 100a and 100b may be visible to some observers, but even in this case, the light images 100a and 100b are recognized as very unclear light images.

As described above, as the incident angle of the reproduction light to be incident on each factor element 21 is increased from 0°, wavelengths of light for forming the reproduced light image 100 (that is, each of the 0th-order diffracted light image 100a, the first-order diffracted light image 100b, and the negative first-order diffracted light image 100c) shift to a shorter wavelength side. Then, when the incident angle of the reproduction light is larger than a certain angle (an angle between 30° and 50° in the present implementation mode), at least a part of the light image 100 becomes invisible.

Such a diffraction characteristic can be implemented by, for example, a reflection type hologram structure 11 (that is, reflection type factor elements 21) in which a refractive index of the hologram layer 1 is 1.5, and the number of steps, a depth per step (see Reference Sign "d" in FIG. 6), and a maximum depth (see Reference Sign "D" in FIG. 6) of the uneven surface 1a are eight, 200 nm, and 1400 nm, respectively.

Further, as another example, the above-described diffraction characteristic can also be implemented by, for example, a reflection type hologram structure 11 (that is, reflection type factor elements 21) in which a refractive index of the hologram layer 1 is 1.5, and the number of steps, a depth per step, and a maximum depth of the uneven surface 1a are eight, 225 nm, and 1575 nm, respectively. According to this example, in a case where the incident angle of the reproduction light is 0°, a wavelength showing the local maximum value of the 0th-order diffracted light is set to 675 nm, a wavelength showing the local maximum value of the first-order diffracted light is set to 600 nm, a wavelength showing the local maximum value of the negative first-order diffracted light is set to 771 nm, and the 0th-order diffracted light image 100a, the first-order diffracted light image 100b, and the negative first-order diffracted light image 100c are reproduced as visible light images. Meanwhile, in a case where the incident angle of the reproduction light is 50°, the wavelength showing the local maximum value of the 0th-order diffracted light is set to 432 nm, the wavelength showing the local maximum value of the first-order diffracted light is set to 376 nm, the wavelength showing the local maximum value of the negative first-order diffracted light is set to 508 nm, and the 0th-order diffracted light image 100a and the negative first-order diffracted light image 100c are reproduced as visible light images, but the first-order diffracted light image 100b is basically reproduced as an invisible light image.

[Second Implementation Mode]

Figure 49:
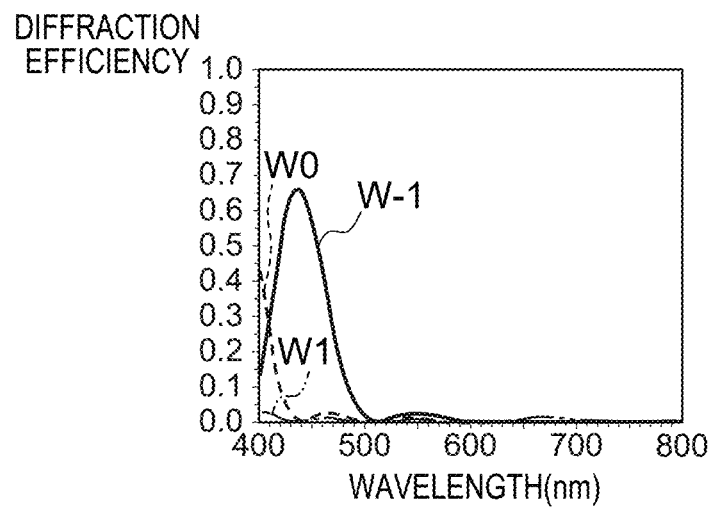
FIG. 49 is a graph illustrating a diffraction characteristic of each factor element according to a second implementation mode of the second exemplary embodiment, and illustrates a case where the incident angle of reproduction light with respect to each factor element is 0°.
Figure 50:
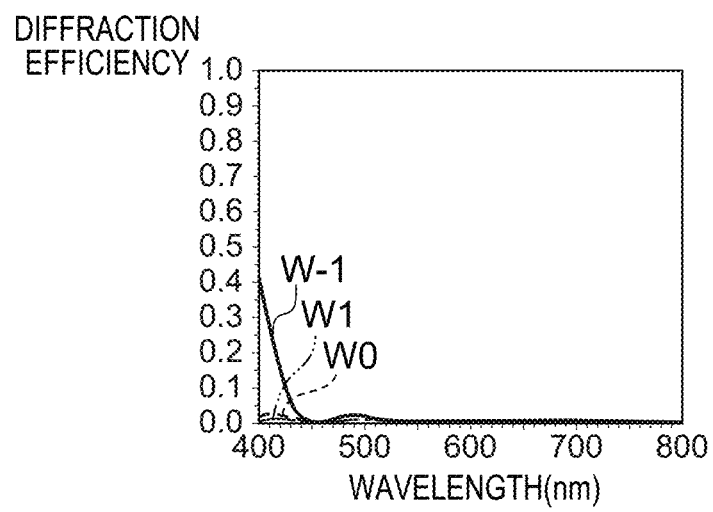
FIG. 50 is a graph illustrating a diffraction characteristic of each factor element according to the second implementation mode of the second exemplary embodiment, and illustrates a case where the incident angle of reproduction light with respect to each factor element is 30°.

FIGS. 49 and 50 are each a graph illustrating a diffraction characteristic of each factor element 21 according to a second implementation mode, FIG. 49 illustrates a case where the incident angle of the reproduction light with respect to each factor element 21 is 0°, and FIG. 50 illustrates a case where the incident angle of the reproduction light with respect to each factor element 21 is 30°. In FIGS. 49 and 50, a horizontal axis represents a wavelength (nm), a vertical axis represents diffraction efficiency, wavelength distribution of the 0th-order diffracted light is indicated by "W0", wavelength distribution of the first-order diffracted light is indicated by "W1", and wavelength distribution of the negative first-order diffracted light is indicated by "W-1".

Figure 51:
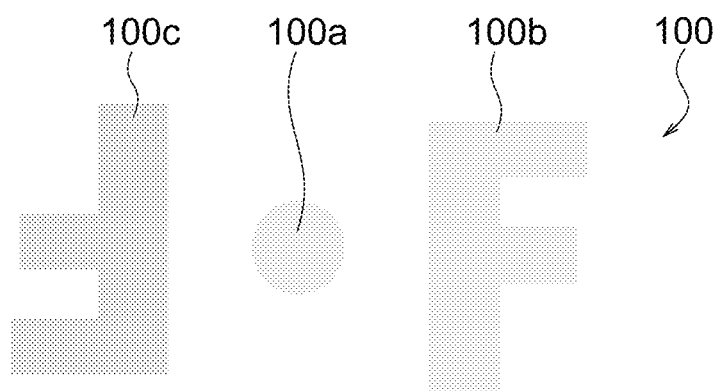
FIG. 51 illustrates an example of a light image reproduced by a hologram structure including each factor element according to the second implementation mode of the second exemplary embodiment.
Figure 52:
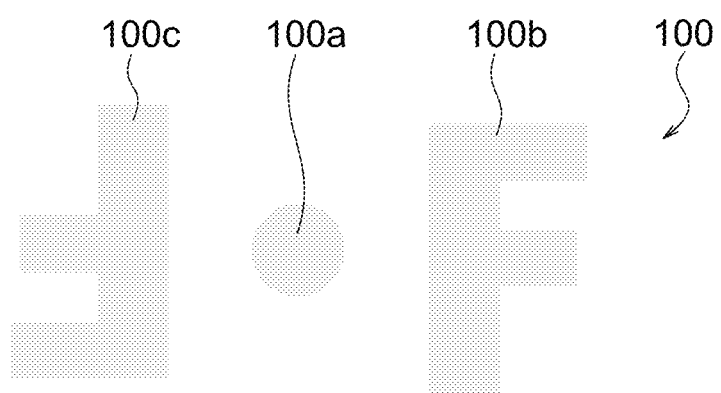
FIG. 52 illustrates an example of a light image reproduced by a hologram structure including each factor element according to the second implementation mode of the second exemplary embodiment.

FIGS. 51 and 52 each illustrate an example of a light image 100 reproduced by the hologram structure 11 including each factor element 21 according to the second implementation mode, FIG. 51 illustrates a light image 100 in a case where the incident angle of the reproduction light with respect to each factor element 21 is 0°, and FIG. 52 illustrates a light image 100 in a case where the incident angle of the reproduction light with respect to each factor element 21 is 30°. That is, the light image 100 illustrated in FIG. 51 is a light image reproduced by the factor elements 21 having the diffraction characteristic of FIG. 49, and the light image 100 illustrated in FIG. 52 is a light image reproduced by the factor elements 21 having the diffraction characteristic of FIG. 50. Note that, in each of the light images 100 illustrated in FIGS. 51 and 52, a first-order diffracted light image 100*b* and a negative first-order diffracted light image 100*c* have the same shape (an "F" shape in the illustrated example) and are reproduced point-symmetrically.

In each factor element 21 according to the present mode, as illustrated in FIG. 49, a wavelength showing a local maximum value of the negative first-order diffracted light is set to 439 nm in the visible light wavelength band, but wavelengths showing local maximum values (in particular, local maximum values of the diffraction efficiency of 0.3 or more) of the 0th-order diffracted light and the first-order diffracted light, respectively, are set to wavelengths that are less than 380 nm, in a case where the incident angle of the reproduction light is 0°. Further, in each factor element 21 according to the present mode, as illustrated in FIG. 50, the wavelengths showing the local maximum values (in particular, local maximum values of the diffraction efficiency of 0.3 or more) of all of the 0th-order diffracted light, the first-order diffracted light, and the negative first-order diffracted light are set to wavelengths that are less than 380 nm, in a case where the incident angle of the reproduction light is 30°.

As described above, in a case where the incident angle of the reproduction light is 0°, the 0th-order diffracted light and the first-order diffracted light are mainly constituted by light outside the visible light wavelength band, and the negative first-order diffracted light is mainly constituted by light in the visible light wavelength band. Meanwhile, in a case where the incident angle of the reproduction light is 30°, the light mainly constituting each of the 0th-order diffracted light, the first-order diffracted light, and the negative first-order diffracted light entirely shifts to a shorter wavelength side, as compared with a case where the incident angle of the reproduction light is 0°, and all of the 0th-order diffracted light, the first-order diffracted light, and the negative first-order diffracted light are mainly constituted by light outside the visible light wavelength band.

Therefore, the light images 100 reproduced with the white reproduction light by the hologram structure 11 according to the present implementation mode is as illustrated in FIGS. 51 and 52. That is, in a case where the incident angle of the reproduction light is 0°, as illustrated in FIG. 51, a blue negative first-order diffracted light image 100*c* is visibly reproduced, but a 0th-order diffracted light image 100*a* and a first-order diffracted light image 100*b* are not reproduced as visible light images (that is, the 0th-order diffracted light image 100*a* and the first-order diffracted light image 100*b* are reproduced as invisible ultraviolet light images). Further, in a case where the incident angle of the reproduction light is 30°, as illustrated in FIG. 52, all of a 0th-order diffracted light image 100*a*, a first-order diffracted light image 100*b*, and a negative first-order diffracted light image 100*c* are not reproduced as visible light images (that is, all of the 0th-order diffracted light image 100*a*, the first-order diffracted light image 100*b*, and the negative first-order diffracted light image 100*c* are reproduced as invisible ultraviolet light images), such that an entire light image 100 is invisible. Note that, in an actual implementation, since these light images formed mainly with light outside the visible light wavelength band include some amount of light within the visible light wavelength band, these light images may be visible to some observers, but even in this case, the light images are recognized as very unclear light images.

As described above, also in the present implementation mode, as the incident angle of the reproduction light to be incident on each factor element 21 is increased from 0°, wavelengths of light for forming the reproduced light image 100 (that is, each of the 0th-order diffracted light image 100*a*, the first-order diffracted light image 100*b*, and the negative first-order diffracted light image 100*c*) shift to a shorter wavelength side. Then, when the incident angle of the reproduction light is larger than a certain angle (an angle between 0° and 30° in the present implementation mode), the entire light image 100 becomes invisible (see FIG. 52). Therefore, it is possible to substantially enable/disable visible reproduction of at least a part (in the present implementation mode, the negative first-order diffracted light image 100*c*) of the light image 100 by changing an inclination of the incidence of the reproduction light with respect to the hologram structure 11.

The above-described diffraction characteristic can be implemented by, for example, a reflection type hologram structure 11 (that is, reflection type factor elements 21) in which a refractive index of the hologram layer 1 is 1.5, and the number of steps, a depth per step, and a maximum depth of the uneven surface 1*a* are eight, 128 nm, and 896 nm, respectively.

[Third Implementation Mode]

Figure 53:
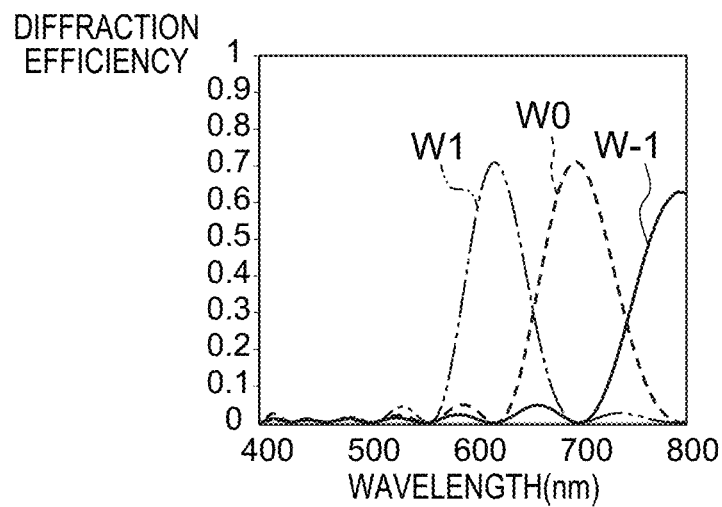
FIG. 53 is a graph illustrating a diffraction characteristic of each factor element according to a third implementation mode of the second exemplary embodiment, and illustrates a case where the incident angle of reproduction light with respect to each factor element is 0°.
Figure 54:
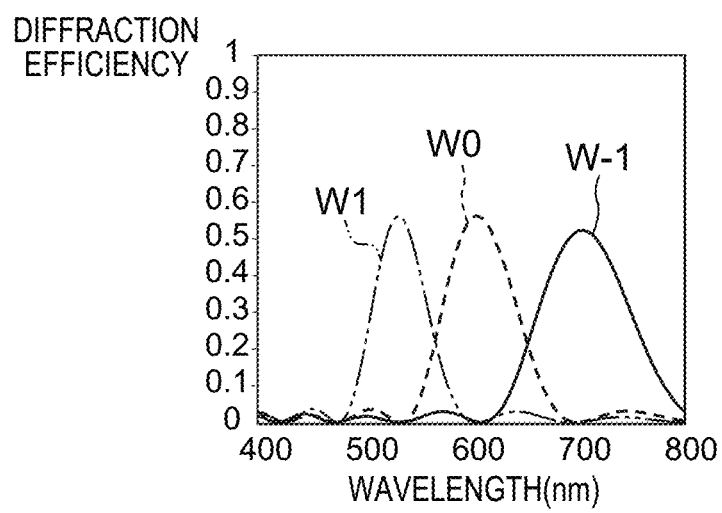
FIG. 54 is a graph illustrating a diffraction characteristic of each factor element according to the third implementation mode of the second exemplary embodiment, and illustrates a case where the incident angle of reproduction light with respect to each factor element is 30°.

FIGS. 53 and 54 are each a graph illustrating a diffraction characteristic of each factor element 21 according to a third implementation mode, FIG. 53 illustrates a case where the incident angle of the reproduction light with respect to each factor element 21 is 0°, and FIG. 54 illustrates a case where the incident angle of the reproduction light with respect to each factor element 21 is 30°. In FIGS. 53 and 54, a horizontal axis represents a wavelength (nm), a vertical axis represents diffraction efficiency, wavelength distribution of the 0th-order diffracted light is indicated by "W0", wavelength distribution of the first-order diffracted light is indicated by "W1", and wavelength distribution of the negative first-order diffracted light is indicated by "W-1".

Figure 55:
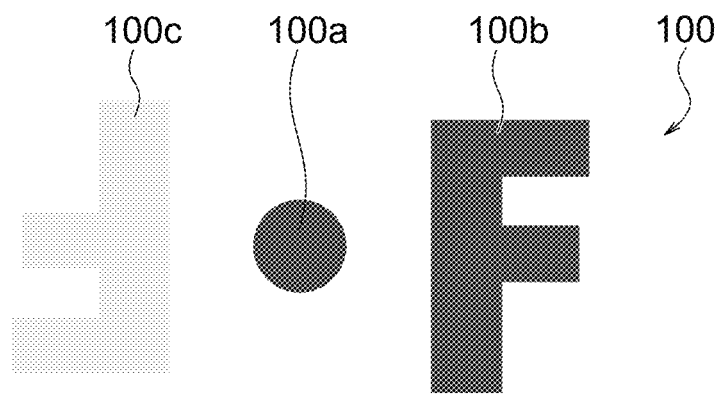
FIG. 55 illustrates an example of a light image reproduced by a hologram structure including each factor element according to the third implementation mode of the second exemplary embodiment, and illustrates a light image in a case where the incident angle of reproduction light with respect to each factor element is 0°.
Figure 56:
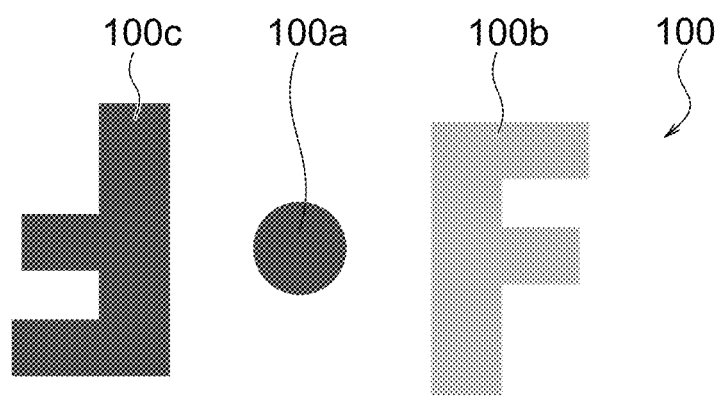
FIG. 56 illustrates an example of a light image reproduced by a hologram structure including each factor element according to the third implementation mode of the second exemplary embodiment, and illustrates a light image in a case where the incident angle of reproduction light with respect to each factor element is 30°.

FIGS. 55 and 56 each illustrate an example of a light image 100 reproduced by the hologram structure 11 including each factor element 21 according to the third implementation mode, FIG. 55 illustrates a light image 100 in a case where the incident angle of the reproduction light with respect to each factor element 21 is 0°, and FIG. 56 illustrates a light image 100 in a case where the incident angle of the reproduction light with respect to each factor element 21 is 30°. That is, the light image 100 illustrated in FIG. 55 is a light image reproduced by the factor elements 21 having the diffraction characteristic of FIG. 53, and the light image 100 illustrated in FIG. 56 is a light image reproduced by the factor elements 21 having the diffraction characteristic of FIG. 54. Note that, in each of the light images 100 illustrated in FIGS. 55 and 56, a first-order diffracted light image 100*b* and a negative first-order diffracted light image 100*c* have the same shape (an "F" shape in the illustrated example) and are reproduced point-symmetrically.

In each factor element 21 according to the present mode, as illustrated in FIG. 53, a wavelength showing a local maximum value of the first-order diffracted light is set to 642 nm and a wavelength showing a local maximum value of the 0th-order diffracted light is set to 702 nm, but a wavelength showing a local maximum value (in particular, a local maximum value of the diffraction efficiency of 0.3 or more) of the negative first-order diffracted light is set to a wavelength (specifically, 802 nm) that is more than 780 nm, in a case where the incident angle of the reproduction light is 0°. Further, in each factor element 21 according to the present mode, as illustrated in FIG. 54, the wavelength showing the local maximum value of the 0th-order diffracted light is set to 606 nm, the wavelength showing the local maximum value of the first-order diffracted light is set to 533 nm, and the wavelength showing the local maximum value of the negative first-order diffracted light is set to 705 nm, in a case where the incident angle of the reproduction light is 30°.

As described above, in a case where the incident angle of the reproduction light is 0°, the 0th-order diffracted light and the first-order diffracted light are mainly constituted by light in the visible light wavelength band, and the negative first-order diffracted light is mainly constituted by light outside the visible light wavelength band. Meanwhile, in a case where the incident angle of the reproduction light is 30°, the light mainly constituting each of the 0th-order diffracted light, the first-order diffracted light, and the negative first-order diffracted light entirely shifts to a shorter wavelength side, as compared with a case where the incident angle of the reproduction light is 0°, and all of the 0th-order diffracted light, the first-order diffracted light, and the negative first-order diffracted light are mainly constituted by light in the visible light wavelength band.

Therefore, the light images 100 reproduced with the white reproduction light by the hologram structure 11 according to the present implementation mode is as illustrated in FIGS. 55 and 56. That is, in a case where the incident angle of the reproduction light is 0°, as illustrated in FIG. 55, a 0th-order diffracted light image 100a and a first-order diffracted light image 100b are reproduced as visible red light images, but a negative first-order diffracted light image 100c is not reproduced as a visible light image (that is, the negative first-order diffracted light image 100c is reproduced as an invisible ultraviolet light image). Note that, in an actual implementation, since the light image formed mainly with light outside the visible light wavelength band includes some amount of light within the visible light wavelength band, the light image may be visible to some observers, but even in this case, the light image is recognized as a very unclear light image. Meanwhile, in a case where the incident angle of the reproduction light is 30°, as illustrated in FIG. 56, all of a 0th-order diffracted light image 100a, a first-order diffracted light image 100b, and a negative first-order diffracted light image 100c are reproduced as visible light images, and the green first-order diffracted light image 100b and the red negative first-order diffracted light image 100c having the same shape are reproduced at the point symmetrical positions with respect to the red 0th-order diffracted light image 100a.

As described above, also in the present implementation mode, as the incident angle of the reproduction light to be incident on each factor element 21 is increased from 0°, wavelengths of light for forming the reproduced light image 100 (that is, each of the 0th-order diffracted light image 100a, the first-order diffracted light image 100b, and the negative first-order diffracted light image 100c) shift to a shorter wavelength side. Then, when the incident angle of the reproduction light is larger than a certain angle (an angle between 0° and 30° in the present implementation mode), the entire light image 100 becomes visible (see FIG. 56). Therefore, it is possible to substantially enable/disable visible reproduction of at least a part (in particular, the negative first-order diffracted light image 100c) of the light image 100 by changing an inclination of the incidence of the reproduction light with respect to the hologram structure 11.

The above-described diffraction characteristic can be implemented by, for example, a reflection type hologram structure 11 (that is, reflection type factor elements 21) in which a refractive index of the hologram layer 1 is 1.5, and the number of steps, a depth per step, and a maximum depth of the uneven surface 1a are eight, 234 nm, and 1638 nm, respectively.

[Method of Manufacturing Hologram Structure 11]

The method of manufacturing the hologram structure 11 according to the present exemplary embodiment is not limited, and for example, the hologram structure 11 according to the present exemplary embodiment can be manufactured by the same manufacturing method as the method of manufacturing the hologram structure 11 according to the first exemplary embodiment described above. Since an example of the method of manufacturing the hologram structure 11 according to the first exemplary embodiment has been described above, a description of the method of manufacturing the hologram structure 11 in the present exemplary embodiment will be omitted.

[Relationship Between Depth of Uneven Surface and Peak Wavelength of Diffracted Light]

When the number of steps of the uneven surface 1a of the hologram structure 11 is represented by N, a light path length modulated per step of the uneven surface 1a is represented by l, and a natural number is represented by m, a peak wavelength λ of the diffracted light is represented by the following equation.

$$\lambda = N \cdot l / (mN \pm 1)$$

For example, a hologram structure 11 capable of reproducing a light image in a single color even when white light is incident can be implemented in a case where any one of the first-order diffracted light and the negative first-order diffracted light of the hologram structure 11 has only one peak wavelength λ in the visible light wavelength band for an arbitrary natural number m. For example, when the light path length l is 330 nm and the number N of steps of the uneven surface 1a is four, λ=1320/(4m±1). Therefore, λ=440 nm and 264 nm when m=1, λ=188 nm and 146 nm when m=2, and λ=120 nm and 101 nm when m=3. When m is 4 or more, the peak wavelength λ has a smaller value. Among these, the peak wavelength λ included in the visible light wavelength band is only 440 nm (λ=440 nm) when m=1. Therefore, when the hologram structure 11 in which the number N of steps of the uneven surface 1a is four (N=4) and the light path length per step is 330 nm (l=330 nm) is used, a light image with a single color that is visible to the observer 50 can be reproduced with light having the wavelength of 440 nm and light having a wavelength in the vicinity thereof.

Note that the color (wavelength band) of the light image reproduced by the hologram structure 11 is under the assumption that the hologram structure 11 is used in an air environment having a refractive index of 1.0. Further, when the observer observes the light image 100 reproduced by the reflection type hologram structure 11, the uneven surface 1a of the hologram layer 1 is arranged on a side opposite to a side that the observer faces, and the observer observes an uneven structure (that is, the uneven surface 1a) through the hologram layer 1. Note that when the uneven surface 1a of the hologram layer 1 is arranged on the same side as that the observer faces, a reflection image of the hologram structure 11 observed by the observer is formed by light reflected by the surface without passing through the hologram layer 1. For example, in a case where the uneven surface 1a is formed on the surface of a card type hologram holder 10, the observer observes light reflected by the uneven surface 1a without passing through the hologram layer 1. In such a case, it is necessary to set a depth per step of the uneven surface 1a with a light path length based on a refractive index of a medium that is more adjacent to the observer than the hologram layer 1 is, for example, a refractive index of 1.0 of air, rather than a refractive index of the hologram layer 1. Therefore, the observer can observe a desired image by designing the structure of the uneven surface 1a while assuming that the refractive index of the hologram layer 1 (hologram structure 11) is the refractive index of air, that is, 1.0. Specifically, in a case where the refractive index of air is 1.0 and the depth per step of the uneven surface 1a is 165 nm, the light path length per step of the uneven surface 1a is 330 nm. In this case, since the uneven surface 1a has the four-step depth structure, the hologram structure 11 exhibits the maximum diffraction efficiency in the blue wavelength band, and reproduces a blue light image.

2-2-th Embodiment

A hologram structure 11 includes at least two or more types of factor elements 21, and at least one of the at least two types of factor elements 21 may have the same configuration as that of the factor elements 21 according to the 2-1-th embodiment described above.

FIG. 13 described above is a conceptual diagram illustrating an example of a plane structure of the transmission type hologram structure 11 according to a 2-2-th embodiment of the second exemplary embodiment. The hologram structure 11 illustrated in FIGS. 13 and 14 includes a plurality of first factor elements 21a and a plurality of second factor elements 21b arranged in a checkerboard pattern. For example, the plurality of first factor elements 21a each have an uneven surface 1a that enables reproduction of a light image 100 of a blue letter "O", and the plurality of second factor elements 21b each have an uneven surface 1a that enables reproduction of a light image 100 of a red letter "K". Note that this is based on a case where the incident angle of the reproduction light is 0°. In this case, when white light is incident on the hologram structure 11 at the incident angle of 0°, the hologram structure 11 reproduces blue "O" and red "K" as illustrated in FIG. 14. As described above, the hologram structure 11 of the present modified example can visibly reproduce the two types of light images 100 each having a single color.

In the hologram structure 11 illustrated in FIGS. 13 and 14, at least one of the first factor element 21a or the second factor element 21b may have the same configuration as that of the factor element 21 of the hologram structure 11 described in the 2-1-th embodiment. That is, for at least one of the first factor element 21a or the second factor element 21b, at least one of the wavelength distribution of the first-order diffracted light with respect to diffraction efficiency or the wavelength distribution of the negative first-order diffracted light with respect to diffraction efficiency may have a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of the diffraction efficiency in at least one of the wavelength band of not less than 380 nm and not more than 600 nm or the wavelength band of not less than 780 nm to not more than 1200 nm. In this case, disappearance or appearance of at least a part of the reproduced light image 100 can be caused in accordance with an increase in the incident angle of the reproduction light with respect to the hologram structure 11.

For example, at least one of the first factor element 21a or the second factor element 21b may have the same configuration as that of the factor element 21 of the hologram structure 11 described in the 2-1-th embodiment. In this case, it is possible to make at least a part of one of the light image 100 of "O" and the light image 100 of "K" visually disappear or appear by changing the incident angle of the reproduction light with respect to the hologram structure 11. Further, in a case where both of the first factor element 21a and the second factor element 21b have the same configuration as that of the factor elements 21 of the hologram structure 11 described in the 2-1-th embodiment, it is possible to make at least a part of both of the light image 100 of "O" and the light image 100 of "K" visually disappear or appear by changing the incident angle of the reproduction light with respect to the hologram structure 11.

Note that, similarly to the factor element 21 of the 2-1 embodiment, for at least one of the first factor element 21a or the second factor element 21b, only one of the wavelength distribution of the first-order diffracted light with respect to diffraction efficiency and the wavelength distribution of the negative first-order diffracted light with respect to diffraction efficiency may have a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of the diffraction efficiency in at least one of the wavelength band of not less than 380 nm and not more than 600 nm or the wavelength band of not less than 780 nm to not more than 1200 nm, and both of the wavelength distribution of the first-order diffracted light with respect to diffraction efficiency and the wavelength distribution of the negative first-order diffracted light with respect to diffraction efficiency may have a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of diffraction efficiency in at least one of the wavelength band of not less than 380 nm and not more than 600 nm or the wavelength band of not less than 780 nm to not more than 1200 nm.

Note that, in the example illustrated in FIG. 14, the first factor element 21a and the second factor element 21b each reproduce an independent light image 100, and the light image reproduced by the first factor element 21a and the light image reproduced by the second factor element 21b may be at least partially superimposed. In this case, a light image of the superimposed portion has a color in which the color of the light image reproduced by the first factor element 21a and the color of the light image reproduced by the second factor element 21b are mixed.

FIG. 15 described above is a conceptual diagram illustrating another example of the plane structure of the transmission type hologram structure 11 according to the 2-2-th embodiment of the second exemplary embodiment. The hologram structure 11 illustrated in FIGS. 15 and 16 includes a plurality of first factor elements 21a, a plurality of second factor elements 21b, and a plurality of third factor elements 21c arranged in a checkerboard pattern. For example, the plurality of first factor elements 21a each have an uneven surface 1a that enables reproduction of a blue light image 100, the plurality of second factor elements 21b each have an uneven surface 1a that enables reproduction of a red light image 100, and the plurality of third factor elements 21c each have an uneven surface 1a that enables reproduction of a green light image 100. Note that this is based on a case where the incident angle of the reproduction light is 0°. In this case, the hologram structure 11 can reproduce not only the red, blue, and green light images 100, but also light images 100 with other colors by superimposing two or more of these light images 100. For example, as illustrated in FIG. 16, by superimposing and reproducing a light image 100 of a red circle, a light image 100 of a green circle, and a light image 100 of blue circle, a portion where the red circle and the green circle are superimposed becomes a yellow light image 100, a portion where the green circle and the blue circle are superimposed becomes a pale blue light image 100, a portion where the blue circle and the red circle are superimposed becomes a purple light image 100, and a portion where the red circle, the green circle, and the blue circle are superimposed becomes a white light image 100.

FIG. 17 described above is a schematic diagram for describing a light image 100 reproduced by another example of the transmission type hologram structure 11 according to the 2-2-th embodiment of the second exemplary embodiment. Each factor element 21 can also reproduce a light image with a color having an arbitrary gradation, and each of the first factor elements 21a that reproduce a red light image, the second factor elements 21b that reproduce a blue light image, and the third factor elements 21c that reproduce a green light image can include a plurality of types of factor elements having different gradations. Even in a case where each factor element 21 is designed based on an original image having an arbitrary gradation, a light image can be reproduced in a color having an arbitrary gradation. In these cases, the hologram structure 11 can also reproduce a full-color light image 100 as illustrated in FIG. 17 in a case where white light is incident.

In the hologram structure 11 illustrated in FIGS. 15 to 17, at least one of the first factor element 21a, the second factor element 21b, or the third factor element 21c may have the same configuration as that of the factor element 21 of the hologram structure 11 described in the 2-1-th embodiment. That is, for at least one of the first factor element 21a, the second factor element 21b, and the third factor element 21c, at least one of the wavelength distribution of the first-order diffracted light with respect to diffraction efficiency or the wavelength distribution of the negative first-order diffracted light with respect to diffraction efficiency may have a local maximum value (for example, the diffraction efficiency has a local maximum value of 0.15 or more in a case where the number of steps of the uneven structure of the hologram structure 11 is two, and the diffraction efficiency has a local maximum value of 0.3 or more in a case where the number of steps of the uneven structure is three or more) of the diffraction efficiency in at least one of the wavelength band of not less than 380 nm and not more than 600 nm or the wavelength band of not less than 780 nm to not more than 1200 nm. In this case, disappearance or appearance of at least a part of the reproduced light image 100 can be caused in accordance with an increase in the incident angle of the reproduction light with respect to the hologram structure 11.

Note that, in the hologram structures 11 illustrated in FIGS. 13 and 15 described above, the types of the factor elements 21 arranged adjacent to each other in both the vertical direction and the horizontal direction are different from each other, but an arrangement mode of the plurality of types of factor elements 21 is not particularly limited. For example, the hologram structure 11 may include a plurality of types of factor elements 21 arranged in a stripe shape, and the types of the factor elements 21 arranged adjacent to each other in one of the vertical direction and the horizontal direction may be different from each other and the types of the factor elements 21 arranged adjacent to each other in the other one of the vertical direction and the horizontal direction may be the same as each other. In addition, a plurality of types of factor elements 21 may be arranged according to an arrangement mode in which the above-described arrangement in the checkerboard pattern and the arrangement in the stripe shape are combined.

[Use]

The use form or application of the hologram structure 11 (light modulation element) and the hologram holder 10 according to the present exemplary embodiment is not limited. The use form or application of the hologram structure 11 (light modulation element) and the hologram holder 10 in the present exemplary embodiment is the same as in, for example, the first exemplary embodiment. A description of the use form or application of the hologram structure 11 (light modulation element) and the hologram holder 10 according to the present exemplary embodiment will be omitted.

[Material for Forming Hologram Layer]

The material for forming the hologram layer 1 in the present exemplary embodiment is not limited. The hologram layer 1 in the present exemplary embodiment can be formed of, for example, the same material as that of the hologram layer 1 in the first exemplary embodiment. A description of the material for forming the hologram layer 1 in the present exemplary embodiment will be omitted.

Other Modified Examples

Modified examples of the present exemplary embodiment are not limited. The modified examples of the present exemplary embodiment can have the same configuration as those of, for example, the first exemplary embodiment. A description of the modified examples in the present exemplary embodiment will be omitted.

Third Exemplary Embodiment

Hereinafter, a light modulation element according to an embodiment of the present disclosure will be described with reference to the drawings. Note that, in the drawings attached to the present specification, for the sake of illustration and ease of understanding, the scale, the vertical/horizontal dimension ratio, and the like are appropriately changed and exaggerated from those of an actual light modulation element.

Further, in the present specification, terms specifying the shape or geometric conditions and a degree thereof, such as "parallel", "orthogonal", and "identical", or a value of a length or an angle is not strictly limited to any meaning, but is interpreted to include a range in which similar functions can be expected.

A light modulation element of each of the following embodiments includes factor elements that reproduce a light image by modulating a phase of incident light. The factor elements each have an uneven surface. In the illustrated example, the factor elements form a diffraction grating. Specifically, the factor elements are configured with a hologram structure, and are each particularly configured with a Fourier transform hologram. The Fourier transform hologram is a hologram produced by recording wavefront information of a Fourier transformed image of an original image, and functions as a so-called Fourier transform lens. In particular, a phase modulation type Fourier transform hologram is a hologram having an uneven surface formed by performing multi-leveling on phase information of a Fourier transformed image and recording the phase information as a depth on a medium, and a diffraction phenomenon based on a light path length difference of the medium is used to reproduce a light image of the original image with the reproduction light. The Fourier transform hologram is advantageous in that, for example, a desired light image (that is, an original image) can be reproduced with high accuracy, and the Fourier transform hologram can be relatively easily produced. However, the factor element of the light modulation element to which the present invention can be applied is not limited to the Fourier transform hologram, and the present invention is also applicable to a hologram for reproducing a light image by another method or a light modulation element having another structure.

In the following description, white light including various wavelengths is described as an example of light incident on the factor element, but the incident light need not necessarily be white light. Further, a specific value of a refractive index described in the present specification is based on light having a wavelength of 589.3 nm unless otherwise specified. Further, in the following description, unless otherwise specified, a refractive index or a characteristic value of an uneven surface related to the factor element is a value derived under the assumption that the factor element is used in an air environment having a refractive index of 1.0.

Figure 67A:
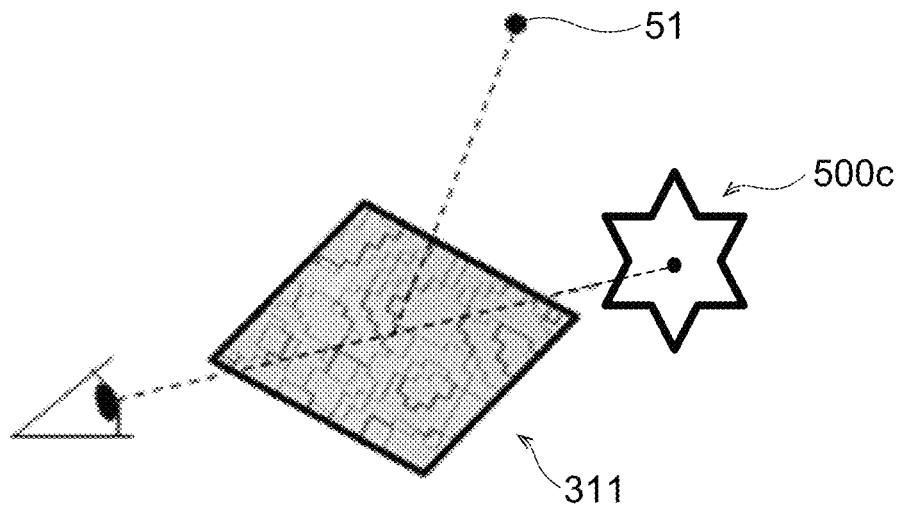
FIG. 67A is a diagram for describing a case where reflection observation of a light modulation element according to a comparative example is performed.
Figure 67B:
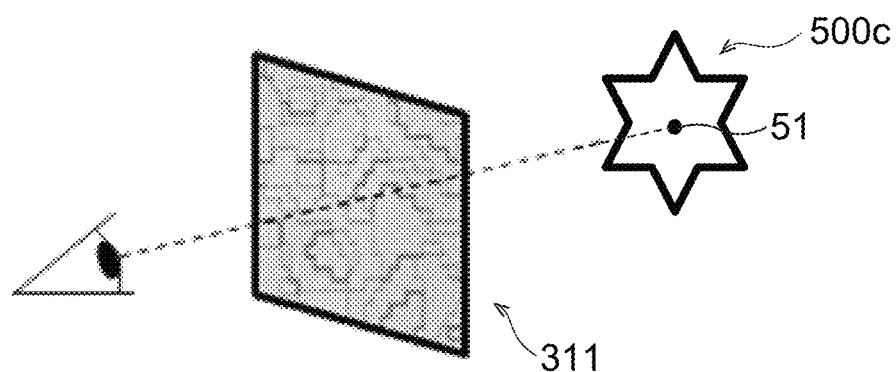
FIG. 67B is a diagram for describing a case where transmission observation of the light modulation element according to the comparative example is performed.

Further, examples of a method of observing light diffracted by the factor element include reflection observation in which a light source and an observer are present on the same side with respect to the factor element and the observer observes diffracted light resulting from reflection from the factor element as illustrated in FIG. 67A and transmission observation in which a light source and an observer are present on different sides while interposing the factor element therebetween, and the observer observes diffracted light resulting from transmission through the factor element as illustrated in FIG. 67B. In the following description, unless otherwise specified, it is assumed that the incident angle of the incident light with respect to the factor element is 0° (that is, an angle along a normal direction of the incident surface of the factor element) in both of the reflection observation and the transmission observation.

Further, in the present specification, the concept of "two or more light images having the same shape" includes not only two or more light images having the same size and the same shape (overall shape), but also two or more light images reproduced at slightly different sizes due to different constituent wavelengths of the light images.

3-1-th Embodiment

Figure 57:
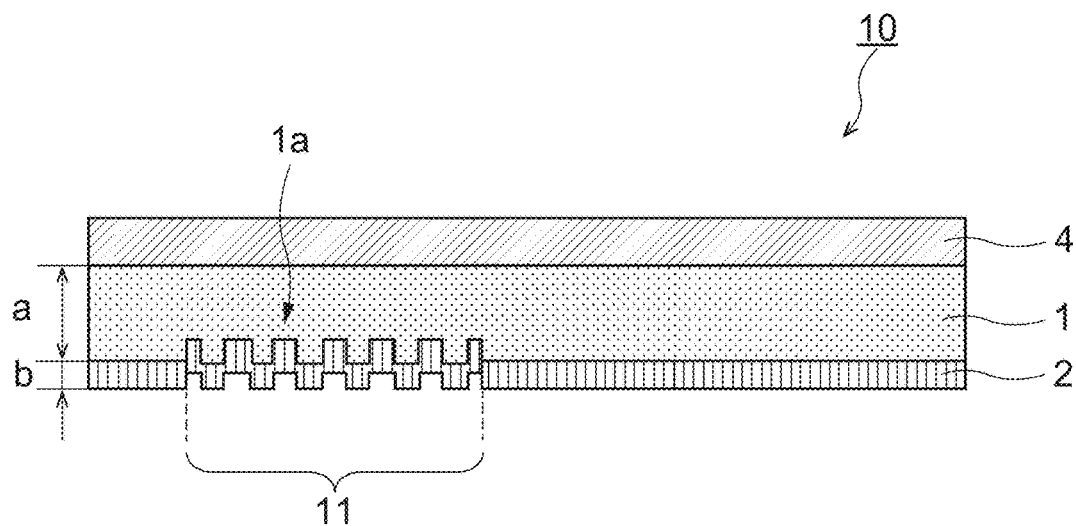
FIG. 57 is a cross-sectional view taken along line LVII-LVII of FIG. 1.

FIG. 1 is a schematic plan view illustrating a typical example of the light modulation element holder 10. FIG. 57 is a cross-sectional view taken along line LVII-LVII of FIG. 1.

The light modulation element holder 10 illustrated in FIGS. 1 and 57 includes a hologram layer 1, a transparent reflection layer 2 laminated on one surface of the hologram layer 1, and a transparent substrate 4 laminated on the other surface of the hologram layer 1. A light modulation element 11 configured as a hologram structure is provided in a part of the light modulation element holder 10. In the light modulation element 11, one surface of the hologram layer 1 is an uneven surface 1a, and the reflection layer 2 covering the uneven surface 1a also has an uneven shape. The uneven surface 1a of the light modulation element 11 has an uneven pattern corresponding to a Fourier transformed image of the original image, and has an unevenness depth corresponding to each pixel of the Fourier transformed image. For example, the light modulation element holder 10 illustrated in FIGS. 1 and 57 can be manufactured by forming a resin (for example, a UV-curable resin or a thermoplastic resin) for forming the hologram layer 1 on the transparent substrate 4 (for example, polyethylene terephthalate (PET)) by coating or the like, performing a UV curing treatment or hot pressing treatment, and an unevenness forming treatment of pressing an uneven surface of an original plate, on the hologram layer 1, and then forming the reflection layer 2 (for example, ZnS, or $TiO_2$) on the uneven surface 1a of the hologram layer 1. Note that, although not illustrated, other members such as a gluing material, an adhesive, and/or a heat seal layer may be further formed on the reflection layer 2.

When light is incident on such a light modulation element 11 from a point light source or a parallel light source, a light image (that is, an original image) corresponding to the uneven pattern of the uneven surface 1a is reproduced. This type of light modulation element does not require a screen or the like for projecting a light image and reproduces a light image with significantly high quality when light from a specific light source such as a point light source or a parallel light source is incident, and thus can be conveniently and widely used for design use, security use, or other uses. A light image that can be reproduced by such a light modulation element is not particularly limited, and for example, a letter, a symbol, a line drawing, a picture, a pattern, and a combination thereof can be used as an original image and a reproducible light image.

Figure 58:
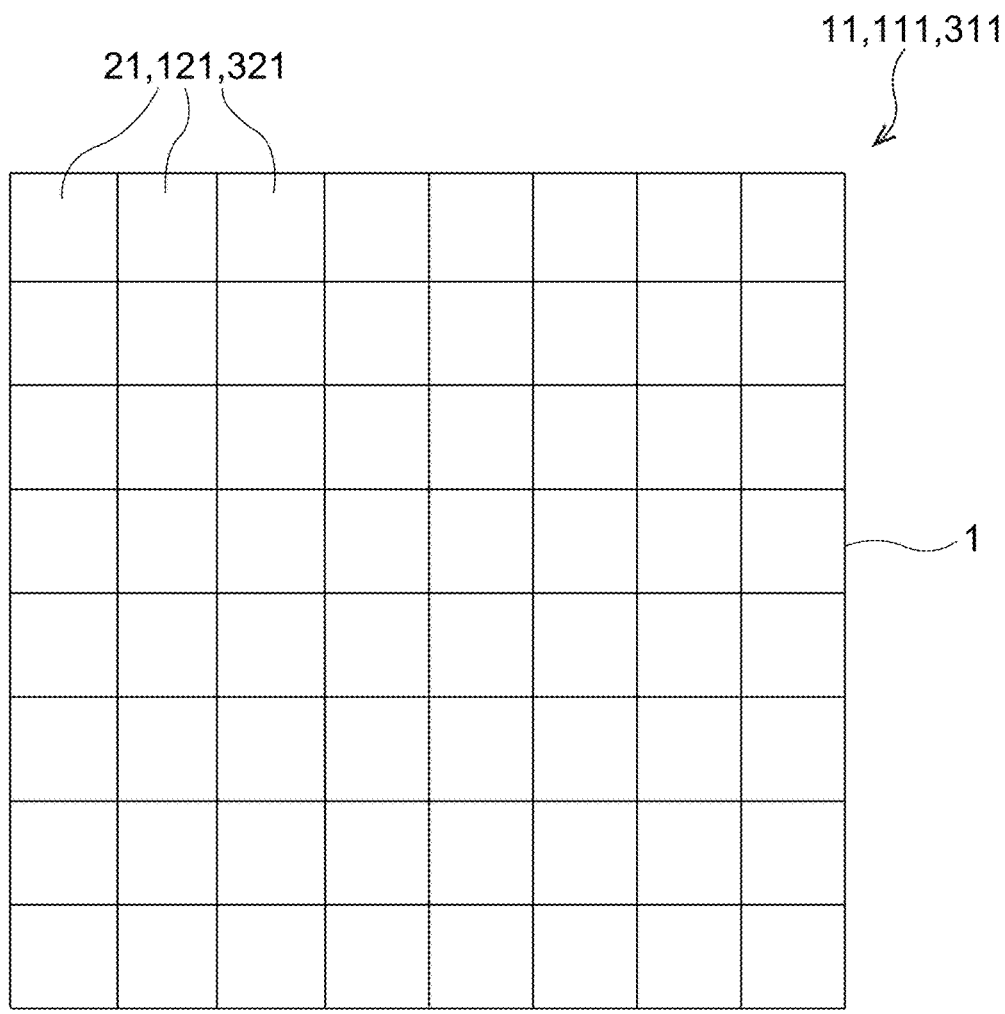
FIG. 58 is a conceptual diagram illustrating a plane structure of a light modulation element.

FIG. 58 is a conceptual diagram illustrating a plane structure of the light modulation element 11. The light modulation element 11 of the present embodiment includes a plurality of factor elements (also referred to as "hologram cells") 21 that are two-dimensionally and regularly arranged. Each factor element 21 has the above-mentioned uneven surface 1a, has a plane size of several nm to several mm square (for example, 2 mm square), and reproduces a light image by modulating a phase of incident light.

Figure 59:
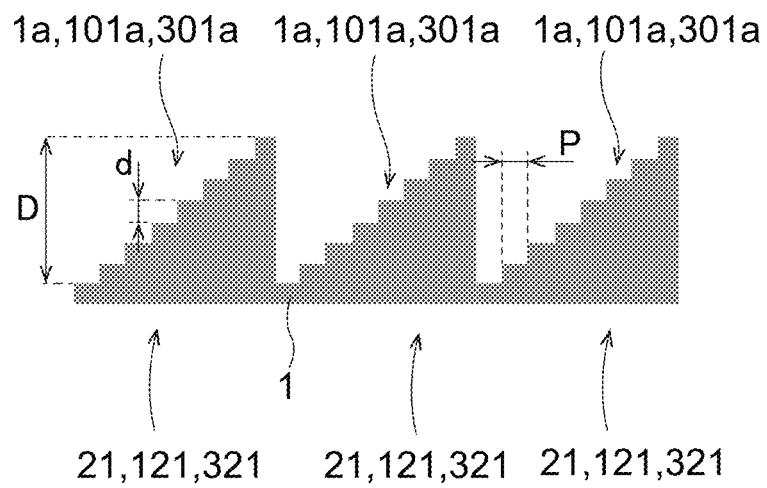
FIG. 59 is a cross-sectional view of factor elements schematically illustrating an example of a stepped structure of an uneven surface.
Figure 60:
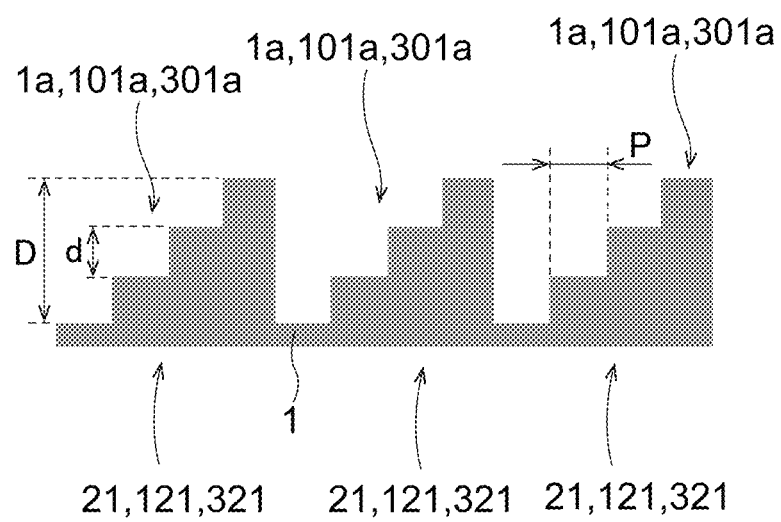
FIG. 60 is a cross-sectional view of factor elements schematically illustrating another example of a stepped structure of an uneven surface.

The uneven surface 1a has a multi-step shape (that is, two or more steps), and the number of steps of the uneven surface 1a is not particularly limited. In a case of reproducing a light image in a plurality of colors, the uneven surface 1a preferably has three or more steps, and in particular, in a case of using the uneven surface 1a having four or more steps, it is possible to reproduce an original image having a complicated composition with high definition. FIGS. 59 and 60 each are a cross-sectional view of the factor elements 21 schematically illustrating the step structure of the uneven surface 1a, FIG. 59 illustrates an eight-step type uneven surface 1a, and FIG. 60 illustrates a four-step type uneven surface 1a. Note that FIGS. 59 and 60 illustrate the factor elements 21 of which the uneven surfaces 1a have the same step shape, but the actual uneven surface 1a has a step shape corresponding to the reproduced light image (that is, the original image). Note that a pitch (that is, a pixel pitch (see Reference Sign "P" illustrated in FIGS. 59 and 60)) of an uneven pattern on the uneven surface 1a is preferably in a range of 0.1 µm to 80.0 µm from the viewpoint of accurately reproducing a light image, and in general, is preferably 1 µm or more.

In general, a light modulation element that reproduces a light image by modulating a phase of incident light reproduces a light image both in the reflection observation and the transmission observation. The light image to be reproduced corresponds to a pattern of the unevenness of the light modulation element, and as illustrated in FIGS. 67A and 67B, the same light image is observed in both of the reflection observation and the transmission observation. However, the light modulation element according to the 3-1-th embodiment is designed such that a light image is observed in the reflection observation, but a light image is not observed in the transmission observation as illustrated in FIGS. 61A and 61B.

Hereinafter, a structure of the factor element 21 will be described in more detail.

Figure 61A:
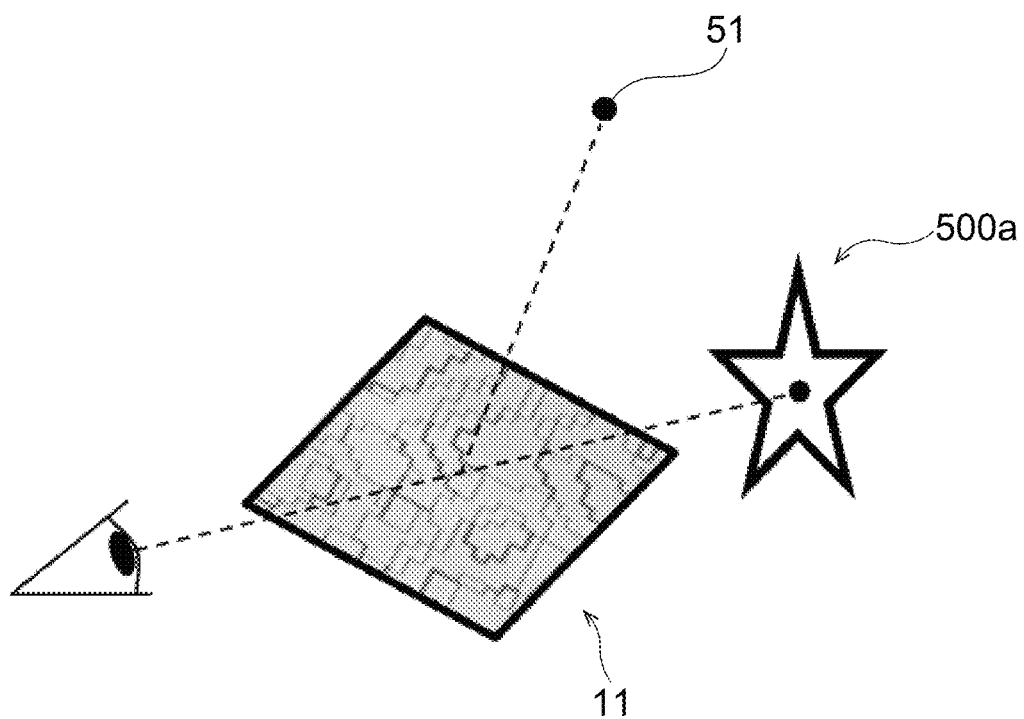
FIG. 61A is a diagram for describing a case where reflection observation of a light modulation element according to a 3-1-th embodiment of a third exemplary embodiment is performed.
Figure 61B:
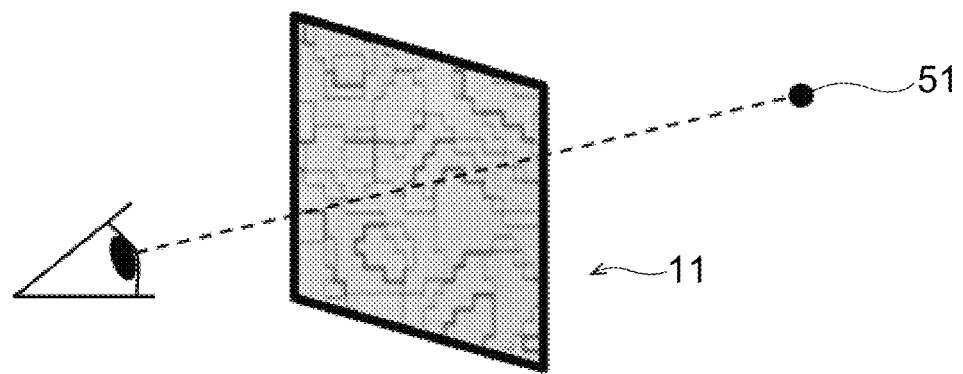
FIG. 61B is a diagram for describing a case where transmission observation of the light modulation element according to the 3-1-th embodiment of the third exemplary embodiment is performed.
Figure 62A:
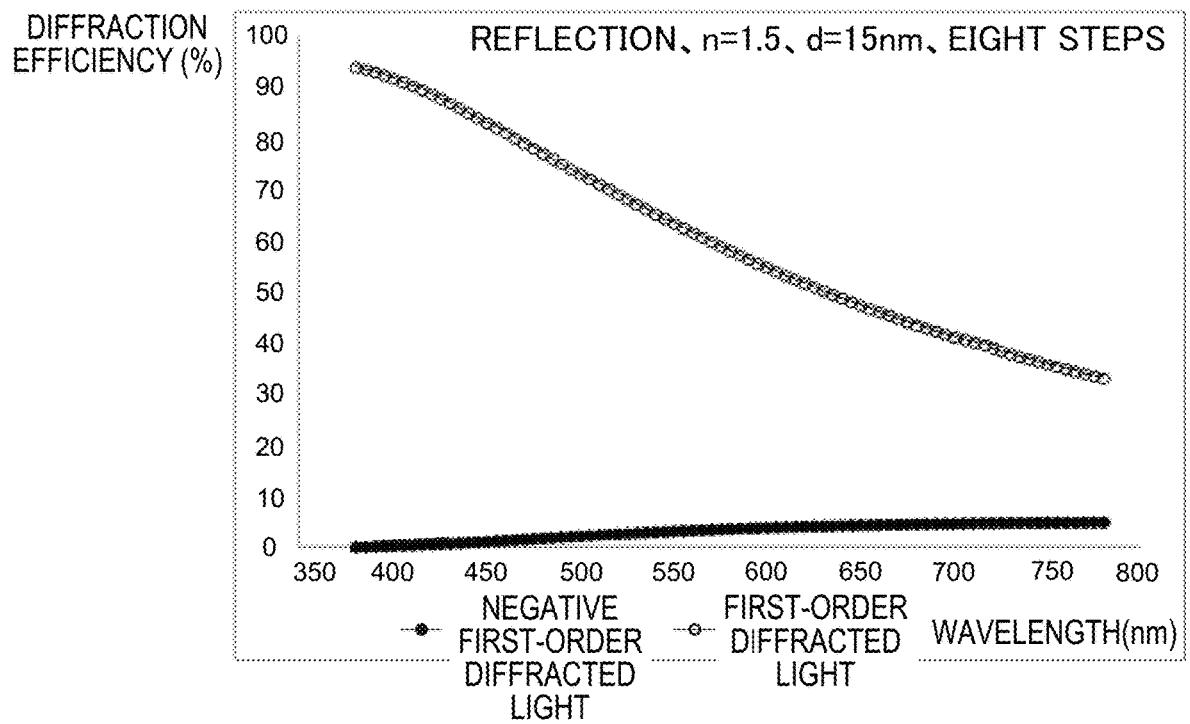
FIG. 62A is a graph illustrating an example of a relationship between wavelength distribution and diffraction efficiency of each of first-order diffracted light and negative first-order diffracted light in a case of reflection from each factor element.
Figure 62B:
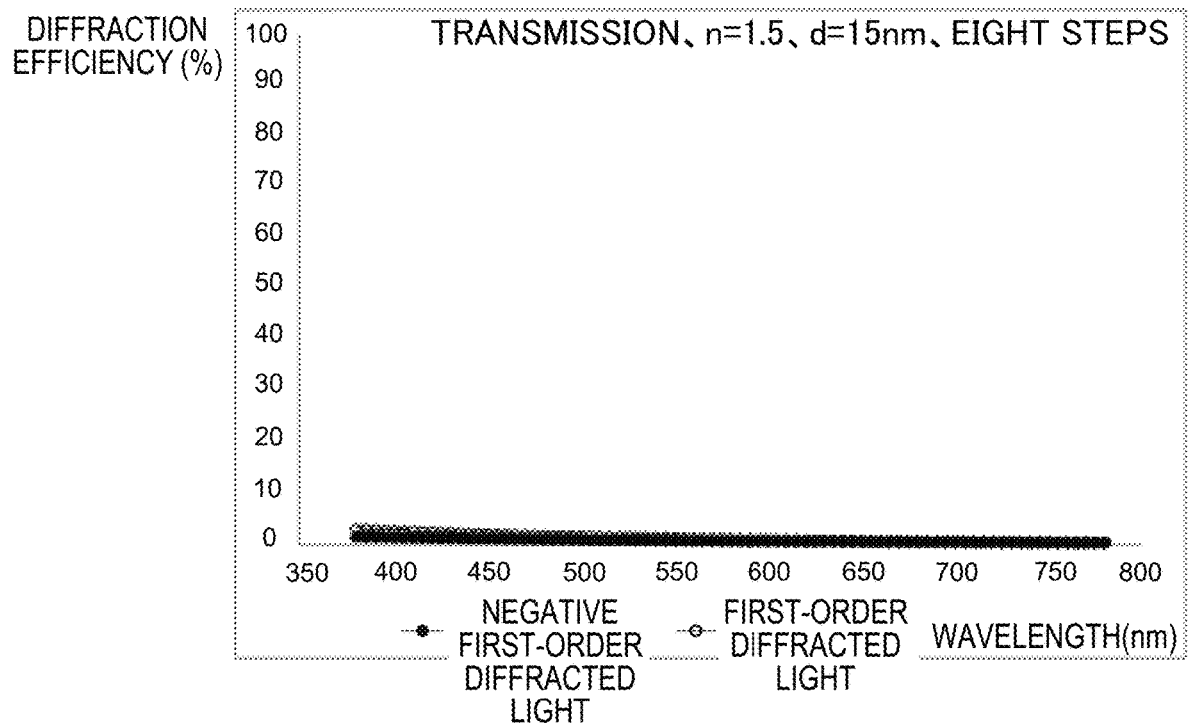
FIG. 62B is a graph illustrating an example of a relationship between wavelength distribution and diffraction efficiency of each of first-order diffracted light and negative first-order diffracted light in a case of transmission through each factor element.

FIGS. 61A and 61B are diagrams for describing a case where reflection observation of the light modulation element according to the 3-1-th embodiment is performed and a case where transmission observation of the light modulation element according to the 3-1-th embodiment is performed, respectively. In FIGS. 61A and 61B, Reference Sign "51" denotes a light source. Further, in FIG. 61A, Reference Sign "500a" denotes a light image to be reproduced by the light modulation element. Further, FIGS. 62A and 62B are each a graph showing a diffraction efficiency characteristic of each factor element constituting the light modulation element illustrated in FIGS. 61A and 61B.

First, among light diffracted by the factor element 21, the first-order diffracted light and the negative first-order diffracted light mainly contribute to reproduction of the intended light image 500a. Second- or higher-order diffracted light in the factor element 21 does not contribute to clear reproduction of the light image 500a. In addition, a part of light that is incident on the factor element 21 is transmitted through the factor element 21 without being diffracted by the factor element 21 and becomes the 0th-order light, but the 0th-order light only generates a light image of a point and does not contribute to the reproduction of the light image 500a.

The factor element 21 of the 3-1-th embodiment is designed so that a light image is observed in the reflection observation, but a light image is not observed in the transmission observation. Each factor element 21 has such a diffraction characteristic, such that the light modulation element 11 constituted by the factor element 21 can have a characteristic that the light image 500a is observed in the reflection observation, but the light image 500a is not observed in the transmission observation. As illustrated in FIG. 61A, each factor element 21 is designed so that the star-shaped light image 500a is reproduced by all the plurality of factor elements 21 illustrated in FIG. 58 with diffracted light resulting from reflection from each factor element 21.

Specifically, each factor element 21 has the following diffraction efficiency characteristic. That is, each factor element 21 is designed so that a maximum diffraction efficiency in the wavelength band of not less than 380 nm and not more than 780 nm in wavelength distribution of first-order diffracted light resulting from reflection from each factor element 21 with respect to diffraction efficiency and wavelength distribution of negative first-order diffracted light resulting from reflection from each factor element 21 with respect to diffraction efficiency is 20% or higher. Further, each factor element 21 is designed so that a maximum diffraction efficiency in the wavelength band of not less than 380 nm and not more than 780 nm in wavelength distribution of first-order diffracted light resulting from transmission through each factor element 21 with respect to diffraction efficiency and wavelength distribution of negative first-order diffracted light resulting from transmission through each factor element 21 with respect to diffraction efficiency is 10% or lower.

The factor element 21 having such a diffraction efficiency characteristic is implemented by, for example, designing the factor element 21 so that the light path length difference of the light reflected from each factor element 21 is 45 nm per step.

A relationship between the diffraction efficiency and the wavelength distributions of the first-order diffracted light and the negative first-order diffracted light resulting from reflection and transmission from and through the factor element 21 designed so that the light path length difference of the light reflected from the factor element 21 is 45 nm per step will be described with reference to FIGS. 62A and 62B.

FIG. 62A is a graph illustrating a relationship between the diffraction efficiency and the wavelength distribution of each of the first-order diffracted light and the negative first-order diffracted light resulting from reflection from the factor element 21. Further, FIG. 62B is a graph illustrating a relationship between the diffraction efficiency and the wavelength distribution of each of the first-order diffracted light and the negative first-order diffracted light resulting from transmission through the factor element 21. In FIGS. 62A and 62B, a horizontal axis represents a wavelength (unit: nm), and a vertical axis represents diffraction efficiency (unit: %). When the diffraction efficiency is represented by an amount obtained by dividing a radiant flux (unit: µW or µJ/cm$^2$) of light diffracted in a certain direction by a radiant flux of light incident on the factor element 21, the radiant flux of the diffracted light in a certain direction is represented by P, and the radiant flux of the incident light is represented by P0, the diffraction efficiency η is a dimensionless number represented by "η=P/P0".

In the example illustrated in FIGS. 62A and 62B, the factor element 21 is formed of a material having a refractive index n of 1.5, the uneven surface 1a has eight steps, and a height d per step of the uneven surface 1a is 15 nm. The light path length difference of the light reflected from the factor element 21 configured as described above is 45 nm per step.

As can be understood from FIG. 62A, a maximum diffraction efficiency in the wavelength band of not less than 380 nm and not more than 780 nm in the wavelength distribution of the first-order diffracted light resulting from reflection from each factor element 21 with respect to diffraction efficiency and the wavelength distribution of the negative first-order diffracted light resulting from reflection from each factor element 21 with respect to diffraction efficiency is 20% or higher. Meanwhile, as can be understood from FIG. 62B, a maximum diffraction efficiency in the wavelength band of not less than 380 nm and not more than 780 nm in the wavelength distribution of the first-order diffracted light resulting from transmission through the factor element 21 with respect to diffraction efficiency and the wavelength distribution of the negative first-order diffracted light resulting from transmission through the factor element 21 with respect to diffraction efficiency is 10% or lower.

Specifically, as can be understood from FIG. 62A, the first-order diffracted light resulting from reflection from the factor element 21 is diffracted at diffraction efficiency sufficient to reproduce the light image 500a, in the wavelength band of not less than 380 nm and not more than 780 nm. On the other hand, as can be understood from FIG. 62B, both of the first-order diffracted light and the negative first-order diffracted light resulting from transmission through the factor element 21 are not diffracted at diffraction efficiency sufficient to reproduce the light image 500a in the wavelength band of not less than 380 nm and not more than 780 nm. This means that, in a case of performing the reflection observation of the light modulation element 11, the light image 500a can be observed, but in a case of performing the transmission observation of the light modulation element 11, the light image 500a cannot be observed.

Note that the factor element 21 having such a diffraction efficiency characteristic is not limited to be designed so that the light path length difference of the light reflected from the factor element 21 is 45 nm per step. For example, the above-described condition can be satisfied also with the factor element 21 designed so that the light path length difference of the light reflected from the factor element 21 is 15 nm per step. Therefore, for example, even in a case where the factor element 21 is formed of a material having a refractive index n of 1.5, the number of steps and a height d per step of the uneven surface 1a are eight and 5 nm, respectively, the factor element 21 can have the above-described diffraction efficiency characteristic.

Further, it is preferable that the factor element 21 is designed to have the uneven surface 1a with a different height of five or more steps. Here, according to the knowledge obtained by the present inventors, when the uneven surface 1a has a different height of five or more steps, it is easy to obtain the factor element 21 satisfying the above-described diffraction efficiency characteristic.

Next, an example of a method of manufacturing the light modulation element 11 (particularly, the uneven surface 1a) will be described. The method described below is merely an example, and another method capable of appropriately manufacturing the light modulation element 11 including the desired uneven surface 1a can be adopted.

First, a two-dimensional image of an original image is read by a computer (Step 1). Then, the computer obtains a two-dimensional complex amplitude image by converting each pixel value of the read two-dimensional image to an amplitude value and assigning, as a phase value, a random value between 0 and 2n to each pixel (Step 2). Then, the computer performs a two-dimensional Fourier transform of the two-dimensional complex amplitude image to obtain a two-dimensional Fourier transformed image (Step 3). Note that the computer may perform any optimization processing such as an iterative Fourier transform algorithm or a genetic algorithm as needed (Step 4). Then, the computer discretizes the phase value of each pixel of the two-dimensional Fourier transformed image into a plurality of stages (for example, four stages of "0", "π/2", "π" and "3π/2", or eight stages of "0", "π/4", "π/2", "3π/4", "π", "5π/4", "3π/2", and "7π/4") (Step 5).

Figure 63A:
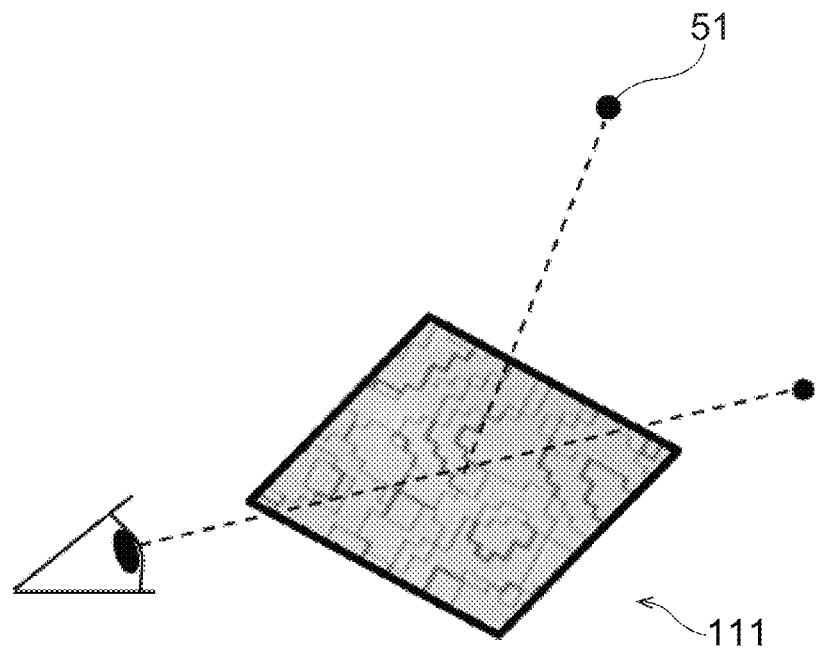
FIG. 63A is a diagram for describing a case where reflection observation of a light modulation element according to a 3-2-th embodiment of the third exemplary embodiment is performed.
Figure 63B:
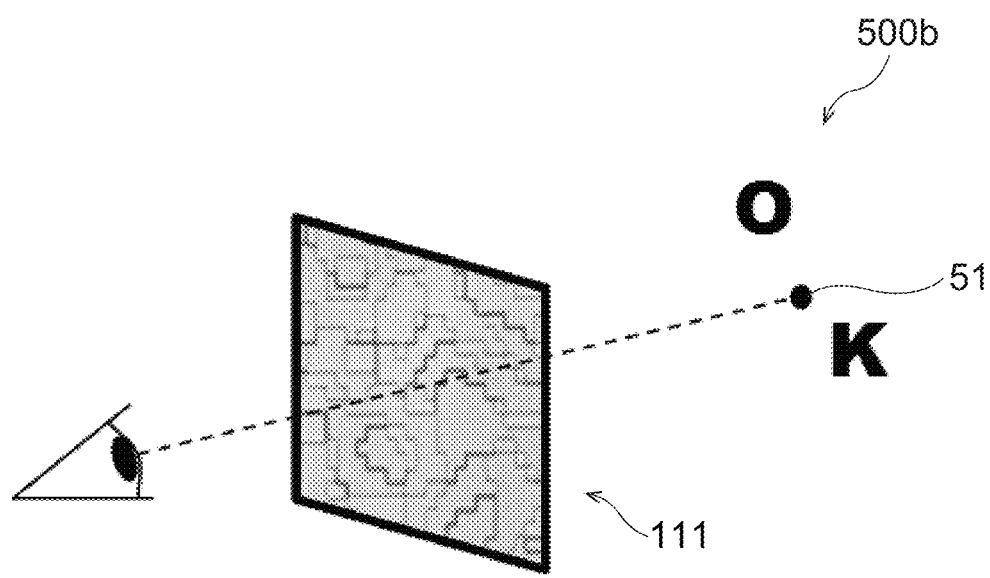
FIG. 63B is a diagram for describing a case where transmission observation of the light modulation element according to the 3-2-th embodiment of the third exemplary embodiment is performed.

Then, the light modulation element 11 (particularly, the uneven surface 1a) corresponding to the two-dimensional Fourier transformed image is produced so that each pixel has a depth corresponding to the corresponding discretized phase value (Step 6). For example, in a case where the pixel value of the two-dimensional Fourier transformed image is discretized into four stages in Step 5 described above, an uneven surface 1a (see FIG. 60) having a four-step depth is formed in the hologram layer 1 in Step 6. The depth of the uneven surface 1a is determined by a computer in view not only of the diffraction efficiency characteristic to be implemented, but also of various other related parameters (for example, a refractive index of a material for forming the light modulation element 11 (particularly, the hologram layer 1)). Note that the light modulation element 11 (particularly, the uneven surface 1a) in which a light image is observed only in the reflection observation as illustrated in FIGS. 61A and 61B, and a light modulation element 111 (particularly, an uneven surface 101a) in which a light image is observed only in the transmission observation as illustrated in FIGS. 63A and 63B, which will be described later, can be produced by the same method, but the light modulation element 11 and the light modulation element 111 have the uneven surfaces 1a and 101a with unique depth structures, respectively, and for example, even in a case of implementing the same diffraction characteristic, a specific value of a depth of each uneven surface 1a or 101a of the light modulation element is different between the light modulation element 11 in which a light image is observed only in the reflection observation and the light modulation element 111 in which a light image is observed only in the transmission observation.

A manufacturing apparatus for the light modulation element 11 is not particularly limited, and may be, for example, an apparatus controlled by the computer that executes Steps 1 to 5 described above, or may be an apparatus provided separately from the computer. Further, if necessary, a mother plate (that is, a master original plate) corresponding to the structure of the light modulation element 11 (particularly, the uneven surface 1a) may be formed by using an exposure apparatus or an electron beam lithography apparatus based on a photolithography technique (Step 7). For example, a liquid UV-curable resin is dropped on the mother plate, and ultraviolet rays are irradiated on the UV-curable resin sandwiched between a base film (for example, a polyethylene terephthalate film (PET film)) and the mother plate to cure the UV-curable resin, and then, the UV-curable resin is peeled off from the mother plate together with the base film, whereby the light modulation element 11 having a desired uneven surface 1a can be produced. As other methods, for example, a method using a thermoplastic UV-curable resin, a method using a thermoplastic resin, a method using a thermosetting resin, and a method using an ionizing radiation curable resin may be adopted. By using the mother plate in this way, the light modulation element 11 having the desired uneven surface 1a can be copied easily and in large quantities.

The transparent reflection layer 2 (for example, a reflection layer formed of ZnS or TiO$_2$) is further formed on the uneven surface 1a of the light modulation element 11 obtained as described above by the manufacturing apparatus. However, in a case of the light modulation element 11 that reflects the reproduction light using the difference in refractive index between the hologram layer 1 and the air, the reflection layer 2 may not be additionally provided and the uneven surface 1a of the hologram layer 1 may be left exposed to the air. Further, if necessary, another functional layer (for example, a heat seal layer or a primer layer for increasing the adhesion between adjacent layers) such as an adhesive layer may be formed on the hologram layer 1. Further, for example, in a case where the reflection layer 2 is formed on the uneven surface 1a of the hologram layer 1, an adhesive layer may be formed on a surface (which is opposite to a surface facing the hologram layer 1) of the reflection layer 2 having the uneven shape, such that a concave portion of the surface of the reflection layer 2 is filled with the adhesive layer.

According to the 3-1-th embodiment as described above, the light modulation element 11 includes the factor elements 21 that reproduce the light image 500*a* by modulating a phase of incident light. The factor element 21 has the uneven surface 1*a*. Further, the maximum diffraction efficiency in the wavelength band of not less than 380 nm and not more than 780 nm in the wavelength distribution of the first-order diffracted light resulting from reflection from each factor element 21 with respect to diffraction efficiency and the wavelength distribution of the negative first-order diffracted light resulting from reflection from each factor element 21 with respect to diffraction efficiency is 20% or higher. Further, the maximum diffraction efficiency in the wavelength band of not less than 380 nm and not more than 780 nm in the wavelength distribution of the first-order diffracted light resulting from transmission through the factor element 21 with respect to diffraction efficiency and the wavelength distribution of the negative first-order diffracted light resulting from transmission through the factor element 21 with respect to diffraction efficiency is 10% or lower.

With such a light modulation element 11, the first-order diffracted light and/or the negative first-order diffracted light resulting from reflection from the factor element 21 included in the light modulation element 11 is diffracted at diffraction efficiency sufficient to reproduce the light image 500*a* in the wavelength band of not less than 380 nm and not more than 780 nm. Therefore, when the reflection observation of the light modulation element 11 is performed, the light image 500*a* can be observed. On the other hand, both of the first-order diffracted light and the negative first-order diffracted light resulting from transmission through the factor element 21 are not diffracted at diffraction efficiency sufficient to reproduce the light image 500*a* in the wavelength band of not less than 380 nm and not more than 780 nm. Therefore, when the transmission observation of the light modulation element 11 is performed, the light image 500*a* cannot be observed.

Further, in the light modulation element 11 of the present embodiment, each factor element 21 is configured as a Fourier transform hologram. As a result, the factor element 21 that can accurately reproduce a desired light image (that is, an original image) can be relatively easily produced.

3-2-th Embodiment

Next, a 3-2-th embodiment will be described with reference to FIGS. 63A to 64B. The light modulation element 111 according to the 3-2-th embodiment is designed such that a light image 500*b* is observed in the transmission observation, but the light image 500*b* is not observed in the reflection observation as illustrated in FIGS. 63A and 63B.

In the following description and the drawings used in the following description, parts that can be configured in the same manner as in the 3-1-th embodiment are denoted by the same reference signs used for corresponding parts in the 3-1-th embodiment, and an overlapping description will be omitted.

Figure 64A:
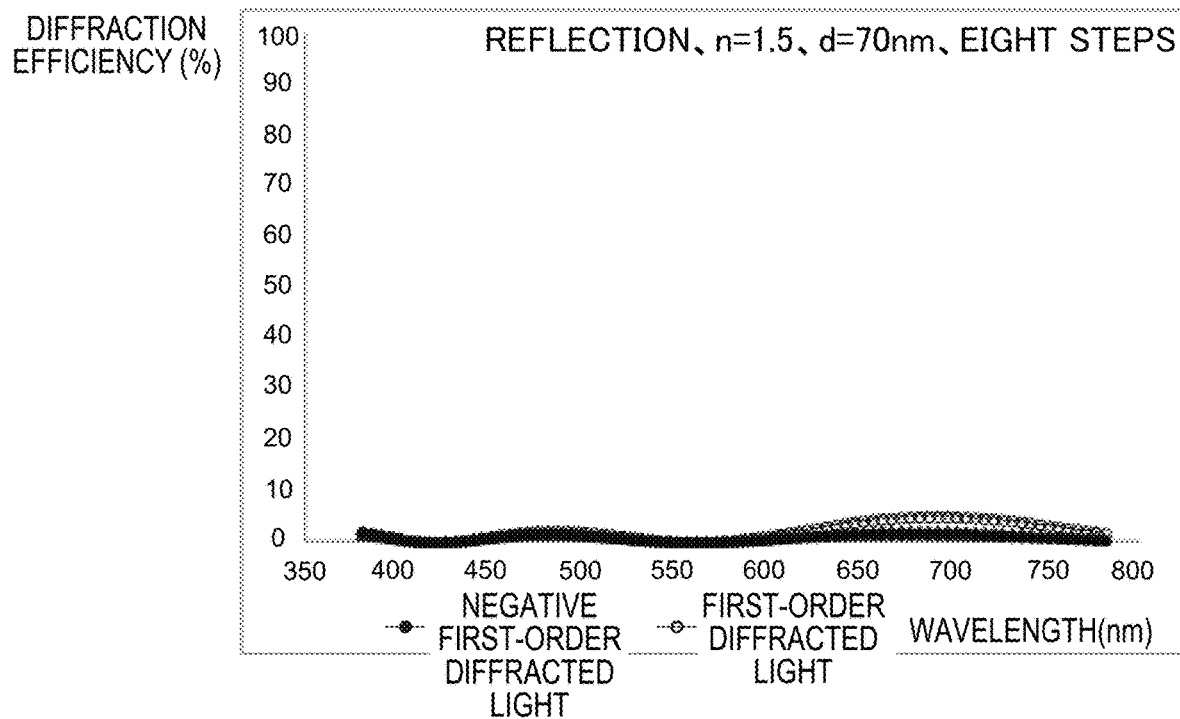
FIG. 64A is a graph illustrating an example of a relationship between wavelength distribution and diffraction efficiency of each of first-order diffracted light and negative first-order diffracted light in a case of reflection from each factor element.
Figure 64B:
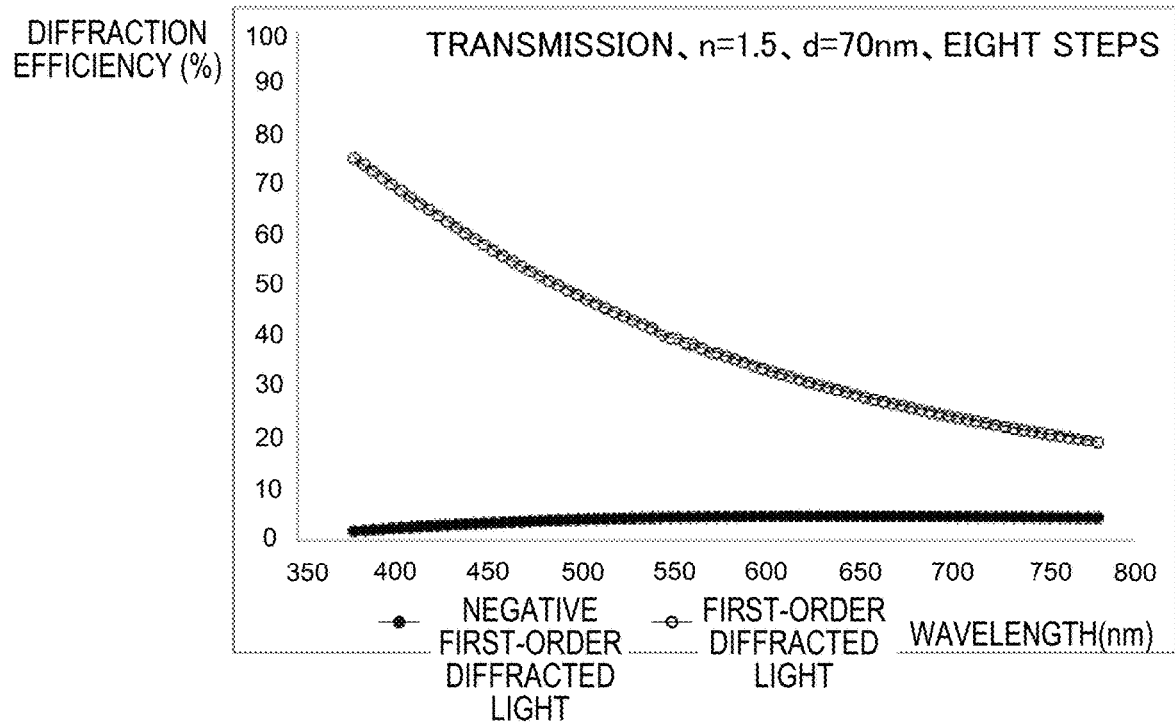
FIG. 64B is a graph illustrating an example of a relationship between wavelength distribution and diffraction efficiency of each of first-order diffracted light and negative first-order diffracted light in a case of transmission through each factor element.

FIGS. 63A and 63B are diagrams for describing a case where reflection observation of the light modulation element according to the 3-2-th embodiment is performed and a case where transmission observation of the light modulation element according to the 3-2-th embodiment is performed, respectively. In FIG. 63B, Reference Sign "500*b*" denotes a light image to be reproduced by the light modulation element. Further, FIGS. 64A and 64B are each a graph showing a diffraction efficiency characteristic of each factor element constituting the light modulation element illustrated in FIGS. 63A and 63B.

Similarly to the case illustrated in FIGS. 61A to 62B, among light diffracted by a factor element 121, first-order diffracted light and negative first-order diffracted light mainly contribute to reproduction of the intended light image 500*b*. Second- or higher-order diffracted light in the factor element 121 does not contribute to clear reproduction of the light image 500*b*. In addition, a part of light that is incident on the factor element 121 is transmitted through the factor element 121 without being diffracted by the factor element 121 and becomes 0th-order light, but the 0th-order light only generates a light image of a point and does not contribute to the reproduction of the light image 500*b*.

Hereinafter, a structure of the factor element 121 will be described in more detail.

Each factor element 121 of the 3-2-th embodiment is designed so that a light image is not observed in the reflection observation, but a clear light image is observed in the transmission observation. Each factor element 121 has such a diffraction efficiency characteristic, such that the light modulation element 111 constituted by the factor element 121 can have a characteristic that the light image 500*b* is observed in the transmission observation, but the light image 500*b* is not observed in the reflection observation. As illustrated in FIG. 63B, each factor element 121 is designed so that the light image 500*b* having a shape of letters "OK" is reproduced by all the plurality of factor elements 121 illustrated in FIG. 58 with diffracted light resulting from transmission through each factor element 121.

Specifically, the factor element 121 has the following diffraction efficiency characteristic. That is, the factor element 121 is designed so that a maximum diffraction efficiency in the wavelength band of not less than 380 nm and not more than 780 nm in wavelength distribution of first-order diffracted light resulting from transmission through the factor element 121 with respect to diffraction efficiency and wavelength distribution of negative first-order diffracted light resulting from transmission through the factor element 121 with respect to diffraction efficiency is 20% or higher. Further, the factor element 121 is designed so that a maximum diffraction efficiency in the wavelength band of not less than 380 nm and not more than 780 nm in wavelength distribution of first-order diffracted light resulting from reflection from the factor element 121 with respect to diffraction efficiency and wavelength distribution of negative first-order diffracted light resulting from reflection from the factor element 121 with respect to diffraction efficiency is 10% or lower. Further, the factor element 121 is designed to have the uneven surface 101*a* with a different height of five or more steps. Here, according to the knowledge obtained by the present inventors, when the uneven surface 101*a* has a different height of five or more steps, it is easy to obtain the factor element 121 satisfying the above-described diffraction efficiency characteristic.

The factor element 121 having such a diffraction efficiency characteristic is implemented by, for example, designing the factor element 121 so that the light path length difference of the light transmitted through the factor element 121 is 35 nm per step.

A relationship between the diffraction efficiency and the wavelength distributions of the first-order diffracted light and the negative first-order diffracted light resulting from reflection and transmission from and through the factor element 121 designed so that the light path length difference of the light transmitted through the factor element 121 is 35 nm per step will be described with reference to FIGS. 64A and 64B.

FIG. 64A is a graph illustrating a relationship between the diffraction efficiency and the wavelength distribution of each of the first-order diffracted light and the negative first-order diffracted light resulting from reflection from each factor element 121. Further, FIG. 64B is a graph illustrating a relationship between the diffraction efficiency and the wavelength distribution of each of the first-order diffracted light and the negative first-order diffracted light resulting from transmission through each factor element 121. In FIGS. 64A and 64B, a horizontal axis represents a wavelength (unit: nm), and a vertical axis represents diffraction efficiency (unit: %).

In the example illustrated in FIGS. 64A and 64B, the factor element 121 is formed of a material having a refractive index n of 1.5, the uneven surface 101a has eight steps, and a height d per step of the uneven surface 101a is 70 nm. The light path length difference of light transmitted through the factor element 121 configured as described above is 35 nm per step when the factor element 121 is used in an air environment having a refractive index of 1.0.

As can be understood from FIG. 64B, a maximum diffraction efficiency in the wavelength band of not less than 380 nm and not more than 780 nm in the wavelength distribution of the first-order diffracted light resulting from transmission through the factor element 121 with respect to diffraction efficiency and the wavelength distribution of the negative first-order diffracted light resulting from transmission through the factor element 121 with respect to diffraction efficiency is 20% or higher. On the other hand, as can be understood from FIG. 64A, a maximum diffraction efficiency in the wavelength band of not less than 380 nm and not more than 780 nm in the wavelength distribution of the first-order diffracted light resulting from reflection from the factor element 121 with respect to diffraction efficiency and the wavelength distribution of the negative first-order diffracted light resulting from reflection from the factor element 121 with respect to diffraction efficiency is 10% or lower.

Specifically, as can be understood from FIG. 64B, the first-order diffracted light resulting from transmission through the factor element 121 is diffracted at diffraction efficiency sufficient to reproduce the light image 500b, in the wavelength band of not less than 380 nm and not more than 780 nm. On the other hand, as can be understood from FIG. 64A, both of the first-order diffracted light and the negative first-order diffracted light resulting from reflection from the factor element 121 are not diffracted at diffraction efficiency sufficient to reproduce the light image 500b in the wavelength band of not less than 380 nm and not more than 780 nm. This means that, in a case of performing the transmission observation of the light modulation element 111, the light image 500b can be observed, but in a case of performing the reflection observation of the light modulation element 11, the light image 500b cannot be observed.

Note that the factor element 121 having such a diffraction efficiency characteristic is not limited to be designed so that the light path length difference of the light transmitted through the factor element 121 is 35 nm per step. For example, the above-described condition can be satisfied also with the factor element 121 designed so that the light path length difference of the light reflected from the factor element 121 is 70 nm per step. Therefore, for example, when the factor element 121 is used in an air environment having a refractive index of 1.0, even in a case where the factor element 121 is formed of a material having a refractive index n of 1.5, the number of steps and a height d per step of the uneven surface 101a are eight and 140 nm, respectively, the factor element 121 can have the above-described diffraction efficiency characteristic.

Note that it is a matter of course that in a case where the light modulation element 111 is used in an environment other than the air environment, or in a case where a concave portion of the uneven surface 101a of the light modulation element 111 is filled with an adhesive layer or the like, the refractive index of the material for forming the light modulation element 111 (factor element 121), the number of steps and a height d per step of the uneven surface 101a need to be determined in consideration of a refractive index of a medium in the corresponding environment, a refractive index of a material for forming the adhesive layer or the like, or the like.

As described above, the light modulation element 111 of the present embodiment includes the factor elements 121 that reproduce the light image 500b by modulating a phase of incident light. The factor element 121 has the uneven surface 101a with a different height of five or more steps. Further, the maximum diffraction efficiency in the wavelength band of not less than 380 nm and not more than 780 nm in the wavelength distribution of the first-order diffracted light resulting from transmission through the factor element 121 with respect to diffraction efficiency and the wavelength distribution of the negative first-order diffracted light resulting from transmission through the factor element 121 with respect to diffraction efficiency is 20% or higher. Further, the maximum diffraction efficiency in the wavelength band of not less than 380 nm and not more than 780 nm in the wavelength distribution of the first-order diffracted light resulting from reflection from each factor element 121 with respect to diffraction efficiency and the wavelength distribution of the negative first-order diffracted light resulting from reflection from each factor element 121 with respect to diffraction efficiency is 10% or lower.

With such a light modulation element 111, the first-order diffracted light and/or the negative first-order diffracted light resulting from transmission through the factor element 121 included in the light modulation element 111 is diffracted at diffraction efficiency sufficient to reproduce the light image 500b in the wavelength band of not less than 380 nm and not more than 780 nm. Therefore, when the transmission observation of the light modulation element 111 is performed, the light image 500b can be observed. On the other hand, both of the first-order diffracted light and the negative first-order diffracted light resulting from reflection from the factor element 121 are not diffracted at diffraction efficiency sufficient to reproduce the light image 500b in the wavelength band of not less than 380 nm and not more than 780 nm. Therefore, when the reflection observation of the light modulation element 11 is performed, the light image 500b cannot be observed.

3-3-th Embodiment

Next, a 3-3-th embodiment will be described with reference to FIGS. 65A to 66. A light modulation element according to the 3-3-th embodiment is designed such that a light image is observed in both of the reflection observation and the transmission observation, but a light image observed in the reflection observation and a light image observed in the transmission observation are different from each other as illustrated in FIGS. 65A and 65B.

In the following description and the drawings used in the following description, parts that can be configured in the same manner as in the 3-1-th embodiment or the 3-2-th embodiment are denoted by the same reference signs used for corresponding parts in the 3-1-th embodiment or the 3-2-th embodiment, and an overlapping description will be omitted.

Figure 65A:
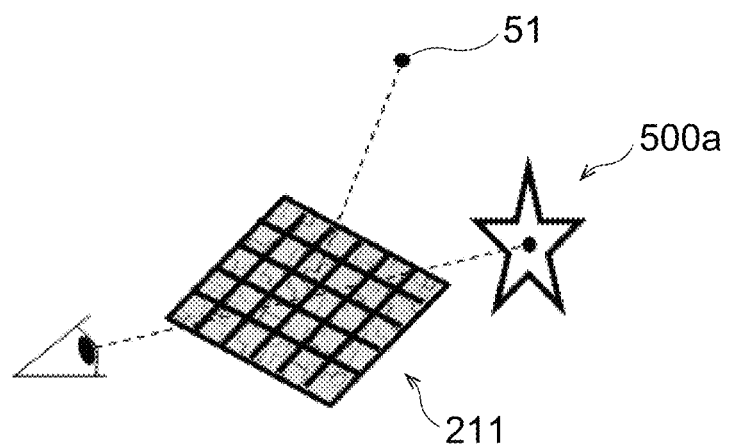
FIG. 65A is a diagram for describing a case where reflection observation of a light modulation element according to a 3-3-th embodiment of the third exemplary embodiment is performed.
Figure 65B:
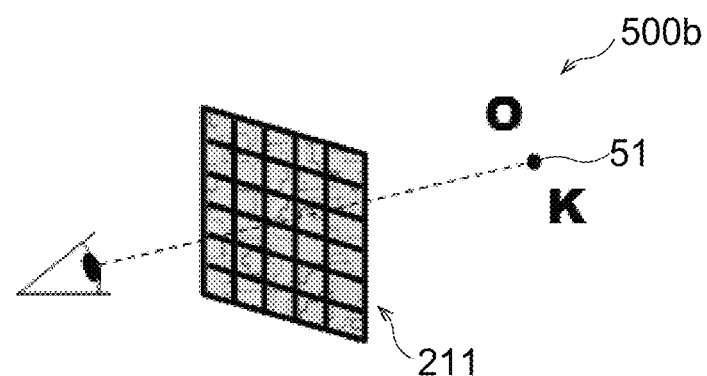
FIG. 65B is a diagram for describing a case where transmission observation of the light modulation element according to the 3-3-th embodiment of the third exemplary embodiment is performed.

FIGS. 65A and 65B are diagrams for describing a case where reflection observation of the light modulation element according to the 3-3-th embodiment is performed and a case where transmission observation of the light modulation element according to the 3-3-th embodiment is performed, respectively. Further, FIG. 66 is a diagram illustrating a configuration of the light modulation element illustrated in FIGS. 65A and 65B.

Hereinafter, a structure of the light modulation element according to the 3-3-th embodiment will be described in more detail.

As described above, a light modulation element 211 according to the 3-3-th embodiment is designed such that a light image is observed in both of the reflection observation and the transmission observation, but a light image 500a observed in the reflection observation and a light image 500b observed in the transmission observation are different from each other (see FIGS. 65A and 65B).

Figure 66:
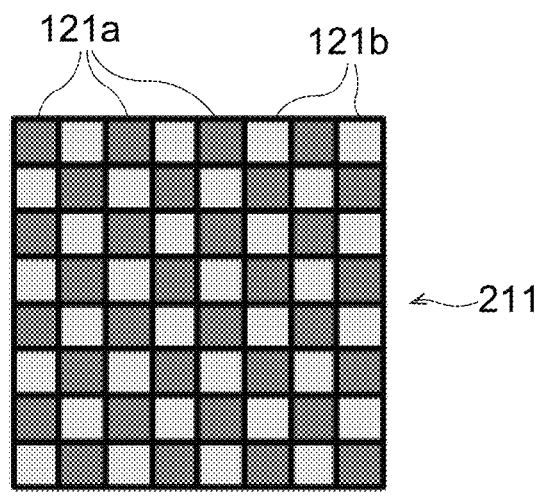
FIG. 66 is a conceptual diagram illustrating an example of a plane structure of the light modulation element according to the 3-3-th embodiment of the third exemplary embodiment.

As illustrated in FIG. 66, the light modulation element 211 includes a first factor element 121a and a second factor element 121b that reproduce a light image by modulating a phase of incident light. The first factor element 121a has the same configuration as that of the factor element illustrated in FIGS. 61A to 62B, and the second factor element 121b has the same configuration as that of the factor element illustrated in FIGS. 63A to 64B. In the example illustrated in FIG. 66, a plurality of first factor elements 121a and a plurality of second factor elements 121b are arranged in a checkerboard pattern on the same plane.

More specifically, each first factor element 121a has an uneven surface 1a. Each first factor element 121a is designed so that a maximum diffraction efficiency in the wavelength band of not less than 380 nm and not more than 780 nm in wavelength distribution of first-order diffracted light resulting from reflection from each first factor element 121a with respect to diffraction efficiency and wavelength distribution of negative first-order diffracted light resulting from reflection from each first factor element 121a with respect to diffraction efficiency is 20% or higher, and a maximum diffraction efficiency in the wavelength band of not less than 380 nm and not more than 780 nm in wavelength distribution of first-order diffracted light resulting from transmission through each first factor element 121a with respect to diffraction efficiency and wavelength distribution of negative first-order diffracted light resulting from transmission through each first factor element 121a with respect to diffraction efficiency is 10% or lower. Further, each first factor element 121a is designed so that the star-shaped light image 500a is reproduced by all the plurality of first factor elements 121a illustrated in FIG. 66 with diffracted light resulting from reflection from each first factor element 121a.

Further, each second factor element 121b has the uneven surface 101a with a different height of five or more steps. Each second factor element 121b is designed so that a maximum diffraction efficiency in the wavelength band of not less than 380 nm and not more than 780 nm in wavelength distribution of first-order diffracted light resulting from transmission through each second factor element 121b with respect to diffraction efficiency and wavelength distribution of negative first-order diffracted light resulting from transmission through each second factor element 121b with respect to diffraction efficiency is 20% or higher, and a maximum diffraction efficiency in the wavelength band of not less than 380 nm and not more than 780 nm in wavelength distribution of first-order diffracted light resulting from reflection from each second factor element 121b with respect to diffraction efficiency and wavelength distribution of negative first-order diffracted light resulting from reflection from each second factor element 121b with respect to diffraction efficiency is 10% or lower. Further, each second factor element 121b is designed so that the light image 500b having a shape of letters "OK" is reproduced by all the plurality of second factor elements 121b illustrated in FIG. 66 with diffracted light resulting from transmission through each second factor element 121b.

The light modulation element 211 includes the first factor element 121a and the second factor element 121b as described above, such that it is possible to implement the light modulation element 211 in which different light images 500a and 500b are observed in reflection observation and transmission observation, respectively.

Note that in the light modulation element 211 illustrated in FIG. 66, the first factor element 121a and the second factor element 121b are arranged in a checkerboard pattern on the same plane, but an arrangement mode of the first factor element 121a and the second factor element 121b is not particularly limited. For example, the light modulation element 11 may include the first factor element 121a and the second factor element 121b that are arranged in a stripe shape on the same plane. In addition, the first factor element 121a and the second factor element 121b may be arranged side by side in a thickness direction of the light modulation element 211.

As such, the light modulation element 211 according to the 3-3-th embodiment includes the first factor element 121a and the second factor element 121b that reproduce the light images 500a and 500b by modulating a phase of incident light. The first factor element 121a has an uneven surface 1a, and the second factor element 121b has an uneven surface 101a with a different height of five or more steps. The maximum diffraction efficiency in the wavelength band of not less than 380 nm and not more than 780 nm in the wavelength distribution of the first-order diffracted light resulting from reflection from the first factor element 121a respect to the diffraction efficiency and the wavelength distribution of the negative first-order diffracted light resulting from reflection from the first factor element 121a with respect to diffraction efficiency is 20% or higher, and the maximum diffraction efficiency in the wavelength band of not less than 380 nm and not more than 780 nm in the wavelength distribution of the first-order diffracted light resulting from transmission through the first factor element 121a with respect to diffraction efficiency and the wavelength distribution of the negative first-order diffracted light resulting from transmission through the first factor element 121a with respect to diffraction efficiency is 10% or lower. Further, the maximum diffraction efficiency in the wavelength band of not less than 380 nm and not more than 780 nm in the wavelength distribution of the first-order diffracted light resulting from transmission through the second factor element 121b with respect to diffraction efficiency and the wavelength distribution of the negative first-order diffracted light resulting from transmission through the second factor element 121b with respect to diffraction efficiency is 20% or higher, and the maximum diffraction efficiency in the wavelength band of not less than 380 nm and not more than 780 nm in the wavelength distribution of the first-order diffracted light resulting from reflection from the second factor element 121b with respect to diffraction efficiency and the wavelength distribution of the negative first-order diffracted light resulting from reflection from the second factor element 121b with respect to diffraction efficiency is 10% or lower.

With such a light modulation element 211, the first-order diffracted light and/or the negative first-order diffracted light resulting from reflection from the first factor element 121a is diffracted at diffraction efficiency sufficient to reproduce the light image 500a in the wavelength band of not less than 380 nm and not more than 780 nm. On the other hand, both of the first-order diffracted light and the negative first-order diffracted light resulting from reflection from the second factor element 121b are not diffracted at diffraction efficiency sufficient to reproduce the light image 500b in the wavelength band of not less than 380 nm and not more than 780 nm. Therefore, when the reflection observation of the light modulation element 211 is performed, only the light image 500a can be observed.

Further, the first-order diffracted light and/or the negative first-order diffracted light resulting from transmission through the second factor element 121b is diffracted at diffraction efficiency sufficient to reproduce the light image 500b in the wavelength band of not less than 380 nm and not more than 780 nm. On the other hand, both of the first-order diffracted light and the negative first-order diffracted light resulting from transmission through the first factor element 121a are not diffracted at diffraction efficiency sufficient to reproduce the light image 500a in the wavelength band of not less than 380 nm and not more than 780 nm. Therefore, when the transmission observation of the light modulation element 211 is performed, only the light image 500b can be observed.

[Use]

The use form or application of the light modulation elements 11, 111, and 211, and the light modulation element holder 10 is not particularly limited, and for example, the light modulation elements 11, 111, and 211, and the light modulation element holder 10 can be used for entertainment use such as reproducing a character image, and design use. Further, in security use, the light modulation elements 11, 111, and 211 can be applied to, for example, the following objects. In a case of using the light modulation element holder 10 as an information recording medium, the light modulation element according to the present invention can be applied to, for example, a passport, an ID card, a banknote, a credit card, a cash voucher, a gift certificate, other tickets, public documents, other media in which various information such as personal information and confidential information are recorded, and other media having a monetary value, and thus can prevent forgery of these objects. Examples of the ID card mentioned here include a national ID card, a license, a membership card, an employee card, and a student card. In the light modulation element holder 10, the substrate (see Reference Sign "4" in FIG. 57) that holds the light modulation element 11, 111, or 211 can be formed of, for example, paper, resin, metal, synthetic fiber, or a combination thereof.

Further, it is possible to apply the light modulation element according to the present invention to the light modulation element holder 10 in any method, for example, the light modulation element according to the present invention can be held by an arbitrary object (that is, the light modulation element holder 10) by using a technique such as unevenness formation on the surface of the light modulation element holder 10, transferring, adhering, sandwiching, or embedding. Therefore, the light modulation elements 11, 111, and 211 may be formed by using a part of the member constituting the light modulation element holder 10, or the light modulation element 11, 111, or 211 may be additionally provided in the light modulation element holder 10.

Further, the light modulation elements 11, 111, and 211 may each be used alone for various uses, or may be used for various uses by being used together with another functional layer such as a print layer.

[Material for Forming Hologram Layer]

The material for forming the hologram layer 1 in the present exemplary embodiment is not limited. The hologram layer 1 in the present exemplary embodiment can be formed of, for example, the same material as those of the hologram layer 1 in the first exemplary embodiment and the hologram layer 1 in the second exemplary embodiment. A description of the material for forming the hologram layer 1 in the present exemplary embodiment will be omitted.

Other Modified Examples

The light modulation elements 11 and 111 used in each of the above-described embodiments includes a plurality of factor elements 21 and a plurality of factor elements 121, respectively, as illustrated in FIG. 58, but the light modulation elements 11 and 111 may also include a single factor element 21 and a single factor element 121, respectively. Further, the light modulation element 211 used in the 3-3-th embodiment includes a plurality of first factor elements 121a and a plurality of second factor elements 121b as illustrated in FIG. 66, but the light modulation element 211 may also include a single first factor element 121a and a single second factor element 121b.

Further, the size and the shape of each of the factor elements 21 and 121 in plan view are not particularly limited, and each of the factor elements 21 and 121 can have an arbitrary size and shape. For example, the shape of each of the factor elements 21 and 121 in plan view may be a quadrangular shape such as a square shape, a rectangular shape, or a trapezoid shape, another polygonal shape (for example, a triangle shape, a pentagon shape, or a hexagon shape), a perfect circle shape, an ellipse shape, another circle shape, a star shape, a heart shape, or the like, or the light modulation element 11, 111, or 211 may include the factor element 21 or 121 having two or more shapes in plan view.

Further, an arbitrary functional layer may be added to each of the light modulation elements 11, 111, and 211, for example, each of the light modulation elements 11, 111, and 211 may be covered with a transparent vapor deposition layer. In particular, it is possible to prevent the light modulation elements 11, 111, and 211 from being glossy to hide the light modulation elements 11, 111, and 211 by providing a transparent vapor deposition layer with no gloss. From the viewpoint of hiding the light modulation elements 11, 111, and 211, a total light transmittance of such a transparent vapor deposition layer is preferably 80% or more, and more preferably, 90% or more. Further, the transparent reflection layer can be formed by covering each of the light modulation elements 11, 111, and 211 with a reflective vapor deposition layer. Examples of a material for forming the reflective vapor deposition layer include ZnS and $TiO_2$. These materials may be used alone to form the vapor deposition layer, or two or more materials may be combined to form the vapor deposition layer.

The thickness of the vapor deposition layer provided on the hologram layer 1 (particularly, on the uneven surface 1a or 101*a*) can be appropriately set in consideration of desired reflectivity, color tone, design, use, and the like, and, for example, the thickness of the vapor deposition layer is preferably in a range of 50 Å to 1 μm, and particularly preferably, in a range of 100 Å to 1000 Å. In particular, it is preferable that the thickness of the vapor deposition layer is 200 Å or less when priority is given to transparency of the vapor deposition layer, and it is preferable that the thickness of the vapor deposition layer is more than 200 Å when priority is given to a hiding property of the vapor deposition layer. Further, as a method of forming the vapor deposition layer, a general method of forming a vapor deposition layer can be employed, and examples thereof include a vacuum vapor deposition method, a sputtering method, and an ion plating method.

Comparative Example

Next, a comparative example of the embodiment will be described with reference to FIGS. 67A to 68B.

Figure 68A:
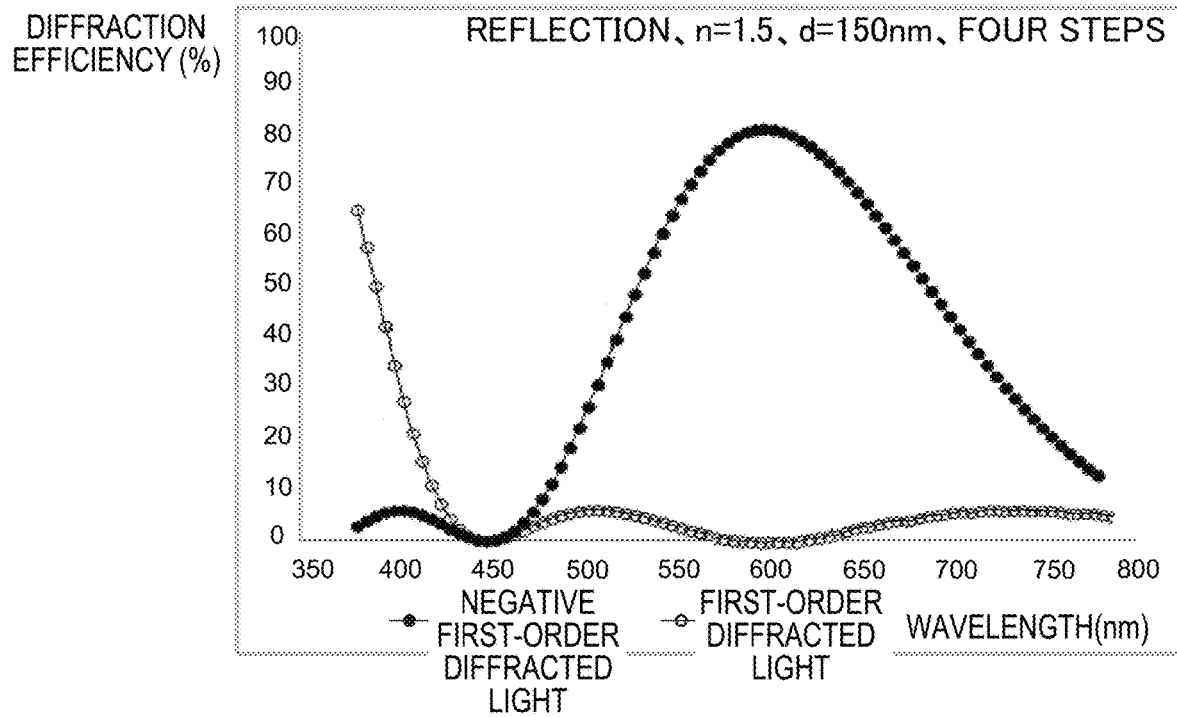
FIG. 68A is a graph illustrating an example of a relationship between wavelength distribution and diffraction efficiency of each of first-order diffracted light and negative first-order diffracted light resulting from reflection from each factor element according to the comparative example.
Figure 68B:
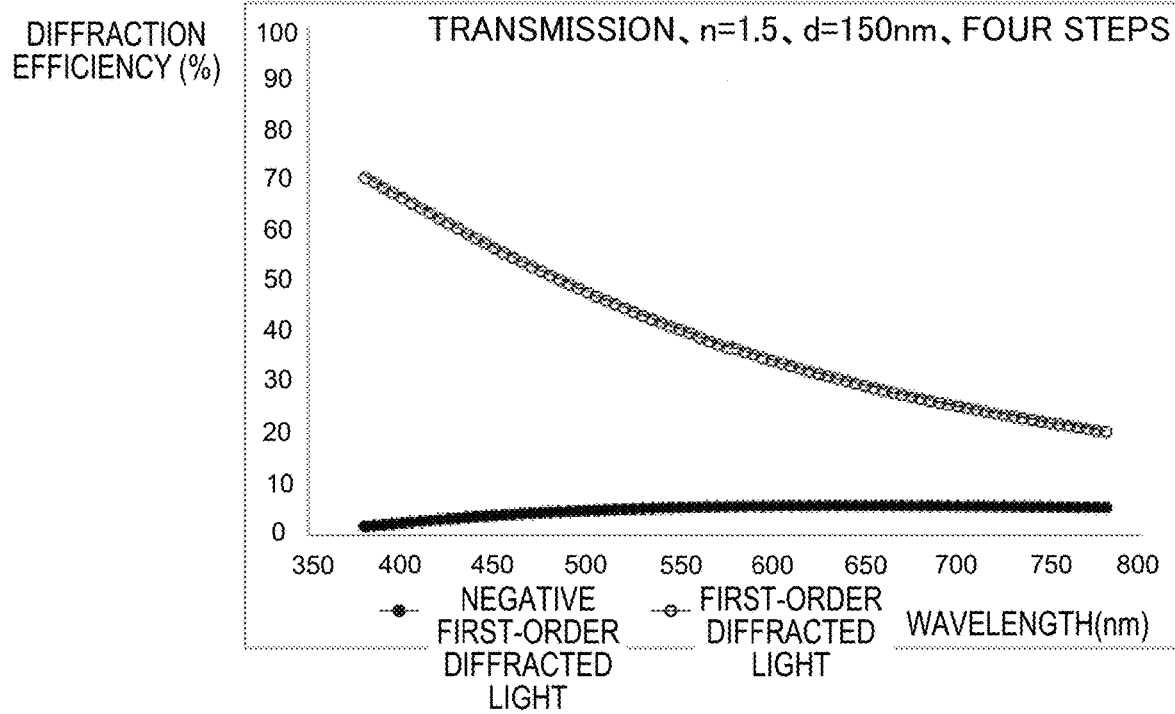
FIG. 68B is a graph illustrating an example of a relationship between wavelength distribution and diffraction efficiency of each of first-order diffracted light and negative first-order diffracted light resulting from transmission through each factor element according to the comparative example.

FIG. 67A and FIG. 67B are each a diagram illustrating a light modulation element of the present comparative example. FIGS. 68A and 68B are each a graph showing a diffraction efficiency characteristic of a factor element constituting the light modulation element of the present comparative example.

A light modulation element 311 illustrated in FIGS. 67A and 67B is a light modulation element according to the related art, and a light image 500*c* is identically observed in both reflection observation and transmission observation. In the example illustrated in FIGS. 68A and 68B, a factor element 321 constituting the light modulation element 311 is formed of a material having a refractive index n of 1.5, an uneven surface 301*a* has four steps, and a height d per step of the uneven surface 301*a* is 150 nm. A light path length difference of light reflected from the factor element 321 configured as described above is 450 nm per step. Further, a light path length difference of light transmitted through the factor element 321 configured as described above is 75 nm per step when the factor element 321 is used in an air environment having a refractive index of 1.0.

As can be understood from FIG. 68A, a maximum diffraction efficiency in the wavelength band of not less than 380 nm and not more than 780 nm in wavelength distribution of first-order diffracted light resulting from reflection from the factor element 321 with respect to diffraction efficiency and wavelength distribution of negative first-order diffracted light resulting from reflection from the factor element 321 with respect to diffraction efficiency is 20% or higher. Further, as can be understood from FIG. 68B, a maximum diffraction efficiency in the wavelength band of not less than 380 nm and not more than 780 nm in wavelength distribution of first-order diffracted light resulting from transmission through the factor element 321 with respect to diffraction efficiency and wavelength distribution of negative first-order diffracted light resulting from transmission through the factor element 321 with respect to diffraction efficiency is 20% or higher.

Specifically, as can be understood from FIG. 68A, both of the first-order diffracted light and the negative first-order diffracted light resulting from reflection from the factor element 321 are diffracted at diffraction efficiency sufficient to reproduce the light image 500*c* in the wavelength band of not less than 380 nm and not more than 780 nm. In addition, as can be understood from FIG. 68B, the first-order diffracted light resulting from transmission through the factor element 121 is diffracted at diffraction efficiency sufficient to reproduce the light image 500*c*, in the wavelength band of not less than 380 nm and not more than 780 nm. This means that, in both of a case of performing the reflection observation of the light modulation element 311 and a case of performing the transmission observation of the light modulation element 311, the light image 500*c* can be observed.

Then, as illustrated in FIGS. 67A and 67B, the light image observed when the reflection observation of the light modulation element 311 is performed, and the light image observed when the transmission observation of the light modulation element 311 is performed are the same light images 500*c*.

The present invention is not limited to the above-described embodiments and modified examples. For example, various modifications may be made for each element of the above-described embodiments and modified examples. In addition, an embodiment including components and/or methods other than the above-described components and/or methods can be included in the embodiments of the present invention. Further, an embodiment in which some of the components and/or methods described above are not included can be included in the embodiments of the present invention. Further, an embodiment including some components and/or methods included in one embodiment of the present invention and some components and/or methods included in another embodiment of the present invention can also be included in the embodiments of the present invention. Therefore, the components and/or methods included in each of the above-described embodiments and modified examples and embodiments of the present invention other than those described above may be combined with each other, and an embodiment corresponding to such a combination can also be included in the embodiments of the present invention. Further, the effects achieved by the present invention are not limited to the above-described effects, and specific effects according to the specific configuration of each embodiment can also be exerted. As described above, various additions, changes, and partial deletions can be made for each element described in the claims, the specification, the abstract, and the drawings without departing from the technical idea and spirit of the present invention.

As described above, the present invention can be embodied by various embodiments and modified examples. For example, the following specific aspects can be derived from the above-described embodiments and modified examples.

A light modulation element according to a first specific aspect includes a factor element that reproduces a light image by modulating a phase of incident reproduction light, in which the factor element has an uneven surface, and a maximum diffraction efficiency in a wavelength band of not less than 380 nm and not more than 780 nm in wavelength distribution of first-order diffracted light with respect to diffraction efficiency and wavelength distribution of negative first-order diffracted light with respect to diffraction efficiency for the factor element has a local maximum value with a full width at half maximum of 200 nm or less in wavelength distribution with respect to diffraction efficiency having the maximum diffraction efficiency.

In the light modulation element according to the first specific aspect, the uneven surface of the factor element has a different height of three or more steps, and there is no other local maximum value of the diffraction efficiency that is half or more of the maximum diffraction efficiency in the wavelength band of not less than 380 nm and not more than 780 nm in the wavelength distribution of the first-order diffracted light with respect to diffraction efficiency and the wavelength distribution of the negative first-order diffracted light with respect to diffraction efficiency.

In the light modulation element according to the first specific aspect, at least two or more types of factor elements are provided, and a wavelength showing the maximum diffraction efficiency is different between the at least two or more types of factor elements.

The light modulation element according to the first specific aspect includes a first region and a second region, in which a factor element including a first type factor element is arranged in the first region, a factor element including a second type factor element is arranged in the second region, and a wavelength showing the maximum diffraction efficiency for the first type factor element is different from a wavelength showing the maximum diffraction efficiency for the second type factor element, and a light image reproduced by the factor element arranged in the first region and a light image reproduced by the factor element arranged in the second region have shape similarity.

In the light modulation element according to the first specific aspect, the maximum diffraction efficiency is shown in one of the wavelength distribution of the first-order diffracted light with respect to diffraction efficiency and the wavelength distribution of the negative first-order diffracted light with respect to diffraction efficiency, and a maximum diffraction efficiency in the wavelength band of not less than 380 nm and not more than 780 nm in the other one of the wavelength distribution of the first-order diffracted light with respect to diffraction efficiency and the wavelength distribution of the negative first-order diffracted light with respect to diffraction efficiency has a local maximum value with a full width at half maximum of 200 nm or less in the other wavelength distribution with respect to diffraction efficiency.

In the light modulation element according to the first specific aspect, the maximum diffraction efficiency is shown in both of the wavelength distribution of the first-order diffracted light with respect to diffraction efficiency and the wavelength distribution of the negative first-order diffracted light with respect to diffraction efficiency.

In the light modulation element according to the first specific aspect, a difference between a wavelength showing the maximum diffraction efficiency in one of the wavelength distribution of the first-order diffracted light with respect to diffraction efficiency and the wavelength distribution of the negative first-order diffracted light with respect to diffraction efficiency, and a wavelength showing the maximum diffraction efficiency in the other one of the wavelength distribution of the first-order diffracted light with respect to diffraction efficiency and the wavelength distribution of the negative first-order diffracted light with respect to diffraction efficiency is 100 nm or less.

In the light modulation element according to the first specific aspect, there is no other local maximum value of the diffraction efficiency that is half or more of the maximum diffraction efficiency in one of the wavelength distribution of the first-order diffracted light with respect to diffraction efficiency and the wavelength distribution of the negative first-order diffracted light with respect to diffraction efficiency, in the wavelength band of not less than 380 nm and not more than 780 nm in the one wavelength distribution with respect to diffraction efficiency, and there is no other local maximum value of the diffraction efficiency that is half or more of the maximum diffraction efficiency in the other one of the wavelength distribution of the first-order diffracted light with respect to diffraction efficiency and the wavelength distribution of the negative first-order diffracted light with respect to diffraction efficiency, in the wavelength band of not less than 380 nm and not more than 780 nm in the other one wavelength distribution with respect to diffraction efficiency.

The light modulation element according to the first specific aspect includes a first region and a second region, in which a first type factor element is arranged in the first region, a second type factor element is arranged in the second region, in the wavelength band of not less than 380 nm and not more than 780 nm, wavelength distribution of first-order diffracted light with respect to diffraction efficiency for the first type factor element is the same as wavelength distribution of first-order diffracted light with respect to diffraction efficiency for the second type factor element, wavelength distribution of negative first-order diffracted light with respect to diffraction efficiency for the first type factor element is the same as wavelength distribution of negative first-order diffracted light with respect to diffraction efficiency for the second type factor element, a light image of the first-order diffracted light reproduced by the first type factor element has the same shape as that of a light image of the negative first-order diffracted light reproduced by the second type factor element, a light image of the negative first-order diffracted light reproduced by the first type factor element has the same shape as that of a light image of the first-order diffracted light reproduced by the second type factor element, and relative positions of the light image reproduced with the first-order diffracted light of the first type factor element and the light image reproduced with the negative first-order diffracted light of the first type factor element are opposite to relative positions of the light image reproduced with the first-order diffracted light of the second type factor element and the light image reproduced with the negative first-order diffracted light of the second type factor element.

In the light modulation element according to the first specific aspect, a plurality of factor elements are provided, the plurality of factor elements include a first type factor element and a second type factor element, in the wavelength band of not less than 380 nm and not more than 780 nm, wavelength distribution of first-order diffracted light with respect to diffraction efficiency for the first type factor element is the same as wavelength distribution of first-order diffracted light with respect to diffraction efficiency for the second type factor element, wavelength distribution of negative first-order diffracted light with respect to diffraction efficiency for the first type factor element is the same as wavelength distribution of negative first-order diffracted light with respect to diffraction efficiency for the second type factor element, a light image of the first-order diffracted light reproduced by the first type factor element has the same shape as that of a light image of the negative first-order diffracted light reproduced by the second type factor element, a light image of the negative first-order diffracted light reproduced by the first type factor element has the same shape as that of a light image of the first-order diffracted light reproduced by the second type factor element, the light image of the first-order diffracted light reproduced by the first type factor element and the light image of the negative first-order diffracted light reproduced by the second type factor element are superimposed, and the light image of the negative first-order diffracted light reproduced by the first type factor element and the light image of the first-order diffracted light reproduced by the second type factor element are superimposed.

In the light modulation element according to the first specific aspect, a plurality of factor elements are provided, the plurality of factor elements include a first type factor element and a second type factor element, in the wavelength band of not less than 380 nm and not more than 780 nm, wavelength distribution of first-order diffracted light with respect to diffraction efficiency for the first type factor element is different from wavelength distribution of first-order diffracted light with respect to diffraction efficiency for the second type factor element, wavelength distribution of negative first-order diffracted light with respect to diffraction efficiency for the first type factor element is different from wavelength distribution of negative first-order diffracted light with respect to diffraction efficiency for the second type factor element, a light image of the first-order diffracted light reproduced by the first type factor element has the same shape as that of a light image of the negative first-order diffracted light reproduced by the second type factor element, a light image of the negative first-order diffracted light reproduced by the first type factor element has the same shape as that of a light image of the first-order diffracted light reproduced by the second type factor element, the light image of the first-order diffracted light reproduced by the first type factor element and the light image of the negative first-order diffracted light reproduced by the second type factor element are superimposed, and the light image of the negative first-order diffracted light reproduced by the first type factor element and the light image of the first-order diffracted light reproduced by the second type factor element are superimposed.

In the light modulation element according to the first specific aspect, a plurality of factor elements are provided, the plurality of factor elements include a first type factor element and a second type factor element, in the wavelength band of not less than 380 nm and not more than 780 nm, wavelength distribution of first-order diffracted light with respect to diffraction efficiency for the first type factor element is different from wavelength distribution of negative first-order diffracted light with respect to diffraction efficiency for the second type factor element, wavelength distribution of negative first-order diffracted light with respect to diffraction efficiency for the first type factor element is different from wavelength distribution of first-order diffracted light with respect to diffraction efficiency for the second type factor element, a light image of the first-order diffracted light reproduced by the first type factor element has the same shape as that of a light image of the first-order diffracted light reproduced by the second type factor element, a light image of the negative first-order diffracted light reproduced by the first type factor element has the same shape as that of a light image of the negative first-order diffracted light reproduced by the second type factor element, the light image of the first-order diffracted light reproduced by the first type factor element and the light image of the first-order diffracted light reproduced by the second type factor element are superimposed, and the light image of the negative first-order diffracted light reproduced by the first type factor element and the light image of the negative first-order diffracted light reproduced by the second type factor element are superimposed.

In the light modulation element according to the first specific aspect, a maximum diffraction efficiency of 0th-order diffracted light for the factor element is obtained at a wavelength of 421 nm or less or a wavelength of 697 nm or more.

In the light modulation element according to the first specific aspect, a maximum diffraction efficiency of 0th-order diffracted light for the factor element has a local maximum value with a full width at half maximum of 200 nm or less.

In the light modulation element according to the first specific aspect, at least one of the wavelength distribution of the first-order diffracted light with respect to diffraction efficiency or the wavelength distribution of the negative first-order diffracted light with respect to diffraction efficiency for the factor element has a local maximum value of diffraction efficiency in a wavelength band of 456 nm to 663 nm.

In the light modulation element according to the first specific aspect, a maximum diffraction efficiency in the wavelength band of 456 nm to 663 nm in wavelength distribution of the 0th-order diffracted light with respect to diffraction efficiency for the factor element is less than 25% of the local maximum value included in the wavelength band of 456 nm to 663 nm in at least one of the wavelength distribution of the first-order diffracted light with respect to diffraction efficiency or the wavelength distribution of the negative first-order diffracted light with respect to diffraction efficiency for the factor element.

The light modulation element according to the first specific aspect includes a first region and a second region, in which a first type factor element is arranged in the first region, a second type factor element is arranged in the second region, light images of first-order diffracted light and negative first-order diffracted light reproduced by the first type factor element and light images of first-order diffracted light and negative first-order diffracted light reproduced by the second type factor element have shape similarity, a maximum diffraction efficiency of 0th-order diffracted light for the first type factor element is obtained at a wavelength of 421 nm or less or a wavelength of 697 nm or more, and a maximum diffraction efficiency of 0th-order diffracted light for the second type factor element is obtained at a wavelength of more than 421 nm and less than 697 nm.

A light modulation element according to a second specific aspect includes a factor element that reproduces a light image by modulating a phase of incident reproduction light, in which the factor element has an uneven surface with a different height of three or more steps, and the factor element reproduces a first light image with light including light having a first wavelength, and a second light image with light including light having a second wavelength different from the first wavelength, the second light image being point-symmetric to the first light image.

In the light modulation element according to the second specific aspect, one of the first light image and the second light image is reproduced in red.

In the light modulation element according to the second specific aspect, a maximum diffraction efficiency in a wavelength band of not less than 380 nm and not more than 780 nm in one of wavelength distribution of first-order diffracted light with respect to diffraction efficiency and wavelength distribution of the negative first-order diffracted light with respect to diffraction efficiency for the factor element has a local maximum value in a wavelength band of not less than 680 nm and not more than 780 nm in the one wavelength distribution with respect to diffraction efficiency.

In the light modulation element according to the second specific aspect, a maximum diffraction efficiency in the other one of the wavelength distribution of the first-order diffracted light with respect to diffraction efficiency and the wavelength distribution of the negative first-order diffracted light with respect to diffraction efficiency for the factor element can have a local maximum value in a wavelength band of less than 680 nm in the other one wavelength distribution with respect to diffraction efficiency, in accordance with a change in an incident angle of the reproduction light with respect to the factor element.

In the light modulation element according to the second specific aspect, there is no local maximum value of the diffraction efficiency that is half or more of the maximum diffraction efficiency in the wavelength band of not less than 380 nm and not more than 780 nm in the one wavelength distribution with respect to diffraction efficiency.

A light modulation element according to a third specific aspect includes a factor element that reproduces a light image by modulating a phase of incident reproduction light, in which the factor element has an uneven surface with a height of three or more steps, a maximum diffraction efficiency of 0th-order diffracted light for the factor element is obtained at a wavelength of 421 nm or less or a wavelength of 697 nm or more.

In the light modulation element according to the first, second, or third specific aspect, the factor element is a Fourier transform hologram.

An information recording medium according to a fourth specific aspect includes the light modulation element according to the first, second, or third specific aspect.

In the information recording medium according to the fourth specific aspect, the light image represents information based on at least one of a letter, a symbol, and a picture.

The information recording medium according to the fourth specific aspect further includes a substrate having an opening portion with a predetermined size, in which at least a part of the light modulation element is arranged at a position corresponding to the opening portion.

A light modulation element according to a fifth specific aspect includes a factor element that reproduces a light image by modulating a phase of incident reproduction light, in which the factor element has an uneven surface, and at least one of wavelength distribution of first-order diffracted light with respect to diffraction efficiency or wavelength distribution of negative first-order diffracted light with respect to diffraction efficiency for the factor element has a local maximum value of the diffraction efficiency in at least one of a wavelength band of not less than 380 nm and not more than 600 nm or a wavelength band of not less than 780 nm to not more than 1200 nm.

In the light modulation element according to the fifth specific aspect, a full width at half maximum of the local maximum value of the diffraction efficiency included in at least one of the wavelength distribution of the first-order diffracted light with respect to diffraction efficiency and the wavelength distribution of the negative first-order diffracted light with respect to diffraction efficiency is 200 nm or less.

In the light modulation element according to the fifth specific aspect, one of the wavelength distribution of the first-order diffracted light with respect to diffraction efficiency and the wavelength distribution of the negative first-order diffracted light with respect to diffraction efficiency for the factor element has a local maximum value of the diffraction efficiency in at least one of the wavelength band of not less than 380 nm and not more than 600 nm or the wavelength band of not less than 780 nm to not more than 1200 nm, and the other one of the wavelength distribution of the first-order diffracted light with respect to diffraction efficiency and the wavelength distribution of the negative first-order diffracted light with respect to diffraction efficiency for the factor element has a local maximum value of the diffraction efficiency in the wavelength band of more than 600 nm and less than 780 nm.

A light modulation element according to a sixth specific aspect includes a factor element that reproduces a light image by modulating a phase of incident reproduction light, in which the factor element has an uneven surface, and a wavelength band of light for reproducing a light image can be a wavelength band of less than 380 nm or a wavelength band of more than 780 nm in accordance with a change in an incident angle of the reproduction light with respect to the factor element.

A light modulation element according to a seventh specific aspect includes a factor element that reproduces a light image by modulating a phase of incident reproduction light, in which the factor element has an uneven surface, and the light image can become invisible in accordance with a change in an incident angle of the reproduction light with respect to the factor element.

In the light modulation element according to the fifth, sixth, or seventh specific aspect, the factor element is a Fourier transform hologram.

An information recording medium according to an eighth specific aspect includes the light modulation element according to the fifth, sixth, or seventh specific aspect.

In the information recording medium according to the eighth specific aspect, the light image represents information based on at least one of a letter, a symbol, and a picture.

The information recording medium according to the eighth specific aspect further includes a substrate having an opening portion with a predetermined size, in which at least a part of the light modulation element is arranged at a position corresponding to the opening portion.

A light modulation element according to a ninth specific aspect includes a factor element that reproduces a light image by modulating a phase of incident light, in which the factor element has an uneven surface, a maximum diffraction efficiency in a wavelength band of not less than 380 nm and not more than 780 nm in wavelength distribution of first-order diffracted light resulting from reflection from the factor element with respect to diffraction efficiency and wavelength distribution of negative first-order diffracted light resulting from reflection from the factor element with respect to diffraction efficiency is 20% or higher, and a maximum diffraction efficiency in the wavelength band of not less than 380 nm and not more than 780 nm in wavelength distribution of first-order diffracted light resulting from transmission through the factor element with respect to diffraction efficiency and wavelength distribution of negative first-order diffracted light resulting from transmission through the factor element with respect to diffraction efficiency is 10% or lower.

A light modulation element according to a tenth specific aspect includes a factor element that reproduces a light image by modulating a phase of incident light, in which the factor element has an uneven surface with a different height of five or more steps, a maximum diffraction efficiency in a wavelength band of not less than 380 nm and not more than 780 nm in wavelength distribution of first-order diffracted light resulting from transmission through the factor element with respect to diffraction efficiency and wavelength distribution of negative first-order diffracted light resulting from transmission through the factor element with respect to diffraction efficiency is 20% or higher, and a maximum diffraction efficiency in the wavelength band of not less than 380 nm and not more than 780 nm in wavelength distribution of first-order diffracted light resulting from reflection from the factor element with respect to diffraction efficiency and wavelength distribution of negative first-order diffracted light resulting from reflection from the factor element with respect to diffraction efficiency is 10% or lower.

In the light modulation element according to the ninth or tenth specific aspect, the factor element is configured as a Fourier transform hologram.

A light modulation element according to an eleventh specific aspect includes a first factor element and a second factor element that reproduce a light image by modulating a phase of incident light, in which the first factor element has an uneven surface, the second factor element has an uneven surface with a different height of five or more steps, a maximum diffraction efficiency in a wavelength band of not less than 380 nm and not more than 780 nm in wavelength distribution of first-order diffracted light resulting from reflection from the first factor element with respect to diffraction efficiency and wavelength distribution of negative first-order diffracted light resulting from reflection from the first factor element with respect to diffraction efficiency is 20% or higher, a maximum diffraction efficiency in the wavelength band of not less than 380 nm and not more than 780 nm in wavelength distribution of first-order diffracted light resulting from transmission through the first factor element with respect to diffraction efficiency and wavelength distribution of negative first-order diffracted light resulting from transmission through the first factor element with respect to diffraction efficiency is 10% or lower, a maximum diffraction efficiency in the wavelength band of not less than 380 nm and not more than 780 nm in wavelength distribution of first-order diffracted light resulting from transmission through the second factor element with respect to diffraction efficiency and wavelength distribution of negative first-order diffracted light resulting from transmission through the second factor element with respect to diffraction efficiency is 20% or higher, and a maximum diffraction efficiency in the wavelength band of not less than 380 nm and not more than 780 nm in wavelength distribution of first-order diffracted light resulting from reflection from the second factor element with respect to diffraction efficiency and wavelength distribution of negative first-order diffracted light resulting from reflection from the second factor element with respect to diffraction efficiency is 10% or lower.

In the light modulation element according to the eleventh specific aspect, the first factor element and the second factor element are each configured as a Fourier transform hologram.

In the light modulation element according to the eleventh specific aspect, a light image of the first-order diffracted light or the negative first-order diffracted light resulting from reflection from the first factor element is different from a light image of the first-order diffracted light or the negative first-order diffracted light resulting from transmission through the second factor element.

In the light modulation element according to the eleventh specific aspect, the first factor element and the second factor element are arranged side by side on the same plane.

In the light modulation element according to the eleventh specific aspect, the first factor element and the second factor element are arranged side by side in a thickness direction of the light modulation element.

REFERENCE SIGNS LIST

1 Hologram layer
1a Uneven surface
2 Reflection layer
4 Substrate
4a Opening portion
10 Hologram holder, light modulation element holder
11 Hologram structure, light modulation element
21 Factor element
21a First factor element
21b Second factor element
21c Third factor element
25 First region
26 Second region
28 First region
29 Second region
50 Observer
51 Light source
51a Light source
51b Light source
100 Light image
100a 0th-order diffracted light image
100b First-order diffracted light image
100c Negative first-order diffracted light image
101a, 301a Uneven surface
111, 211, 311 Light modulation element
121, 321 Factor element
500a, 500b, 500c Light image

The invention claimed is:

1. An information recording medium comprising:
a light modulation element comprising:
   a factor element that modulates a phase of incident reproduction light so as to reproduce a light image, the factor element having an uneven surface with a different height of three or more steps,
   the factor element having a first-order maximum diffraction efficiency in a wavelength band from 380 nm to 780 nm of first-order diffracted light with a full width at half maximum of 200 nm or less, and the factor element having a negative first-order maximum diffraction efficiency in a wavelength band from 380 nm to 780 nm of negative first-order diffracted light with a full width at half maximum of 200 nm or less,
   the factor element being configured to:
      reproduce a first-order diffracted light image with the first-order diffracted light; and
      reproduce a negative first-order diffracted light image with the negative first-order diffracted light,
   wherein a wavelength showing the first-order maximum diffraction efficiency is different from a wavelength showing the negative first-order maximum diffraction efficiency,
   wherein the first-order diffracted light image and the negative first-order diffracted light image represents information based on at least one of a letter, a symbol, and a picture,
   the first-order diffracted light image and the negative first-order diffracted light image are point-symmetric about the incident reproduction light to each other, and
   the factor element is a Fourier transform hologram, and
wherein a difference between the wavelength showing the first-order maximum diffraction efficiency and the wavelength showing the negative first-order maximum diffraction efficiency is 100 nm or less.

2. The information recording medium according to claim 1, wherein:
the uneven surface of the factor element has a different height of three or more steps, and
there is no other local maximum value of the diffraction efficiency that is half or more of the first-order maximum diffraction efficiency and the negative first-order maximum diffraction efficiency in the wavelength band of from 380 nm to 780 nm.

3. The information recording medium according to claim 1, further comprising:
another factor element having a different wavelength of maximum diffraction efficiency than that of the factor element.

4. The information recording medium according to claim 1, wherein:
at least one of wavelength distribution of first-order diffracted light or wavelength distribution of negative first-order diffracted light for the factor element has a local maximum value of the diffraction efficiency in at least one of a wavelength band of from 380 nm to 600 nm or a wavelength band of from 780 nm to 1200 nm.

5. The information recording medium according to claim 4, wherein one of the wavelength distribution of the first-order diffracted light and the wavelength distribution of the negative first-order diffracted light has a local maximum value of the diffraction efficiency in at least one of the wavelength band from 380 nm to 600 nm or the wavelength band from 780 nm to 1200 nm, and the other one of the wavelength distribution of the first-order diffracted light and the wavelength distribution of the negative first-order diffracted light has a local maximum value of the diffraction efficiency in the wavelength band from 600 nm to 780 nm.

6. The information recording medium according to claim 1, further comprising a substrate having an opening portion with a predetermined size,
wherein at least a part of the light modulation element is arranged at a position corresponding to the opening portion.

7. The information recording medium according to claim 1, wherein:
a light image reproduced by the factor element includes a 0th-order diffracted light image, the first-order diffracted light image, and the negative first-order diffracted light image; and
the first-order diffracted light image and the negative first-order diffracted light image are reproduced around the 0th-order diffracted light image.

\* \* \* \* \*